United States Patent
Podolsky et al.

(10) Patent No.: US 10,672,297 B2
(45) Date of Patent: Jun. 2, 2020

(54) SIMULATOR FOR PRACTICING TRANS-ORAL SURGERY AND METHOD OF USE THEREOF

(71) Applicant: The Hospital For Sick Children, Toronto, Ontario (CA)

(72) Inventors: Dale J. Podolsky, Toronto (CA); David M. Fisher, Toronto (CA); Karen W. Wong, Toronto (CA); James M. Drake, Toronto (CA); Christopher R. Forrest, Toronto (CA)

(73) Assignee: The Hospital for Sick Children, Toronto (CA)

( * ) Notice: Subject to any disclaimer, the term of this patent is extended or adjusted under 35 U.S.C. 154(b) by 295 days.

(21) Appl. No.: 15/541,640

(22) PCT Filed: Sep. 21, 2015

(86) PCT No.: PCT/CA2015/050927
§ 371 (c)(1),
(2) Date: Jul. 5, 2017

(87) PCT Pub. No.: WO2016/109879
PCT Pub. Date: Jul. 14, 2016

(65) Prior Publication Data
US 2017/0358248 A1   Dec. 14, 2017

Related U.S. Application Data

(60) Provisional application No. 62/118,306, filed on Feb. 19, 2015, provisional application No. 62/100,150, filed on Jan. 6, 2015.

(51) Int. Cl.
*G09B 23/28* (2006.01)
*G09B 9/00* (2006.01)
*G09B 23/30* (2006.01)

(52) U.S. Cl.
CPC ............. *G09B 23/283* (2013.01); *G09B 9/00* (2013.01); *G09B 23/306* (2013.01)

(58) Field of Classification Search
CPC ...... G09B 23/283; G09B 23/306; G09B 9/00; G09B 23/28; G09B 23/30
See application file for complete search history.

(56) References Cited

U.S. PATENT DOCUMENTS 8,641,422 B2   2/2014   Francavilla
8,647,125 B2   2/2014   Johns
(Continued)

FOREIGN PATENT DOCUMENTS

GB   2237138 A   4/1991

OTHER PUBLICATIONS

Selber JC, Baumann DP, Holsinger FC. Robotic latissimus dorsi muscle harvest: a case series. Plastic and reconstructive surgery. 2012;129(6):1305-12. doi: 10.1097/PRS.0b013e31824ecc0b. PubMed PMID: 22634647.

(Continued)

*Primary Examiner* — Timothy A Musselman
(74) *Attorney, Agent, or Firm* — TraskBritt

(57) ABSTRACT

Simulators for practicing trans-oral surgery and methods of use thereof, are described. The simulator may include a simulated soft palate musculature adjacent to the simulated hard palate, and a simulated mucosal layer covering at least a portion of the simulated hard palate and at least a portion of the simulated soft palate musculature, wherein the simulated mucosal layer is configured to conform to and follow the contours of surface features of the covered portions of the simulated hard palate and simulated soft palate musculature.

15 Claims, 47 Drawing Sheets

(56) References Cited

U.S. PATENT DOCUMENTS

| | | |
|---|---|---|
| 8,678,830 B2 | 3/2014 | Gurdin |
| 8,821,166 B2 | 9/2014 | Akura |
| 8,840,404 B2 | 9/2014 | Arthur |
| D716,376 S | 10/2014 | Sommer |
| 8,870,576 B2 | 10/2014 | Millon |
| 8,899,989 B2 | 12/2014 | Mourton |
| 2007/0178429 A1* | 8/2007 | Bell ............. G09B 23/283 434/263 |
| 2008/0050710 A1 | 2/2008 | Cottler |
| 2009/0004637 A1 | 1/2009 | Carda |
| 2009/0226868 A1 | 9/2009 | Frassica |
| 2012/0034587 A1* | 2/2012 | Toly ............. G09B 23/285 434/267 |
| 2014/0099619 A1 | 4/2014 | Mitchell |
| 2014/0246798 A1 | 9/2014 | Okano |
| 2014/0272875 A1 | 9/2014 | Francois |
| 2014/0272881 A1 | 9/2014 | Barsoum |

OTHER PUBLICATIONS

Selber JC, Alrasheed T. Robotic microsurgical training and evaluation. Seminars in plastic surgery. 2014;28(1):5-10. doi: 10.1055/s-0034-1368161. PubMed PMID: 24872773; PubMed Central PMCID: PMC3946019.

Selber JC. Baumann DP. Holsinger CF. Robotic harvest of the latissimus dorsi muscle: laboratory and clinical experience. Journal of reconstructive microsurgery. 2012;28(7):457-64. doi: 10.1055/s-0032-1315789. PubMed PMID: 22744894.

Selber JC, Robb G, Sertetti JM, Weinstein G, Weber R, Holsinger FC. Transoral robotic free flap reconstruction of oropharyngeal defects: a preclinical investigation. Plastic and reconstructive surgery. 2010;125(3):896-900. doi: 10.1097/PRS.0b013e3181cb6568. PubMed PMID: 20195117.

Selber JC. Transoral robotic reconstruction of oropharyngael defects: a case series, Plastic and reconstructive surgery. 2010;126(6)1978-87. doi: 10.1097/PRS.0b013e3181f448e3. PubMed PMID: 21124136.

Smartt JM, Jr., Gerety P. Serletti JM, Taylor JA. Application of a robotic telemanipulator to perform posterior pharyngeal flap surgery: a feasibility study. Plastic and reconstructive surgery. 2013;131(4):841-5. doi: 10.1097/PRS.0b013e318282761b. PubMed PMID: 23249978.

Natalie Smith-Guerin LN, Pierre Vieyres, Gerard Poisson. A medical robot kinematics design approach based on knowledge management. Industrial Robot. 2008;35(4):316-23.

Sommerlad BC. The Use of the Operating Microscope for Cleft Palate Repair and Pharyngoplasty. Plastic and reconstructive surgery. 2002;112(6):1540-1.

Stefanidis D, Sevdalis N, Paige J, Zevin B, Aggarwal R, Grantcharov T, et al. Simulation in surgery: what's needed next? Annals of surgery. 2015;261(5):846-53.

Strandbygaard J, Bjerrum F, Maagaard M, et al. Instructor feedback versus no instructor feedback on performance in a laparoscopic virtual reality simulator: a randomized trial. Annals of surgery. 2013;257(5):839-844.

R. M. Ulma: UCLA Oral and Maxillofacial Surgery MO, R. Troncoso Alarcon, E. Freymiller, A. Felsenfeld. Visualizing cleft defects and cleft lip repair in three dimensions: a prototype surgical model for resident education. Journal of Oral and Maxillofacial Surgery. 2011;69(9):e76-e77.

Van Nortwick SS. Lendvay TS. Jensen AR. Wright AS. Horvath KD. Kim S. Methodologies for establishing validity in surgical simulation studies. Surgery. 2010;147(5):622-30. doi: 10.1016/j.surg.2009.10.068. PubMed PMID: 20015529.

Wakabayashi N. Suzuki T. Patient-specific finite element analysis of viscoelastic masticatory mucosa. Journal of dental biomechanics. 2013;4:1758736013483298. doi: 10.1177/1758736013483298. PubMed PMID: 23580171: PubMed Central PMCID: PMC3619231.

Wine TM. Duvvuri U. Maurer SH. Mehta DK. Pediatric transoral robotic surgery for oropharyngeal malignancy: a case report. International Journal of pediatric otorhinolaryngology. 2013;77(7):1222-6. doi: 10.1016/j.ijporl.2013.04.024. PubMed PMIC: 23680523.

Wohaibi EM, Bush RW, Earle DB, Seymour NE. Surgical resident performance on a virtual reality simulator correlates with operating room performance. The Journal of surgical research. 2010;160(1):67-72.

Yusuf Kenan Coban IY, Erdogan Okur. Endoscopically assisted, intraorally approached palatoplasty. Plastic and reconstructive surgery. 2005;116(6):1820-1.

Zhao YC, Kennedy G, Yukawa K, Pyman B, O'Leary S. Can virtual reality simulator be used as a training aid to improve cadaver temporal bone dissection? Results of a randomized blinded control trial. The Laryngoscope. 2011;121(4):831-837.

Zheng Y, Lu B, Zhang J, Wu G. CAD/CAM silicone simulator for teaching cheiloplasty: description of the technique. Br J Oral Maxillofac Surg. 2015;53(2):194-196.

Barsuk et al., "Simulation-based mastery learning reduces complications during central venous catheter insertion in a medical intensive care unit", Critical Care Medicine, vol. 37, No. 10, (2009) pp. 2697-2701.

Barsuk et al., "Use of Simulation-Based Mastery Learing to Improve the Quality of Central Venous Catheter Placement in a medical Intensive Care Unit", Journal of Hospital Medicine, vol. 4, No. 7, (2009) pp. 397-403.

Breimer et al., "Design an devaluation of a new synthetic brain simulator for endoscopic third ventriculostomy", Journal of Neurosurgery Pediatrics, vol. 15, (2015) pp. 82-88.

Crochet et al., "Deliberate practice on a virtual reality laparoscopic simulator enhances the quality of surgical technical skills", Annuals of Surgery, vol. 253, No. 6, (2011) pp. 1216-1222.

Goktas et al., "Biomechanical Behavior of Oral Soft Tissues", Journal of Periodontology, vol. 82, No. 8, (2011) pp. 1178-1186.

International Search Report from International Application No. PCT/CA2015/050927, dated Dec. 14, 2015, 3 pages.

International Written Opinion from International Application No. PCT/CA2015/050927, dated Dec. 14, 2015, 5 pages.

Juma et al., "A see-through in vitro tendon repair model", Plastic and Reconstructive Surgery, vol. 113, No. 3, (2004) pp. 1097-1098.

Long et al., "Educational Efficacy of a Procedural Surgical Simulator in Plastic Surgery: A Phase I Multicenter Study", Plastic and Reconstructive Surgery, vol. 132, No. 4S-1, (2013) p. 13.

Matthes et al., "Mastotrainer: New Training Project for Breast Aesthetic and Reconstructive Surgery", Plastic and Reconstructive Surgery, vol. 130, No. 3, (2012) pp. 502e-504e.

Matthews MS, "A Teaching Device of Furlow Palatoplasty", Cleft Palate-Craniofacial Journal, vol. 36, No. 1, (1999) pp. 64-66.

Nagy et al., "Advanced S(t)imulator for Cleft Palate Repair Techniques", Cleft Palate-Craniofacial Journal, vol. 46, No. 1, (2009) pp. 1-5.

Palter et al., "Development and validation of a comprehensive curriculum to teach an advanced minimally invasive procedure: a randomized controlled trial", Annals of Surgery, vol. 256, No. 1, (2012) pp. 25-32.

Palter et al., "Individualized deliberate practice on a virtual reality simulator improves technical performance of surgical novices in the operating room: a randomized controlled trial", Annals of Surgery, vol. 259, No. 3, (2014) pp. 443-448.

Rosen et al., "Simulation in Plastic Surgery Training and Education: The Path Forward", Plastic and Reconstructive Surgery, vol. 123, No. 2, (2009) pp. 729-738.

Senturk, S., "The Simplest Cleft Palate Simulator", The Journal of Craniofacial Surgery, vol. 24, No. 3, (2013) p. 1056.

Sheckter et al., "Incorporation of Fresh Tissue Surgical Simulation into Plastic Surgery Education: Maximizing Extraclinical Surgical Experience", J. Surg. Educ. vol. 70, No. 4, (2013) pp. 466-474.

Stefanidis et al., "Simulation in Surgery: What's Needed Next?", Annals of Surgery, vol. 00, No. 00, (2014) pp. 1-8.

Vadodaria et al., "The First Cleft Palate Simulator", Plastic and Reconstructive Surgery, vol. 120, No. 1, (2007) pp. 259-261.

Wanzel et al., "Teaching Technical Skills: Training on a Simple, Inexpensive, and Portable Model", Plastic and Reconstructive Surgery, vol. 109, No. 1, (2002) pp. 258-263.

(56) References Cited

OTHER PUBLICATIONS

Zabaneh et al., "Rhinoplasty: A Hands-On Training Module", Plastic and Reconstructive Surgery, vol. 124, No. 3, (2009) pp. 952-954.
Taiba Alrasheed JL. Matthew M. Hanasono. Charles E. Butler. Jesse C.Selber. Robotic Microsurgery: Validating an Assessment Tool and Plotting the Learning Curve. Plastic and reconstructive surgery. 2014;134(4):794-803.
Bjerrum F, Sorensen JL, Konge L, et al. Procedural specificity in laparoscopic simulator training: protocol for a randomised educational superiority trial. BMC medical education. 2014;14:215.
Burge J, Saber NR, Looi T, French B, Usmani Z, Anooshiravani N, Kim P, Forrest C, Phillips J. Application of CAD/CAM prefabricated age-matched templates in cranio-orbital remodeling in craniosynostosis. The Journal of craniofacial surgery. 2011;22(5):1810-3. doi: 10.1097/SCS.0b013e31822e8045. PubMed PMID: 21959440.
Carling L. Cheung TL. Thomas S. Lendvay. James M. Drake. Walid A.. Farhat. Use of 3-Dimensional Printing Technology and Silicone Modeling in Surgical Simulation: Development and Face Validation in Pediatric Laparoscopic Pyeloplasty. Journal of surgical education. 71(5):762-7.
Cheung CL, Looi, T., Drake, J., and Kim P.C.W. Magnetic resonance imaging properties of multimodality anthropomorphic silicone rubber phantoms for validating surgical robots and image guided therapy systems. SPIE Medical Imaging: Image-Guided Procedures. Robotic Interventions, and Modeling. 2012:8316.
Chrcanovic BR, Custodio AL. Anatomical variation in the position of the greater palatine foramen. Journal of oral science. 2010;52(1):109-13.
Lee J. Chung WY. Robotic surgery for thyroid disease. European thyroid journal. 2013;2(2):93-101. doi: 10.1159/000350209. PubMed PMID: 24783046; PubMed Central PMCID: PMC3821507.
Chung TK, Rosenthal EL, Magnuson JS, Carroll WR. Transoral robotic surgery for oropharyngeal and tongue cancer in the United States. The Laryngoscope. 2015;125(1):140-5.
Cohen J, Cohen SA, Vora KC, et al. Multicenter, randomized, controlled trial of virtual-reality simulator training in acquisition of competency in colonoscopy. Gastrointestinal endoscopy. 2006;64(3):361-368.
Condino S, Carbone M, Ferrari V, Faggioni L, Peri A, Ferrari M, Mosca F. How to build patient-specific synthetic abdominal anatomies. An innovative approach from physical toward hybrid surgical simulators. The international journal of medical robotics + computer assisted surgery : MRCAS. 2011;7(2):202-13.
Cutting C, Oliker A, Haring J, Dayan J, Smith D. Use of three-dimensional computer graphic animation to illustrate cleft lip and palate surgery. Comput Aided Surg. 2002;7(6):326-331.
DeMoss P. Low-cost, high-definition video documentation of corrective cleft surgeries using a fixed laparoscope. International Journal of Surgical Reconstruction. 2013.
Duodu J, Lesser TH. Tonsil tie simulator. The Journal of laryngology and otology. 2013;127(9):924-6.
Eljamel MS. Validation of the PathFinder neurosurgical robot using a phantom. The international journal of medical robotics + computer assisted surgery : MRCAS. 2007;3(4):372-7. doi: 10.1002/rcs.153. PubMed PMID: 17914750.
Fernandes E. Elli E. Giulianotti P. The role of the dual console in robotic surgical training. Surgery. 2014;155(1):1-4. doi: 10.1016/j.surg.2013.06.023. PubMed PMID: 23973110.
Fisher DM. Unilateral cleft lip repair: an anatomical subunit approximation technique. Plastic and reconstructive surgery. 2005;116(1):61-71.
Fisher DM, Lo LJ, Chen YR, Noordhoff MS. Three-dimensional computed tomographic analysis of the primary nasal deformity in 3-month-old infants with complete unilateral cleft lip and palate. Plastic and reconstructive surgery. 1999;103(7):1826-1834.
Fisher DM, Mann RJ. A model for the cleft lip nasal deformity. Plastic and reconstructive surgery. 1998;101(6):1448-1456.
Fisher DM, Sommerlad BC. Cleft lip, cleft palate, and velopharyngeal insufficiency. Plastic and reconstructive surgery. 2011;128(4):342e-360e.
Frederick Ayers AG, Danny Kuoa, David J. Cucciab, Anthony J. Durkina, editor. Fabrication and characterization of silicone-based tissue phantoms with tunable optical properties in the visible and near infrared domain. SPIE Proceedings: 2008; San Jose. CA.
Goktas S, Dmytryk JJ, McFetridge PS. Biomechanical behavior of oral soft tissues. Journal of periodontology. 2011;82(8):1178-86.
T. Haidegger LK, B. Benyó and Z. Benyó editor. Spatial Accuracy of Surgical Robots. 5th International Symposium of Applied Computational Intelligence and Informatics: 2009: Timisoara. Romania.
Joseph T. Hardwicke GL, Bruce M. Richard. Fistula Incidence after Primary Cleft Palate Repair. A Systematic Review of the literature. Plastic and reconstructive surgery. 2014;134(4):618e-27e.
Huang MH, Lee ST, Rajendran K. A fresh cadaveric study of the paratubal muscles: implications for eustachian tube function in cleft palate. Plastic and reconstructive surgery. 1997;100(4):833-42.
Huang MH, Lee ST, Rajendran K. Anatomic basis of cleft palate and velopharyngeal surgery: implications from a fresh cadaveric study. Plastic and reconstructive surgery. 1998;101(3):613-27; discussion 28-9.
Katz RD, Taylor JA, Rosson GD, Brown PR, Singh NK. Robotics in plastic and reconstructive surgery: use of a telemanipulator slave robot to perform microvascular anastomoses. Journal of reconstructive microsurgery. 2006;22(1):53-7. doi: 10.1055/s-2006-931908. PubMed PMID: 16425123.
Kayhan FT. Kaya KH. Koc AK. Altintas A. Erdur O. Transoral surgery for an infant thyroglossal duct cyst. International journal of pediatric otorhinolaryngology. 2013;77(9):1620-3. doi: 10.1016/jijporl.2013.07.007. PubMed PMID: 23916732.
Kuo CH. Dai JS, Dasgupta P. Kinematic design considerations for minimally invasive surgical robots: an overview. The international journal of medical robotics + computer assisted surgery : MRCAS. 2012;8(2):127-45. doi: 10.1002/rcs.453. PubMed PMID: 22228671.
David M. Kwartowitz SDH. Robert L Galloway. Toward Image-guided robotic surgery: determining intrinsic accuracy of the daVinci robot. Int J CARS. 2006;1:157-65.
J.A. Landheer CCB, A.B. Mink van der Molen. Fistula Incidence and Predictors of Fistula Occurrence After Cleft Palate Repair: Two-Stage Closure Versus One-Stage Closure. Cleft Palate-Craniofacial Journal. 2010;46(6):623-30.
Langenegger JJ, Lownie JF, Cleaton-Jones PE. The relationship of the greater palatine foramen to the molar teeth and pterygoid hamulus in human skulls. Journal of dentistry. 1983;11(3):249-56.
Leonardis RL, Duvvuri U, Mehta D. Transoral robotic-assisted lingual tonsillectomy in the pediatric population. JAMA otolaryngology—head & neck surgery. 2013;139(10):1032-6. doi: 10.1001/jamaoto.2013.4924. PubMed PMID: 24135744.
Looi T, Azimian, Hamidreza, Bodani, Vivek Pankaj, Drake, James M, editor. Design and evaluation of a concentric tube robot for minimally-invasive endoscopic pediatric neurosurgery. Neurosurgery; 2014.
Joseph E. Losee REK. Comprehensive Cleft Care: The McGraw-Hill Companies; 2009.
Maan ZN, Gibbins N, Al-Jabri T, D'Souza AR. The use of robotics in otolaryngology-head and neck surgery: a systematic review. American journal of otolaryngology. 2012;33(1):137-46.
Mary-Helen Mahoney DMF. The Relationships between Length, Width and Type in Clefts of the Palate. Plastic Surgery. 2010.
Martin JA, Regehr G. Reznick R, MacRae H, Murnaghan J, Hutchison C. Brown M. Objective structured assessment of technical skill (OSATS) for surgical residents. The British journal of surgery. 1997;84(2):273-8. PubMed PMID: 9052454.
Mick PT, Arnoldner C, Mainprize JG, Symons SP, Chen JM. Face validity study of an artificial temporal bone for simulation surgery. Otology & neurotology : official publication of the American Otological Society, American Neurotology Society [and] European Academy of Otology and Neurotology. 2013;34(7)1305-10. doi: 10.1097/ MAO.0b013e3182937af6. PubMed PMID: 23921940.
Montgomery K, Sorokin A, Lionetti G, Schendel S. A surgical simulator for cleft lip planning and repair. Stud Health Technol Inform. 2003;94:204-209.

(56) References Cited

OTHER PUBLICATIONS

Moorthy K. Munz Y. Doris A. Hernandez J. Martin S. Bello F. Rockall T. Darzi A. Dexterity enhancement with robotic surgery. Surgical endoscopy. 2004;18(5):790-5. doi: 10.1007/s00464-003-8922-2. PubMed PMID: 15216862.

Palter VN, Grantcharov T, Harvey A, Macrae HM. Ex vivo technical skills training transfers to the operating room and enhances cognitive learning: a randomized controlled trial. Annals of surgery. 2011;253(5):886-889.

Parker SE, Mai CT, Canfield MA, Rickard R, Wang Y, Meyer RE, Anderson P, Mason CA, Collins JS, Kirby RS, Correa A. National Birth Defects Prevention N. Updated National Birth Prevalence estimates for selected birth defects in the United States. 2004-2006. Birth defects research Part A, Clinical and molecular teratology. 2010;88(12):1008-16. doi: 10.1002/bdra.20735. PubMed PMID: 20878909.

Qinjun DU XZ, Li Zou, editor. Design optimization of a minimally invasive surgical robot. International Conference on Integration Technology; 2007: Shenzhen, China.

Rosen J, Brown JD, De S, Sinanan M, Hannaford B. Biomechanical properties of abdominal organs in vivo and postmortem under compression loads. Journal of biomechanical engineering. 2008;130(2):021020. doi: 10.1115/1.2898712. PubMed PMID: 18412507.

Alonso Sanchez PP. Etienne Dombre. Arianna Menciassi, Paolo Dario. A design framework for surgical robots: Example of the ARAKNES robot controller. Robotics and Autonomous Systems. 2014;62:1342-52.

Schendel S, Montgomery K, Sorokin A, Lionetti G. A surgical simulator for planning and performing repair of cleft lips. J Craniomaxillofac Surg. 2005;33(4):223-228.

Selber JC. Discussion: Reconstructive techniques in transoral robotic surgery for head and neck cancer: a North American survey. Plastic and reconstructive surgery. 2013;131(2):198e-9e. doi: 10.1097/PRS.0b013e318278d850. PubMed PMID: 23358014.

Selber JC. Robotic latissimus dorsi muscle harvest. Plastic and reconstructive surgery. 2011;128(2):88e-90e. doi: 10.1097/PRS.0b013e31821ef25d. PubMed PMID: 21788809.

Selber JC. Robotics in plastic surgery. Seminars in plastic surgery. 2014;28(1):3-4. doi 10.1055/s-0034-1368160. PubMed PMID: 24872772; PubMed Central PMCID: PMC3946015.

Selber JC, Sarhane KA, Ibrahim AE, Holsinger FC. Transoral robotic reconstructive surgery. Seminars in plastic surgery. 2014;28(1):35-8. doi: 10.1055/s-0034-1368166. PubMed PMID: 24872777; PubMed Central PMCID: PMC3948381.

* cited by examiner

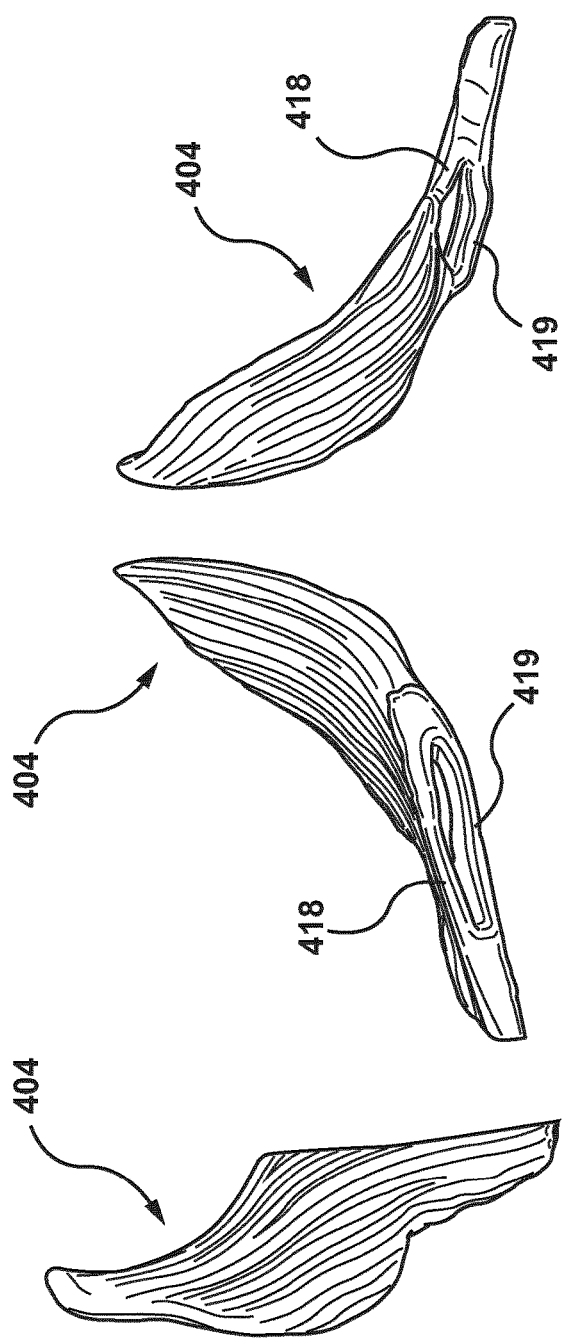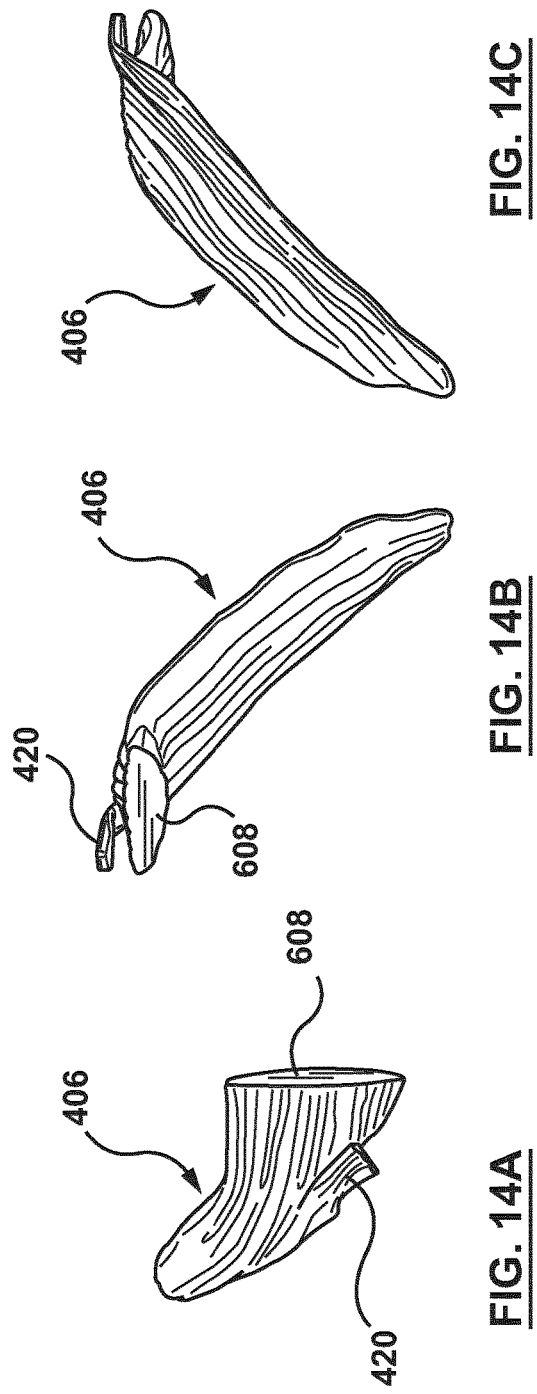

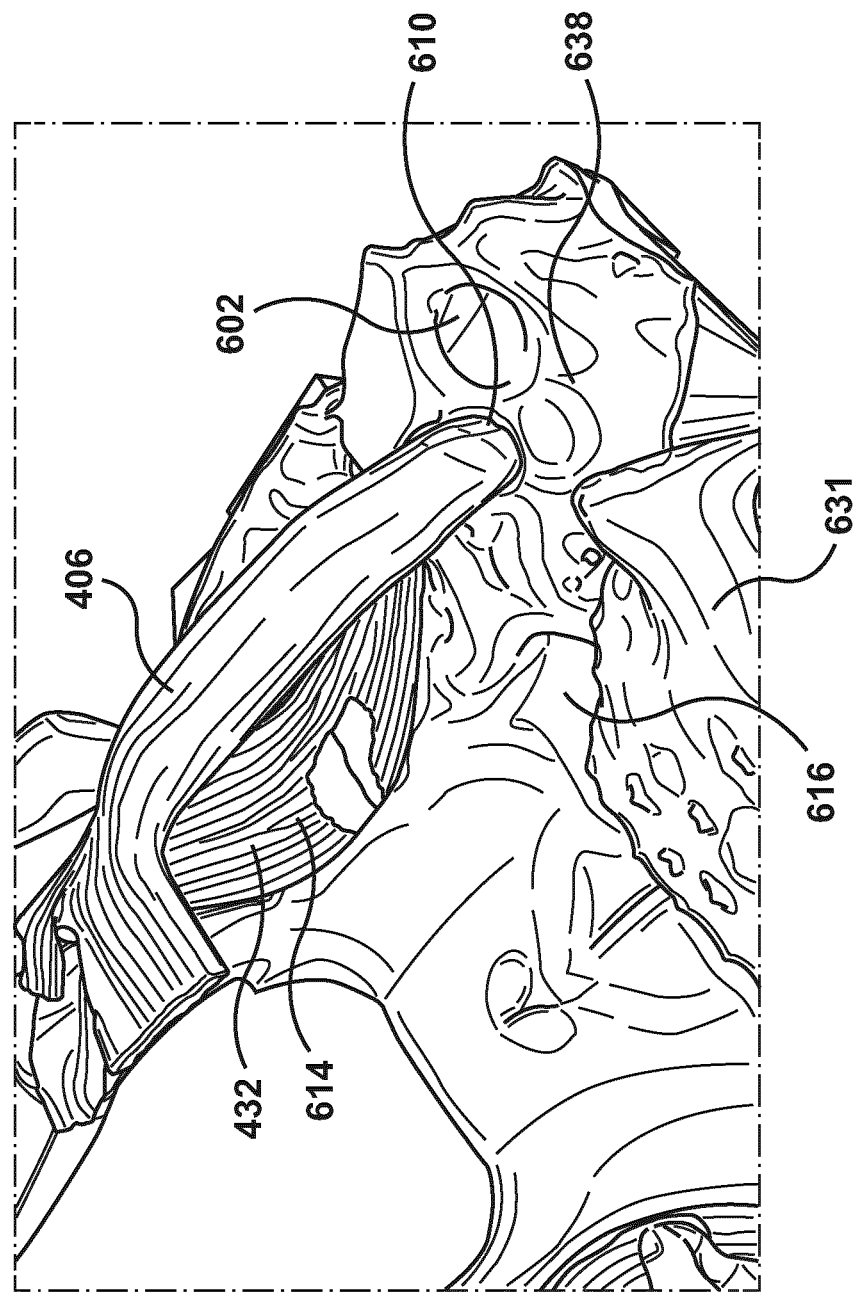

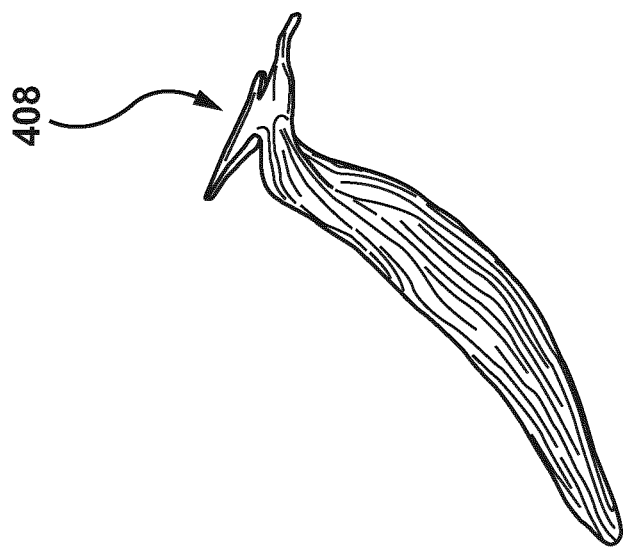
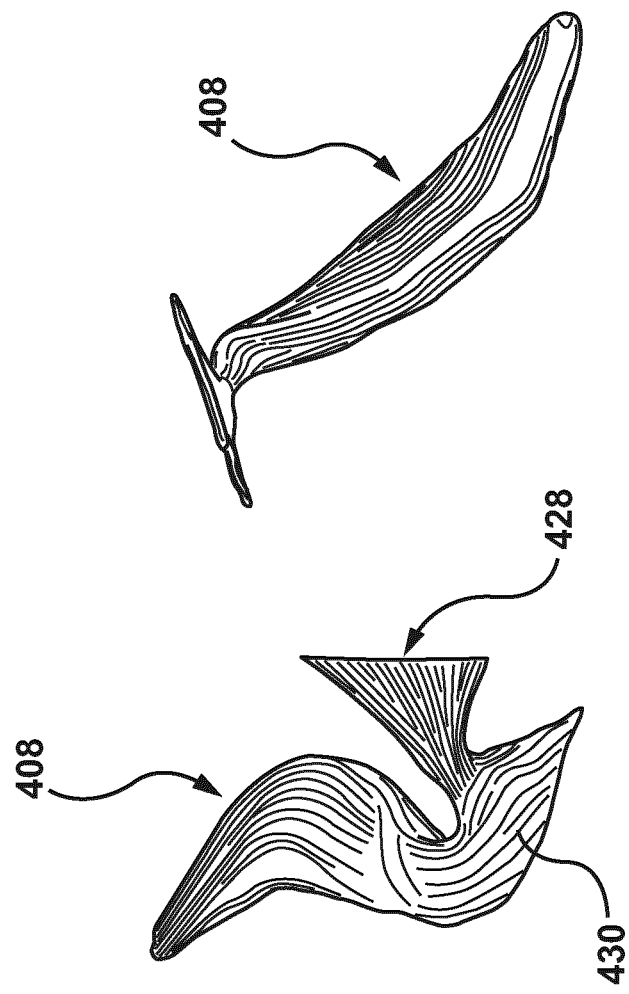
FIG. 16C
FIG. 16B
FIG. 16A

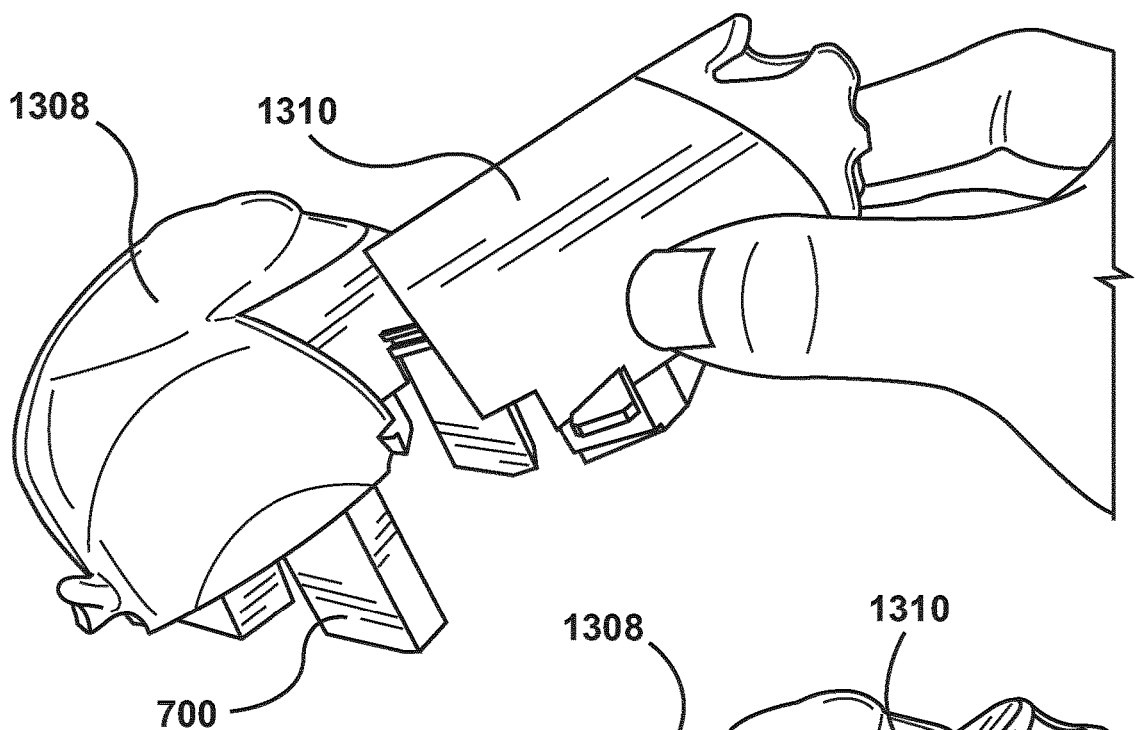
FIG. 35A
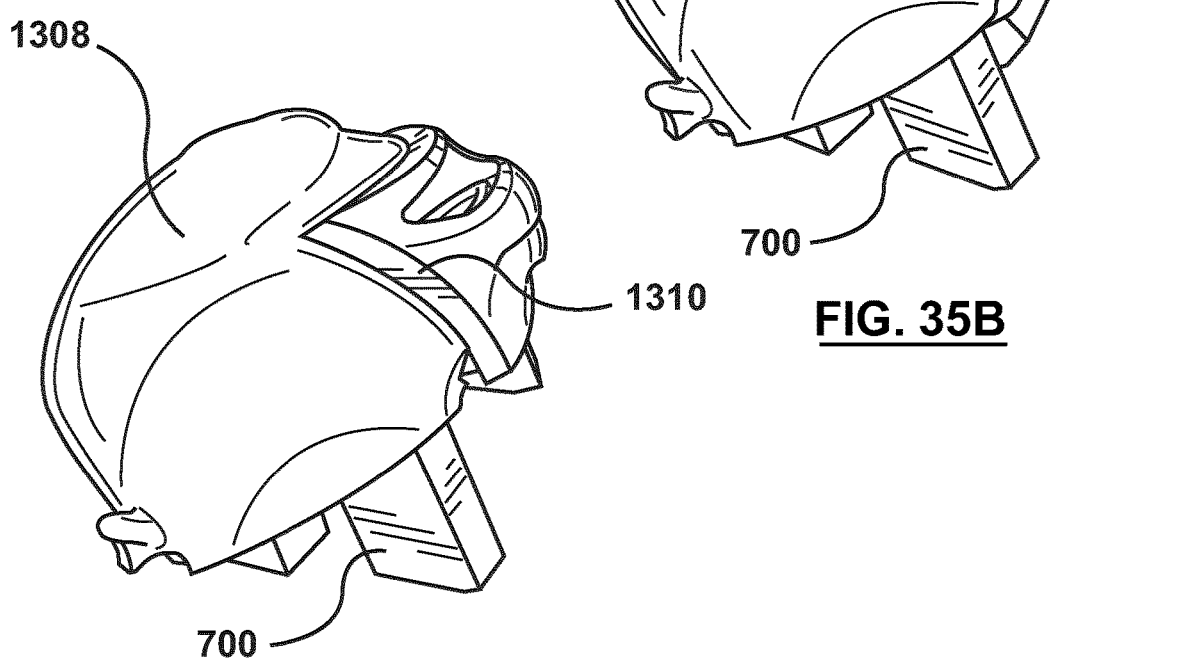
FIG. 35B
FIG. 35C

SIMULATOR FOR PRACTICING TRANS-ORAL SURGERY AND METHOD OF USE THEREOF

CROSS-REFERENCE TO RELATED APPLICATIONS

This application is a national phase entry under 35 U.S.C. §371 of International Patent Application PCT/CA2015/050927, filed Sep. 21, 2015, designating the United States of America and published in English as International Patent Publication WO 2016/109879 A1 on Jul. 14, 2016, which claims the benefit under Article 8 of the Patent Cooperation Treaty to U.S. Provisional Patent Application Ser. Nos. 62/100,150 filed Jan. 6, 2015, and 62/118,306 filed Feb. 19, 2015, which are hereby incorporated herein in their entirety by this reference.

BACKGROUND

The use of surgical simulation has increased over the past two decades (Stefanidis D., Sevdalis N., Paige J., Zevin B., Aggarwal R., Grantcharov T., et al., "Simulation in surgery: what's needed next?" *Annals of Surgery* 2015; 261(5):846-53), likely due to an increased demand for patient safety (Gerben E., Breimer V. B., Thomas Looi, James Drake, "Design and evaluation of a new synthetic brain simulator for endoscopic third ventriculostomy," *J. Neuro. Pediat.* 2015; 15:82-8), and declining trainee operative case-loads (Breimer G. E., Bodani V., Looi T., Drake J. M., "Design and evaluation of a new synthetic brain simulator for endoscopic third ventriculostomy," *J. Neuro. Pediat.* 2015; 15(1):82-8; Sheckter C. C., Kane J. T., Minneti M., Garner W., Sullivan M., Talving P., et al., "Incorporation of fresh tissue surgical simulation into plastic surgery education: maximizing extraclinical surgical experience," *J. Surg. Educ.* 2013; 70(4):466-74). In addition, there has tended to be a shift of the apprenticeship model of learning to include more objective competency-based metrics (Stefanidis D., Sevdalis N., Paige J., Zevin B., Aggarwal R., Grantcharov T., et al., "Simulation in surgery: what's needed next?" *Annals of Surgery* 2015; 261(5):846-53; Rosen J. M., Long S. A., McGrath D. M., Greer S. E., "Simulation in plastic surgery training and education: the path forward," *Plastic and Reconstructive Surgery* 2009; 123(2):729-38; discussion 39-40). This has been complemented by studies indicating that surgical simulation tends to translate into improved operating room performance (Palter V. N., Grantcharov T. P., "Individualized deliberate practice on a virtual reality simulator improves technical performance of surgical novices in the operating room: a randomized controlled trial," *Annals of Surgery* 2014; 259(3):443-8; Palter V. N., Grantcharov T. P., "Development and validation of a comprehensive curriculum to teach an advanced minimally invasive procedure: a randomized controlled trial," *Annals of Surgery* 2012; 256(1):25-32; Crochet P., Aggarwal R., Dubb S. S., Ziprin P., Rajaretnam N., Grantcharov T., et al., "Deliberate practice on a virtual reality laparoscopic simulator enhances the quality of surgical technical skills," *Annals of Surgery* 2011; 253(6):1216-22; Barsuk J. H., McGaghie W. C., Cohen E. R., O'Leary K. J., Wayne D. B., "Simulation-based mastery learning reduces complications during central venous catheter insertion in a medical intensive care unit," *Critical Care Medicine* 2009; 37(10):2697-701; Barsuk J. H., McGaghie W. C., Cohen E. R., Balachandran J. S., Wayne D. B., "Use of simulation-based mastery learning to improve the quality of central venous catheter placement in a medical intensive care unit," *Journal of Hospital Medicine* 2009; 4(7):397-403).

Simulation in plastic surgery has included both physical and computer models (Matthes A. G., Perin L. F., Rancati A., da Fonseca L., Lyra M., "Mastotrainer: new training project for breast aesthetic and reconstructive surgery," *Plastic and Reconstructive Surgery* 2012; 130(3):502e-4e; Long S. A., Stern, Carrie Scharf, Napier, Zachary, "Educational Efficacy of a Procedural Surgical Simulator in Plastic Surgery: A Phase I Multicenter Study," *Plastic and Reconstructive Surgery* 2013; 132(45-1):13; Juma A. M. V., Gunasekar; Martin, John A., "see-through in vitro tendon repair model," *Plastic and Reconstructive Surgery* 2004; 113(3):1097-8; Wanzel K. R., Matsumoto E. D., Hamstra S. J., Anastakis .D J., "Teaching technical skills: training on a simple, inexpensive, and portable model," *Plastic and Reconstructive Surgery* 2002; 109(1):258-63; Zabaneh G., Lederer R., Grosvenor A., Wilkes G., "Rhinoplasty: a hands-on training module," *Plastic and Reconstructive Surgery* 2009; 124(3):952-4). Physical models often tend to be basic, lacking complexity (Sheckter C. C., Kane J. T., Minneti M., Garner W., Sullivan M., Talving P., et al., "Incorporation of fresh tissue surgical simulation into plastic surgery education: maximizing extraclinical surgical experience," *J. Surg. Educ.* 2013; 70(4):466-74). Computer models may aid in understanding anatomy and provide decision-making drills, however, they tend not to provide the technical skill gained from practicing within a physical workspace. As such, cadaver or animal models are usually used to learn plastic surgery procedures outside of the operating room (Sheckter C. C., Kane J. T., Minneti M., Garner W., Sullivan M., Talving P., et al., "Incorporation of fresh tissue surgical simulation into plastic surgery education: maximizing extraclinical surgical experience," *J. Surg. Educ.* 2013; 70(4):466-74). However, with respect to cleft palate and cleft lip repair surgery, cadaver models tend to be virtually non-existent and animal models tend to be inaccessible.

Trans-oral surgeries, such as cleft palate repair, tend to be technically demanding procedures that require delicate tissue handling and dissection within a confined space with reduced access and visualization (Vadodaria S., Watkin N., Thiessen F., Ponniah A., "The first cleft palate simulator," *Plastic and Reconstructive Surgery* 2007; 120(1):259-61). As a result, surgeries such as cleft palate repair tend to be challenging procedures to learn with limited teaching opportunities.

Cleft palate simulators have been developed to augment operating room experience (Vadodaria S., Watkin N., Thiessen F., Ponniah A., "The first cleft palate simulator," *Plastic and Reconstructive Surgery* 2007; 120(1):259-61; Senturk S., "The simplest cleft palate simulator," *The Journal of Craniofacial Surgery* 2013; 24(3):1056; Nagy K., Mommaerts M. Y., "Advanced s(t)imulator for cleft palate repair techniques," *The Cleft Palate Craniofacial Journal: official publication of the American Cleft Palate-Craniofacial Association* 2009; 46(1):1-5; Matthews M. S., "A teaching device for Furlow palatoplasty," *The Cleft palate-craniofacial journal: official publication of the American Cleft Palate-Craniofacial Association* 1999; 36(1):64-6). However, they tend to be highly simplified and are of limited value as teaching tools.

BRIEF SUMMARY

In various aspects, embodiments of the disclosure relate to surgical simulators and, more particularly, to simulators for practicing trans-oral surgery and methods of use thereof.

According to one aspect, there is provided a simulator for practicing trans-oral surgery, comprising a simulated hard palate, a simulated soft palate musculature adjacent to the simulated hard palate, and a simulated mucosal layer covering at least a portion of the simulated hard palate and at least a portion of the simulated soft palate musculature, wherein the simulated mucosal layer is configured to conform to and follow the contours of surface features of the covered portions of the simulated hard palate and simulated soft palate musculature.

The simulated mucosal layer may be thicker over the simulated hard palate than over the simulated soft palate musculature.

The simulated mucosal layer may be attached to the simulated soft palate musculature and the simulated hard palate, and a first strength of attachment between the simulated mucosal layer and the simulated soft palate musculature may differ from a second strength of attachment between the simulated mucosal layer and the simulated hard palate. The first strength of attachment may be less than the second strength of attachment. Alternatively, the first strength of attachment may be greater than the second strength of attachment.

The simulated mucosal layer may be attached to the simulated soft palate musculature and the simulated hard palate, and the simulated hard palate may comprise a simulated hamulus, the simulator further comprising a simulated cranial base extending from the simulated hard palate, the cranial base comprising a simulated medial pterygoid plate, and the simulator further comprising a simulated superior constrictor muscle attached to the simulated hamulus and simulated medial pterygoid plate, wherein the simulated mucosal layer may be less strongly attached to the simulated superior constrictor muscle than to the simulated hard palate.

The simulated soft palate musculature may comprise a simulated palatopharyngeus muscle and a simulated tensor veli palatini muscle, the simulated tensor veli palatini muscle comprising a tensor veli palatini aponeurosis, the simulator further comprising a simulated soft tissue fatty layer located between and attached to the simulated palatopharyngeus muscle and the simulated tensor veli palatini aponeurosis, wherein the simulated soft tissue fatty layer may be less strongly attached to the simulated palatopharyngeus muscle than to the tensor veli palatini aponeurosis.

The simulated soft palate musculature may comprise one or both of a simulated palatopharyngeus muscle and a simulated levator veli palatini muscle; and at least one of a simulated tensor veli palatini muscle, a simulated palatoglossus muscle, and a simulated musculus uvula, wherein one or both of the simulated palatopharyngeus muscle and the simulated levator veli palatini muscle are made of a harder material than the at least one of a simulated tensor veli palatini muscle, a simulated palatoglossus muscle, and a simulated musculus uvula.

The simulated mucosal layer may be attached to the simulated soft palate musculature and the simulated hard palate. The simulated soft palate musculature may comprise a simulated palatopharyngeus muscle and a simulated palatoglossus muscle, and the simulated hard palate may comprise a simulated hamulus. The simulator may further comprise a simulated cranial base extending from the simulated hard palate, the simulated cranial base comprising a simulated medial pterygoid plate, and the simulator further comprising a simulated superior constrictor muscle attached to the simulated hamulus and simulated medial pterygoid plate, and wherein the simulated palatopharyngeus muscle, the simulated palatoglossus muscle and simulated superior constrictor muscle are formed as a complex.

The simulated soft palate musculature may comprise a simulated levator palatini muscle and a simulated palatopharyngeus muscle, and wherein the simulated levator palatini muscle may be attached to the simulated palatopharyngeus muscle.

The simulated soft palate musculature may comprise a simulated palatopharyngeus muscle, the simulator further comprising a simulated cranial base extending from the simulated hard palate, the simulated cranial base comprising a simulated palatopharyngeus insertion, wherein the simulated palatopharyngeus muscle may be attached to the simulated palatopharyngeus insertion.

The simulated soft palate musculature may comprise a simulated tensor veli palatini muscle that may comprise one or more simulated anterior fibers, and the simulated hard palate may comprise at least a simulated tensor veli palatini anterior fiber insertion, and wherein the one or more simulated anterior fibers may be attached to the simulated tensor veli palatini anterior fiber insertion.

The simulated soft palate musculature may comprise a simulated tensor veli palatini muscle and a simulated palatopharyngeus muscle, wherein the simulated tensor veli palatini muscle may comprise one or more simulated anterior fibers, the one or more simulated anterior fibers being attached to the simulated palatopharyngeus muscle.

The simulated soft palate musculature may comprise a simulated palatopharyngeus muscle and a simulated tensor veli palatini muscle, the simulated tensor veli palatini muscle comprising a tensor veli palatini aponeurosis, the simulator further comprising a simulated soft tissue fatty layer located between the simulated palatopharyngeus muscle and the simulated tensor veli palatini aponeurosis, the tensor veli palatini aponeurosis being embedded in the simulated soft tissue fatty layer and the simulated mucosal layer.

The simulator may further comprise a simulated pedicle attached to or embedded in the simulated hard palate.

The simulator may further comprise a simulated cranial base extending from the simulated hard palate, and wherein the simulated soft palate musculature may comprise at least a simulated levator veli palatini muscle, and the simulator further comprising a simulated eustachian tube attached to the simulated levator veli palatini muscle and to the simulated cranial base. The eustachian tube may be made of a material harder than that used for the simulated soft palate musculature or the simulated superior constrictor muscle.

The simulator may further comprise a simulated cleft in at least one of the simulated hard palate and the simulated soft palate musculature.

The simulator may further comprise a simulated oral aperture, a simulated oral cavity extending from the simulated oral aperture, two opposed simulated lateral oral cavity walls extending from the simulated oral aperture, and a simulated tongue spanning the opposed simulated lateral oral cavity walls at a first end of the walls, wherein the simulated hard palate and the simulated mucosal layer are attached to opposed simulated lateral oral cavity walls at a second end of the walls.

The simulator may form a cartridge that replaceably fits within a complete or partial simulated face.

A 3D printer may be used to create the simulator or any component thereof.

According to another aspect, there is provided a method of practicing or learning trans-oral surgery, the method comprising one or more steps of providing a simulator having a simulated hard palate, a simulated soft palate musculature adjacent to the simulated hard palate, and a simulated mucosal layer covering at least a portion of the simulated hard palate and at least a portion of the simulated soft palate musculature, wherein the simulated mucosal layer is configured to conform to and follow the contours of surface features of the covered portions of the simulated hard palate and simulated soft palate musculature, incising the simulated mucosal layer, dissecting the simulated mucosal layer away from one or both of the simulated hard palate or the simulated soft palate musculature; moving, mobilizing, or reorienting the simulated mucosal layer; moving, mobilizing, or reorienting the simulated soft palate musculature; incising the simulated soft palate musculature; suturing the simulated soft palate musculature; and suturing the simulated mucosal layer. The steps of incising, dissecting, moving, mobilizing, reorienting or suturing may be performed through the use of manual instruments, powered instruments or a surgical robot.

BRIEF DESCRIPTION OF THE FIGURES

Embodiments of the present disclosure are illustrated in the accompanying drawings, which are meant to be exemplary and not limiting, in which like reference numbers indicate like features.

FIGS. 13A-13C are, respectively, inferior, medial, and lateral views of a simulated palatopharyngeus muscle in accordance with one embodiment of this disclosure.

FIGS. 14A-14C are, respectively, inferior, medial and lateral views of a simulated levator veli palatini muscle in accordance with one embodiment of this disclosure.

FIG. 15 is a perspective view of the simulated levator veli palatini muscle of FIGS. 14A-14C attached to the simulated cranial base of FIG. 5.

FIGS. 16A-16C are, respectively, inferior, medial and lateral views of a simulated tensor veli palatini muscle in accordance with one embodiment of this disclosure.

FIGS. 35A-35C are perspective views of a cartridge being inserted into the base and partial simulated face attached thereto of FIG. 34.

DETAILED DESCRIPTION

Figure 1A:
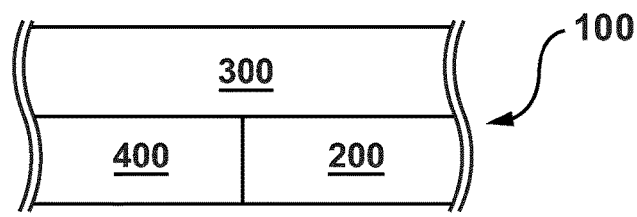
FIG. 1A is a side view diagram of a simulator for practicing trans-oral surgery in accordance with one embodiment of this disclosure.
Figure 1B:
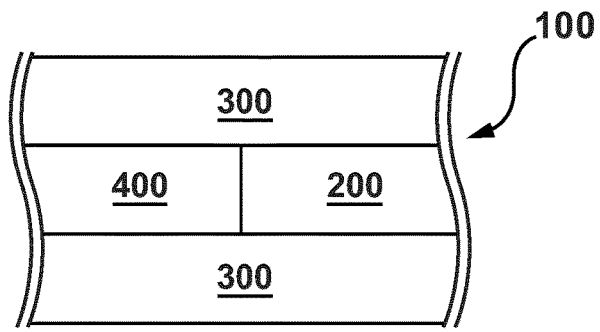
FIG. 1B is a side view diagram of a simulator for practicing trans-oral surgery in accordance with another embodiment of this disclosure.
Figure 1C:
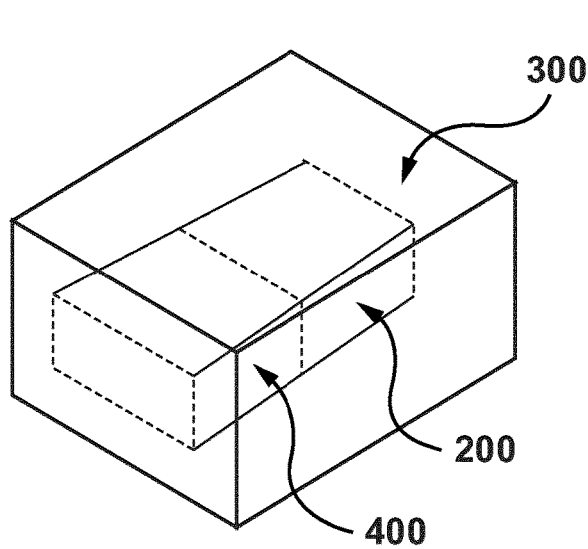
FIG. 1C is a perspective view diagram of a simulator for practicing trans-oral surgery in accordance with yet another embodiment of this disclosure.
Figure 1D:
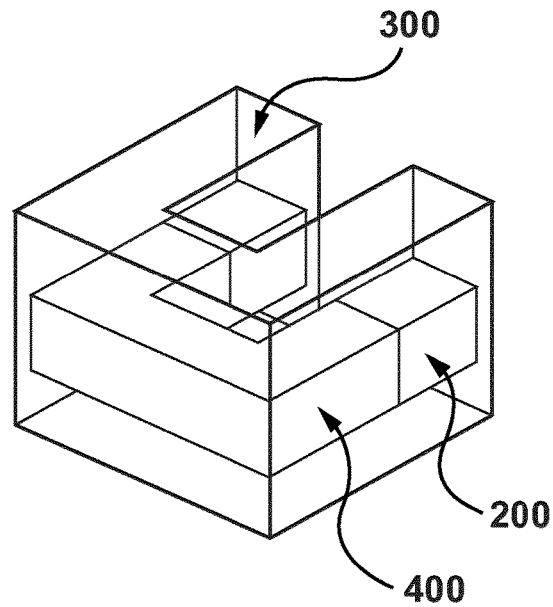
FIG. 1D is a perspective view diagram of a simulator for practicing trans-oral surgery in accordance with a further embodiment of this disclosure.

The description that follows, and the embodiments described therein, are provided by way of illustration of an example, or examples, of particular embodiments of the principles of this disclosure. These examples are provided for the purposes of explanation, and not limitation, of those principles and of the disclosure.

FIGS. 1A-1D show exemplary simulators 100 for practicing trans-oral surgery. Simulator 100 may include a simulated hard palate 200, a simulated soft palate musculature 400 adjacent to simulated hard palate 200, and a simulated mucosal layer 300 covering at least a portion of simulated hard palate 200 and at least a portion of simulated soft palate musculature 400. Simulated mucosal layer 300 may be configured to conform to and follow the contours of surface features of the covered portions of simulated hard palate 200 and simulated soft palate musculature 400. Simulated mucosal layer 300 may include a simulated oral mucosa and a simulated nasal mucosa, which in some embodiments may form a continuous layer.

In certain embodiments, simulated mucosal layer 300 may be created by pouring the material used to create simulated mucosal layer 300 over simulated hard palate 200 and simulated soft palate musculature 400 while they are turned by use of a rotational system rotating about at least one axis. This method tends to provide an even coat. Multiple layers of the material used to create simulated mucosal layer 300 may be poured to promote the appropriate or desired mucosal thickness. To provide a thicker simulated mucosal layer 300 over simulated hard palate 200 as compared to over simulated soft palate musculature 400, the two may be placed on a rotational system with a slight downward tilt toward the simulated hard palate 200 while the material used to create the simulated mucosal layer 300 is poured. In some embodiments, the thickness of simulated mucosal layer 300 over simulated hard palate 200 may be between 2 mm and 4 mm, whereas the thickness of simulated mucosal layer 300 over simulated soft palate musculature 400 may be between 0.5 mm and 2 mm. In some embodiments, the portion of simulated mucosal layer 300 covering at least a portion of simulated hard palate 200 may be of the same firmness or of a different firmness as compared to the portion of simulated mucosal layer 300 covering simulated soft palate musculature 400. In some embodiments, simulator 100 may comprise simulated dimple area 302 in simulated mucosal layer 300 (see, for example, FIG. 4).

The strength of attachment between simulated mucosal layer 300 and simulated soft palate musculature 400 may differ from the strength of attachment between simulated mucosal layer 300 and simulated hard palate 200. In certain embodiments, simulated mucosal layer 300 may be less strongly attached to simulated soft palate musculature 400 than to simulated hard palate 200. For example, the amount of force required to dissect simulated mucosal layer 300 from the simulated soft palate musculature 400 may be less than the amount of force required to dissect simulated mucosal layer 300 from simulated hard palate 200. In other embodiments, simulated mucosal layer 300 may be more strongly attached to simulated soft palate musculature 400 than to simulated hard palate 200.

In some embodiments, an attachment agent may be used to attach simulated mucosal layer 300 to simulated soft palate musculature 400. The same attachment agent or a different attachment agent, can be used to attach simulated mucosal layer 300 to simulated hard palate 200. As used herein, an attachment agent may refer to one or more of an adhesive, release agent, soft material (such as silicone or a polymer), hard material (such as an adhesive, release agent or polymer that cures as a hard substance) or any combination thereof. For example, an attachment agent may comprise an adhesive such as a glue mixed with a release agent. An attachment agent may be applied using any means, such as manually or by use of a 3D printer.

In embodiments where simulated mucosal layer 300 is less strongly attached to simulated soft palate musculature 400 than to simulated hard palate 200, simulated hard palate 200 may be made of a hard material with properties simulating a biological hard palate (such as polylactic acid or acrylonitrile butadiene styrene plastic) and a portion of it (such as the area enclosed by the dot-dash line in FIG. 2 or the area enclosed by the dot-dash line of FIG. 38) may be coated with shellac (such as Zinsser Bulls Eye Shellac). Simulated soft palate musculature 400 may be made of a soft material with properties simulating biological soft palate musculature (such as silicone, which can be SMOOTH- ON® FX-PRO®, ECOFLEX® 20 or ECOFLEX® 30), and a portion of it (such as the area enclosed by the dot-dash line in FIG. 3) may be coated with a release agent (such as a mold release, which can be Ease Release 200). The simulated mucosal layer 300 may be made of a soft material with properties simulating biological mucosa (such as silicone, which can be ECOFLEX® 20 or ECOFLEX® 30). In some embodiments, to match the high Young's Modulus of the oral mucosa, a flexible high transparency wire mesh sheet may be added to the simulated mucosal layer 300 during mucosal development.

In some embodiments, the portion of simulated mucosal layer 300 covering simulated hard palate 200 may be of a different firmness than the portion of simulated mucosal layer 300 covering simulated soft palate musculature 400. For example, the portion of simulated mucosal layer 300 covering simulated hard palate 200 may be firmer than the portion of simulated mucosal layer 300 covering simulated soft palate musculature 400. In alternate embodiments, the portion of simulated mucosal layer 300 covering simulated hard palate 200 may be less firm than the portion of simulated mucosal layer 300 covering simulated soft palate musculature 400.

Figure 2:
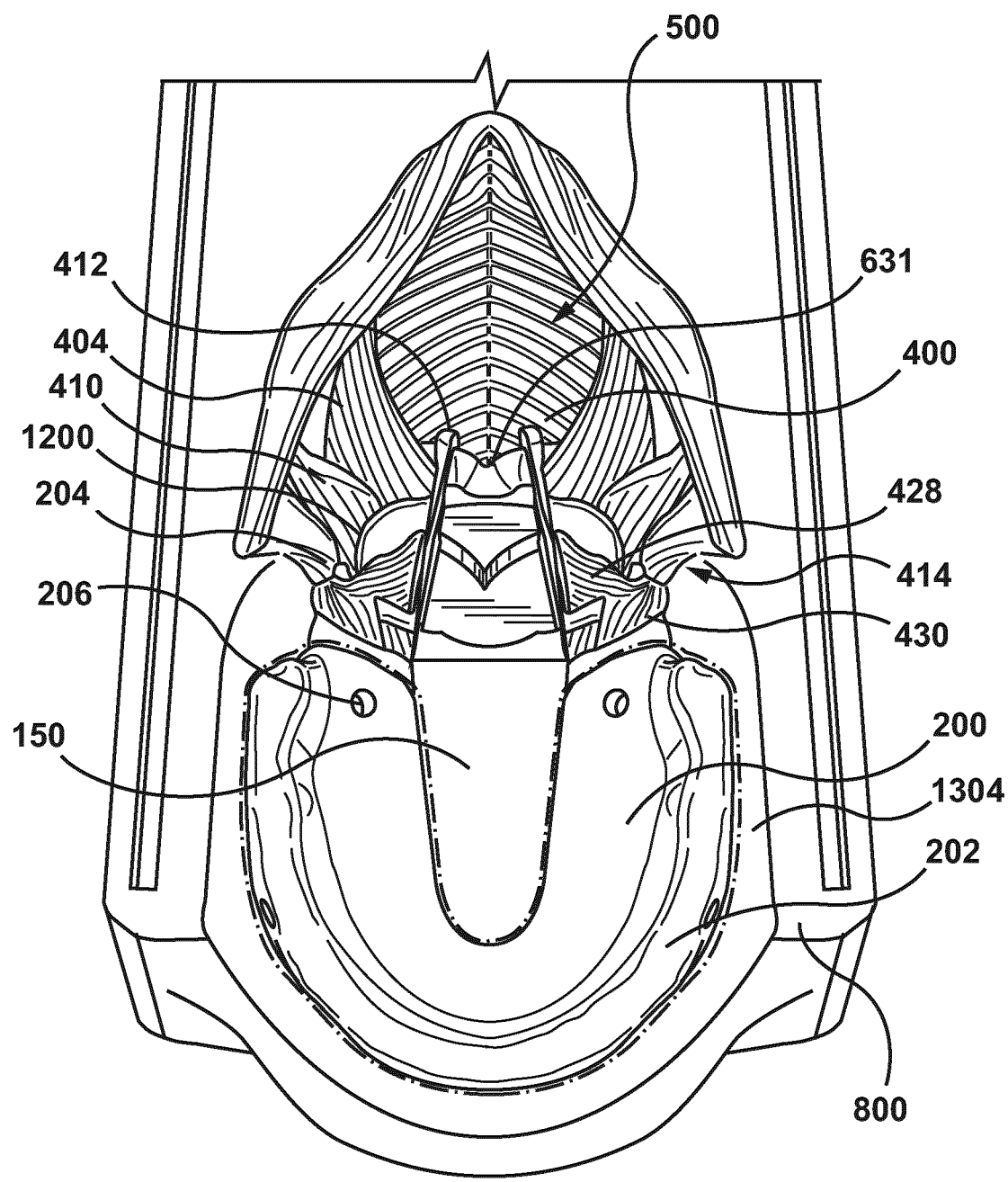
FIG. 2 is a perspective view of a simulated soft palate musculature and a simulated hard palate, showing a portion of the simulated hard palate enclosed by a dot-dash line to be coated with an attachment agent in accordance with one embodiment of this disclosure.
Figure 3:
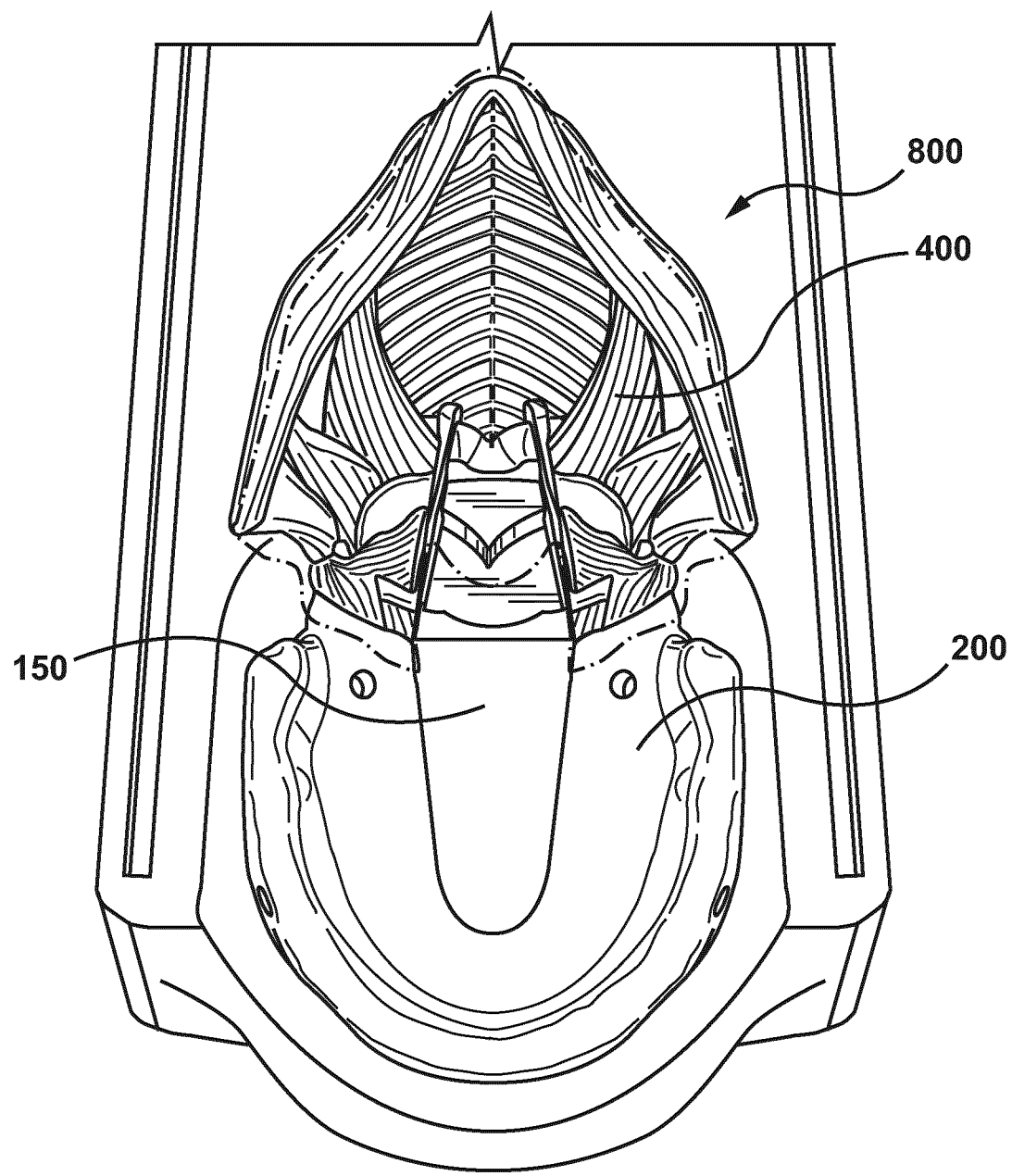
FIG. 3 is a perspective view of the simulated soft palate musculature and the simulated hard palate of FIG. 2, showing a portion of the simulated soft palate musculature enclosed by a dot-dash line to be coated with an attachment agent in accordance with one embodiment of this disclosure.
Figure 4:
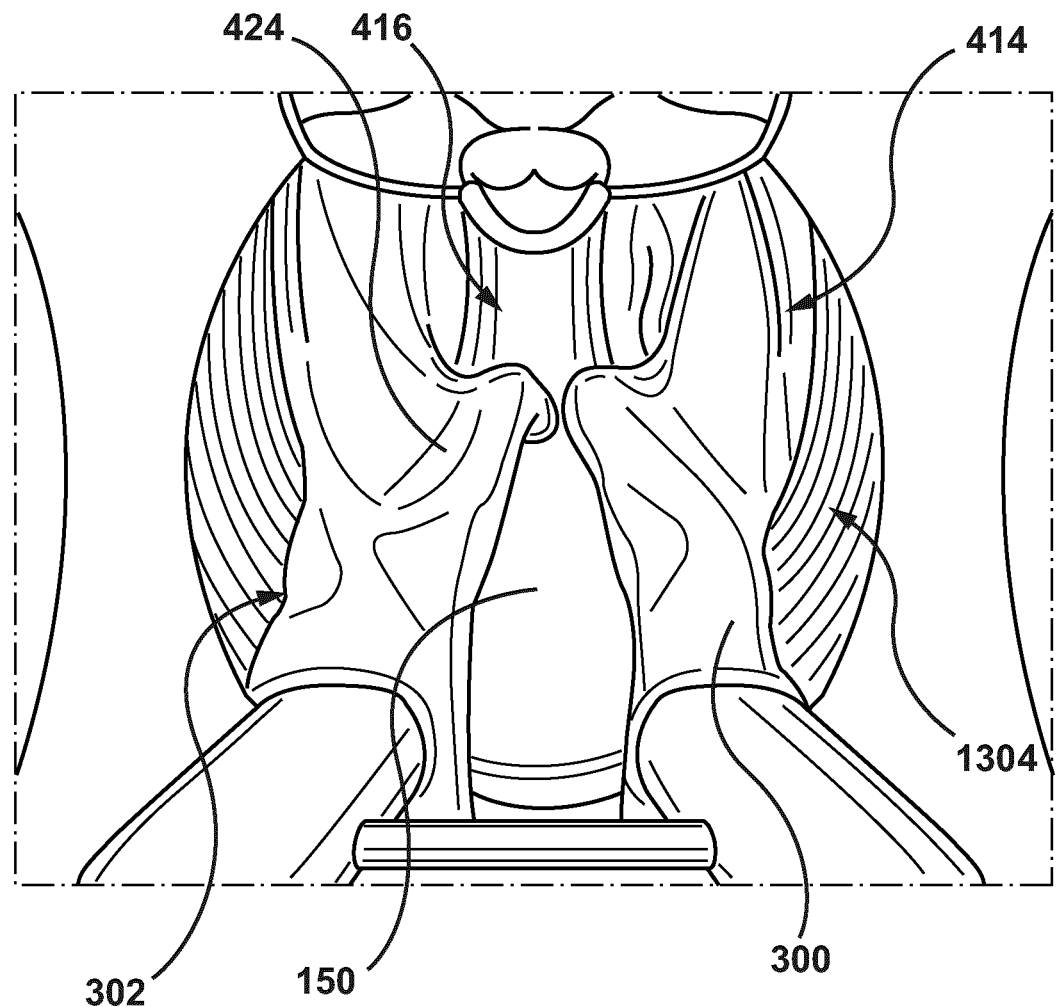
FIG. 4 is a perspective view of a mucosal layer attached to the simulated soft palate musculature and the simulated hard palate of FIGS. 2 and 3.

In certain embodiments, simulator 100 may comprise a simulated cleft 150 in at least one of simulated hard palate 200 and simulated soft palate musculature 400 (see, for example, FIGS. 2-4). Simulated cleft 150 may come in a variety of shapes and types, such as incomplete lip only, lip and alveolus, lip and primary palate, lip and palate, incomplete secondary palate behind hard-soft junction, incomplete secondary palate into the hard palate, complete secondary palate, complete primary palate and incomplete secondary palate, unilateral cleft lip and palate, bilateral cleft lip and primary palate only, bilateral cleft lip and palate and cleft palate only, or other combinations of the foregoing. For example, simulated cleft 150 may at the greatest extent be approximately 8 mm. Other sizes of simulated clefts may be provided in other embodiments, such as below 8 mm or over 8 mm.

Figure 5:
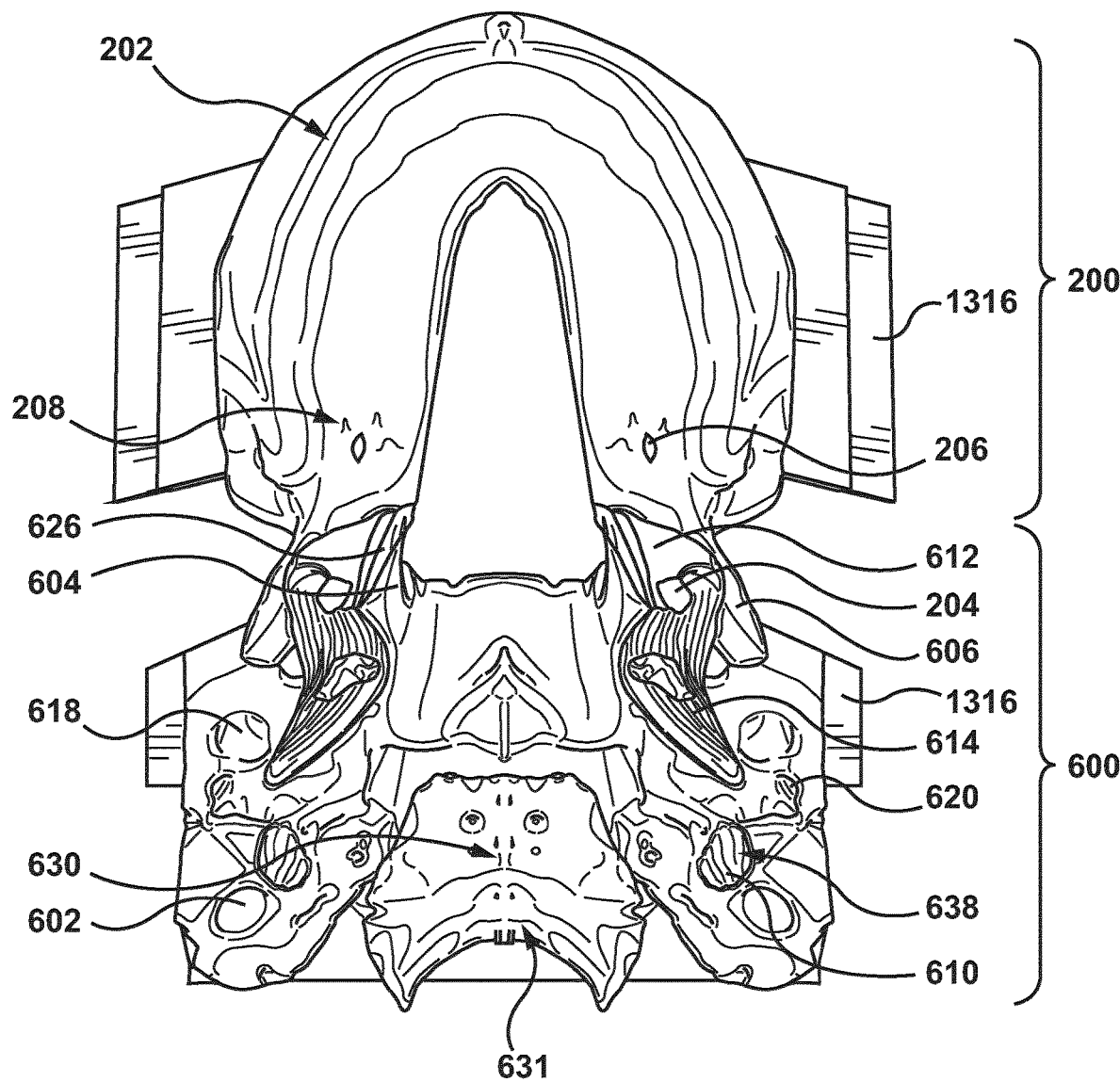
FIG. 5 is a top view of a simulated hard palate and a simulated cranial base in accordance with one embodiment of this disclosure.

As seen in FIG. 5, the simulated hard palate 200 may comprise one or more of a simulated alveolus 202, a simulated hamulus 204, a simulated greater palatine foramen 206, a simulated tensor veli palatini anterior fiber insertion 612, a simulated bony spike 208 beside the greater palatine foramen, or a combination thereof. Simulated greater palatine foramen 206 can be anterior to simulated hamulus 204.

Simulated hard palate 200 may be made of a hard material that is resistant to deformation with properties simulating a biological hard palate (such as polylactic acid, acrylonitrile butadiene styrene plastic, hard plastic, ceramic, metal). In some embodiments, simulated hard palate 200 can be made using a 3D printer, such as an extrusion, light polymerized, powder bed, laminated or wire-type 3D printer.

Figure 6:
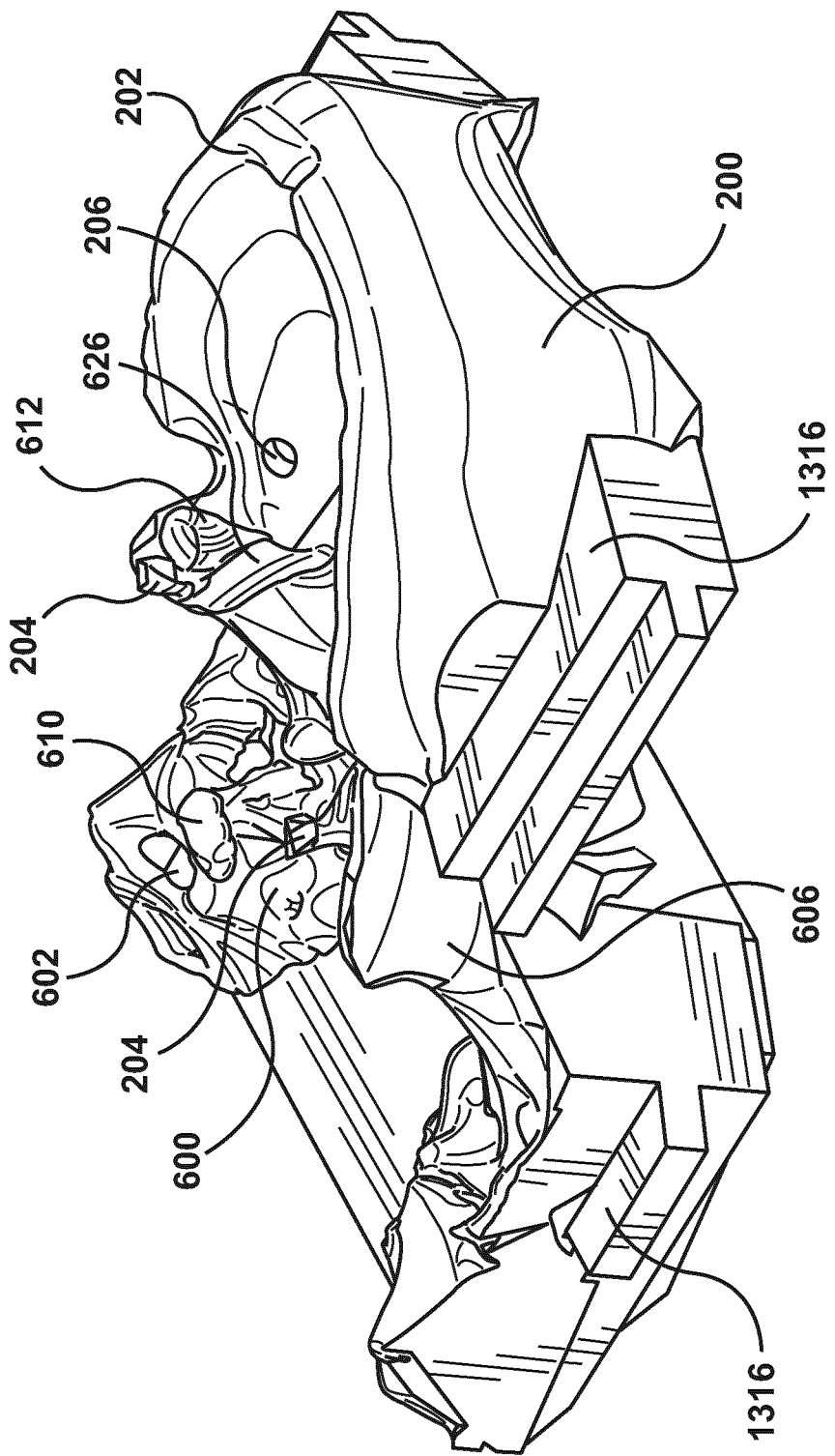
FIG. 6 is a perspective view of a simulated hard palate and simulated cranial base in accordance with another embodiment of this disclosure.
Figure 7:
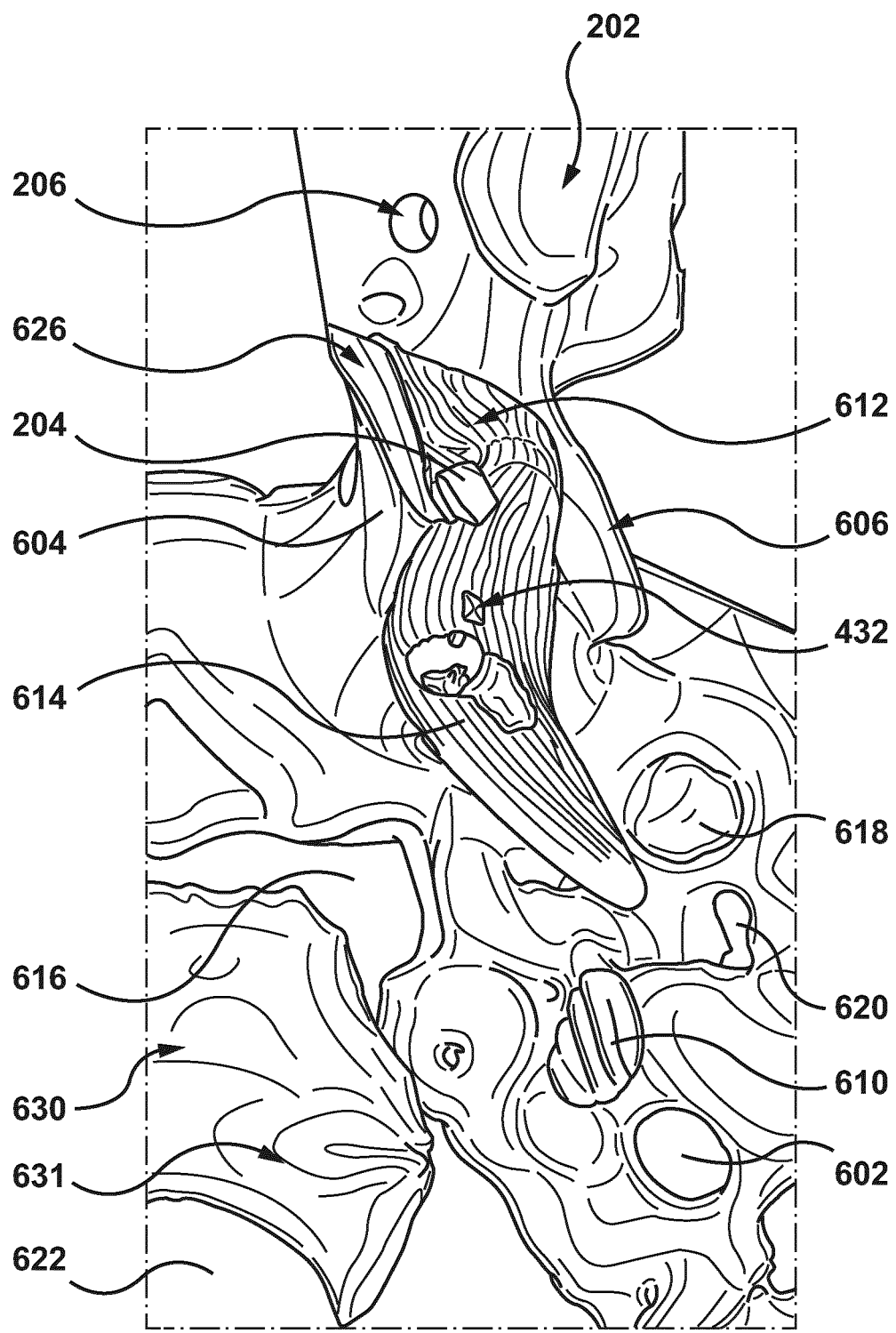
FIG. 7 is an enlarged fragmentary top view of the hard bony palate and simulated cranial base of FIG. 5.
Figure 8:
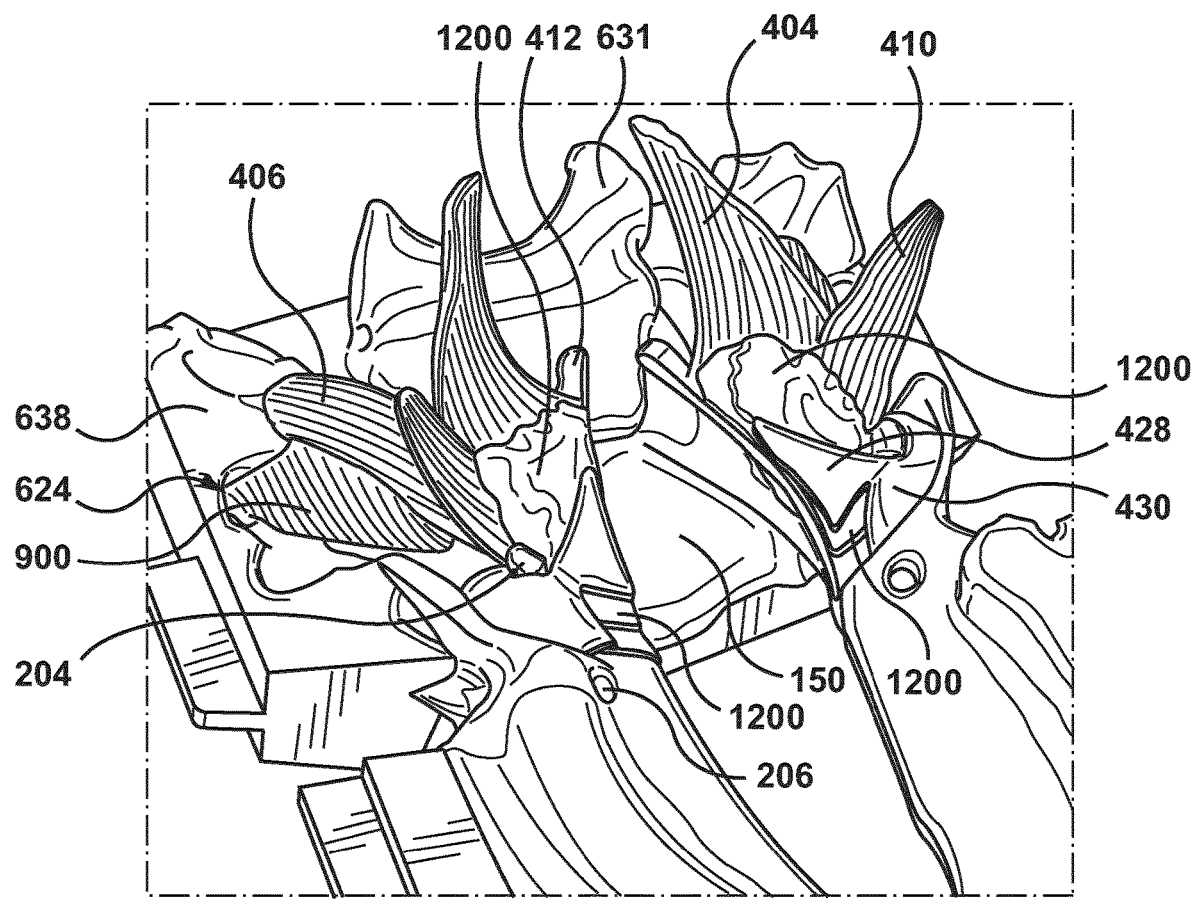
FIG. 8 is a perspective view of a simulated soft palate musculature attached to the simulated cranial base of FIG. 5 in accordance with one embodiment of this disclosure.

Simulator 100 may also include a simulated cranial base 600 extending from simulated hard palate 200, as seen in FIGS. 5 and 6. As seen in FIGS. 5-7, simulated cranial base 600 may comprise one or more of a simulated carotid canal 602, a simulated medial pterygoid plate 604, a simulated lateral pterygoid plate 606, a simulated levator veli palatini insertion 608, a simulated levator veli palatini origin 610, a simulated tensor veli palatini origin 614, a simulated foramen lacerum 616, a simulated foramen ovale 618, a simulated foramen spinosum 620, a simulated foramen magnum 622, a simulated bony origin of the eustachian tube 624, a simulated palatopharyngeus insertion 626, a simulated palatopharngeus origin 627, a simulated pharyngeal tubercle 630, or a combination thereof In some embodiments, simulated cranial base 600 may extend to the level of simulated carotid canal 602, which is a landmark just posterior to the simulated levator veli palatini origin 610. Thus, part of the petrous component of a simulated temporal bone 638 may be included in simulator 100.

Simulated cranial base 600 may be made of a hard material that is resistant to deformation with properties simulating a biological cranial base (such as polylactic acid, acrylonitrile butadiene styrene plastic, hard plastic, ceramic, metal). In some embodiments, simulated cranial base 600 can be made using a 3D printer, such as an extrusion, light polymerized, powder bed, laminated or wire-type 3D printer.

As seen in FIGS. 8-12, simulated soft palate musculature 400 can comprise one or more of a simulated palatopharyngeus muscle 404, a simulated levator veli palatini muscle 406, a simulated tensor veli palatini muscle 408, a simulated palatoglossus muscle 410, a simulated musculus uvula 412, or a combination thereof.

In some embodiments, the above-described components of the simulated soft palate musculature 400 can be formed separately and adhered together as described below. For example, a distinct simulated palatopharyngeus muscle 404, a distinct simulated levator veli palatini muscle 406, a distinct simulated tensor veli palatini muscle 408, a distinct simulated palatoglossus muscle 410, a distinct simulated musculus uvula 412, and a distinct simulated superior constrictor muscle 500 (further described below) may be attached to each other so as to emulate dissection planes. As another example, a distinct simulated palatopharyngeus muscle 404 and a distinct simulated palatoglossus muscle 410 may be attached so as to emulate dissection planes to a distinct simulated superior constrictor muscle 500.

In other embodiments, any combination of the above components of the simulated soft palate musculature 400 may be formed as a complex, which tends to simulate the integration of muscles as occurs in nature. For example, simulated palatopharyngeus muscle 404, simulated palatoglossus muscle 410 and simulated superior constrictor muscle 500 may be formed as a complex, which tends to simulate the integration of the three muscles as occurs in nature. In another embodiment, simulated palatoglossus muscle 410 may be distinct, while simulated palatopharyngeus muscle 404, simulated levator veli palatini muscle 406, simulated tensor veli palatini muscle 408 and simulated musculus uvula 412 are formed as a single unit. In yet another embodiment, simulated palatoglossus muscle 410 and simulated palatopharyngeus muscle 404 may each be distinct and glued to a complex that consists of simulated levator veli palatini muscle 406, simulated tensor veli palatini muscle 408 and simulated musculus uvula 412. In still further embodiments, the whole of simulated soft palate musculature 400 may be formed as a single complex.

In certain embodiments, the components of simulated soft palate musculature 400 are made of a soft material with properties simulating a biological soft palate musculature. In certain embodiments, the components of simulated soft palate musculature 400 may be made of a material that is less firm, equally firm, or firmer than that used for simulated mucosal layer 300. For example, the components of simulated soft palate musculature 400 may be made of a natural polymeric material or a synthetic polymeric material. Natural polymeric materials can include shellac, amber, wool, silk, natural rubber, and cellulose. Synthetic polymers can include synthetic rubber, phenol formaldehyde resin, neoprene, nylon, polyvinyl chloride, polystyrene, polyethylene, polypropylene, polyacrylonitrile, polyvinyl butyral, or silicone. In embodiments where silicone is used, the silicone may be SMOOTH-ON® ECOFLEX® 20 or SMOOTH-ON® ECOFLEX® 30. In certain embodiments, one or both of simulated palatopharyngeus muscle 404 and simulated levator veli palatini muscle 406 may be made of a harder material than the other components of simulated soft palate musculature 400. For example, simulated palatopharyngeus muscle 404 or simulated levator veli palatini muscle 406 may be made of SMOOTH-ON® ECOFLEX® 30 or SMOOTH-ON® ECOFLEX® 50 or SMOOTH-ON® DRAGON SKIN® 10-30 or FX-PRO®. In further embodiments, the individual components of simulated soft palate musculature 400 may be made of materials of different colors to allow one to visually distinguish the components from one another. In some embodiments, simulated soft palate musculature 400 can be made using a 3D printer, such as an extrusion, light polymerized, powder bed, laminated or wire-type 3D printer.

Figure 21:
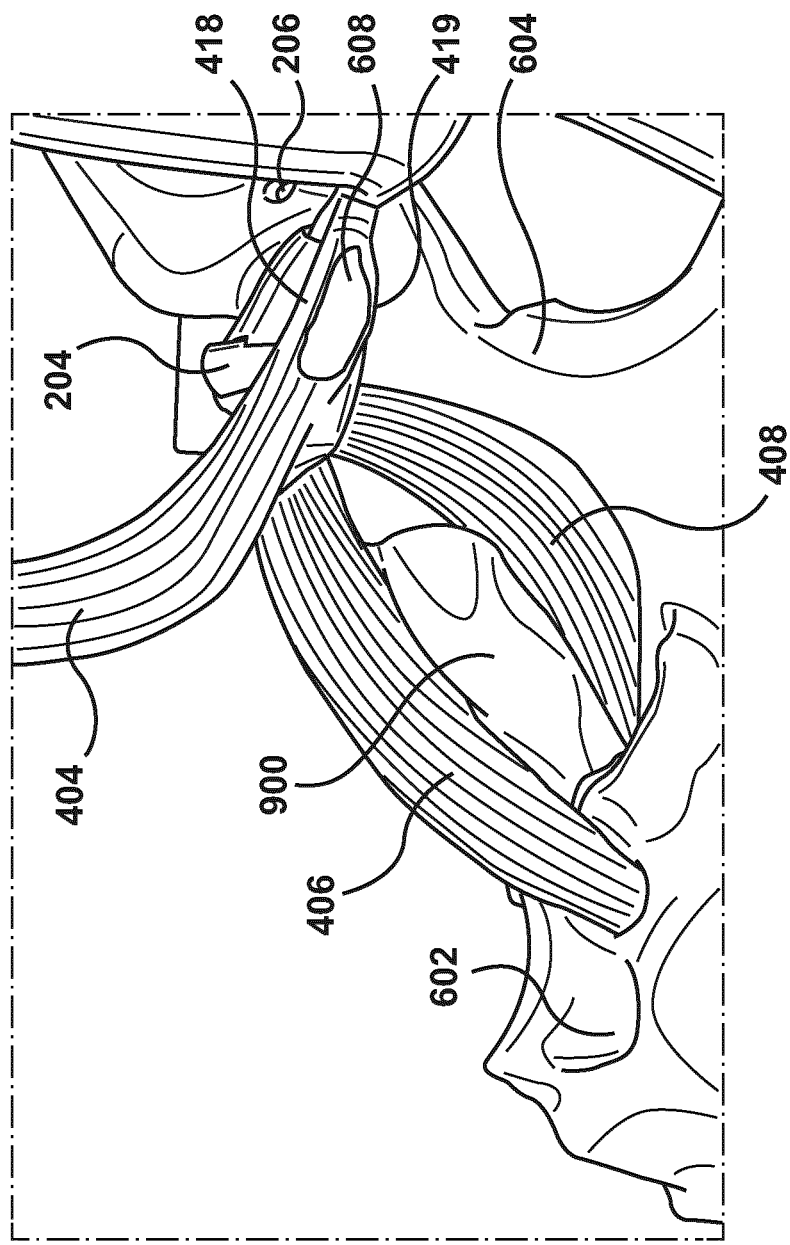
FIG. 21 is a perspective view showing a simulated eustachian tube and a simulated soft palate musculature attached to the simulated hard palate and simulated cranial base of FIG. 5 in accordance with one embodiment of the disclosure.
Figure 22:
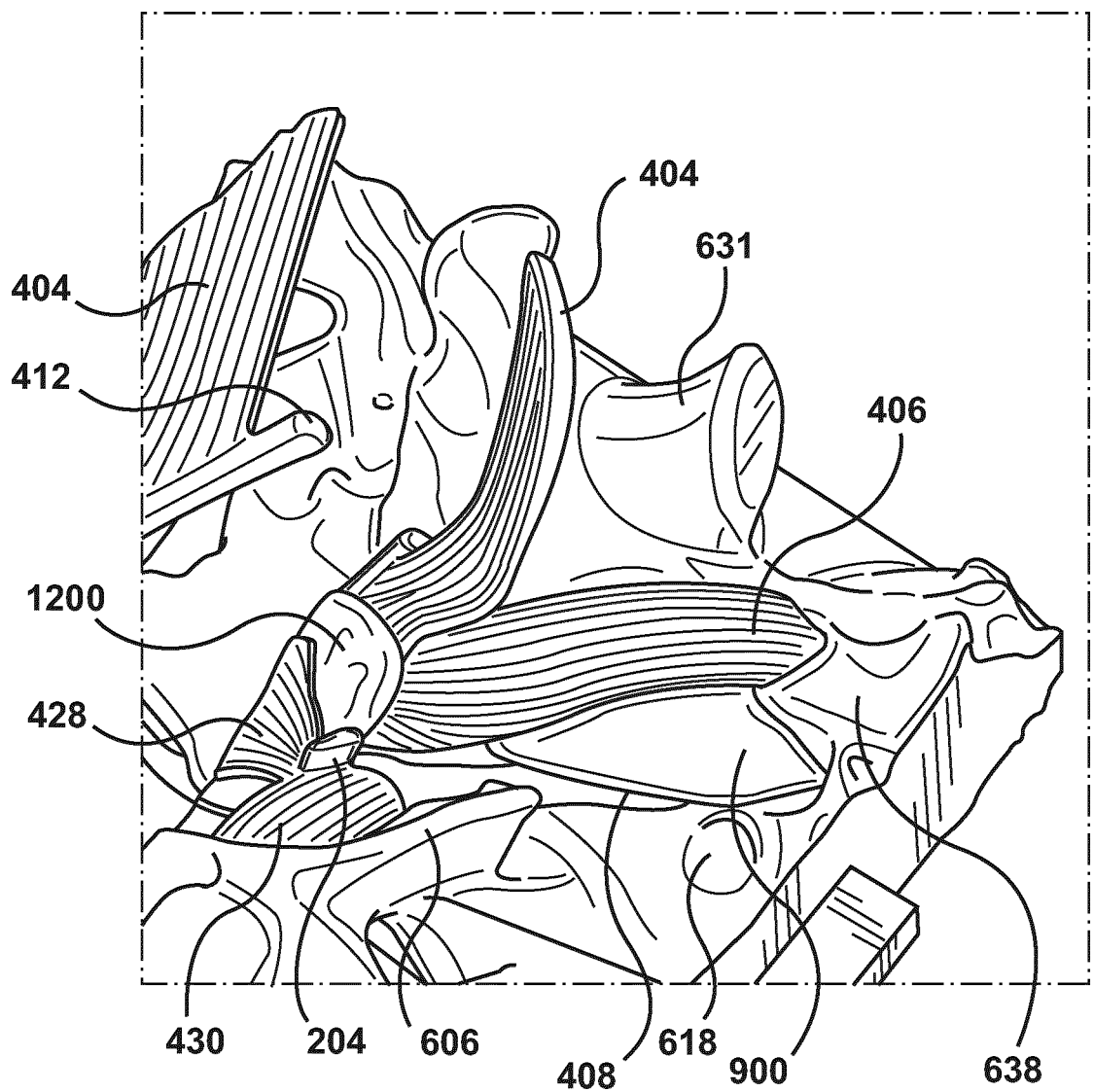
FIG. 22 is a perspective view showing a simulated eustachian tube and a simulated soft palate musculature attached to the simulated hard palate and simulated cranial base of FIG. 5 in accordance with one embodiment of this disclosure.

As seen in FIGS. 8-13, simulated palatopharyngeus muscle 404 may be attached to the simulated superior constrictor muscle 500 at a simulated palatopharyngeus origin inset 627 that attaches to simulated superior constrictor muscle 500. Simulated palatopharyngeus muscle 404 may have a simulated nasal head 419. Simulated palatopharyngeus muscle 404 may also have a simulated oral head 418 that is thicker and more developed than simulated nasal head 419, as seen, for example, in FIGS. 10 and 21. In certain embodiments, as seen, for example, in FIG. 9, simulated palatopharyngeus muscle 404 may only have simulated oral head 418 located on the oral side of simulated levator veli palatini muscle 406. In alternative embodiments, as seen, for example, in FIG. 10 and FIG. 21, palatopharyngeus muscle 404 may have simulated oral head 418 and simulated nasal head 419 clasp simulated levator veli palatini muscle 406 before inserting into the simulated hard palate 200. Lateral and anterior to simulated levator veli palatini muscle 406, simulated oral head 418 and simulated nasal head 419 come together and traverse into a broad sheet of muscle in the lateral and anterior direction to intermingle with a simulated superior constrictor muscle 500 and simulated palatopharyngeus insertion 626. Palatopharyngeus muscle 404 may be attached to simulated palatopharyngeus insertion 626. Simulated palatopharyngeus muscle 404 may also be adhered to the simulated superior constrictor muscle 500 at a simulated palatopharyngeus origin inset 627. Adhesion can be sufficiently strong such that when one dissects simulated mucosa layer 300 away from simulated palatopharyngeus muscle 404, simulated palatopharyngeus muscle 404 remains attached to simulated palatopharyngeus insertion 626. This can be done, for example, by using mechanical fasteners (such as screws or nails or pins), a polymer, or glue (such as LOCTITE® 4851 cyanoacrylate glue).

As shown in FIGS. 8-12 and 14-15, simulated levator veli palatini muscle 406 may traverse from simulated cranial base 600 toward simulated soft palate musculature 400. The muscle bundle outside of the simulated soft palate musculature 400 can descend anteriorly and medially from the simulated cranial base 600 toward the simulated soft palate musculature 400 as a cylindrical muscle. Simulated levator veli palatini origin 610 may run from the apical portion of the petrous component of simulated temporal bone 638 and from the edge of simulated carotid canal 602 and a simulated eustachian tube 900. Simulated levator veli palatini muscle 406 may gently spiral as it approaches the midline. Simulated levator veli palatini muscle 406 may occupy the gap between simulated superior constrictor muscle 500 and simulated cranial base 600. As simulated levator veli palatini muscle 406 enters the simulated soft palate musculature 400, it can fan out between simulated oral head 418 and simulated nasal head 419 of simulated palatopharyngeus muscle 404. Within simulated soft palate musculature area 400, simulated levator veli palatini muscle 406 may occupy approximately 50% of the length. The simulated levator veli palatini origin 610 may be anteromedial to simulated carotid canal 602. Simulated anterolateral fibers 420 of simulated levator veli palatini muscle 406 may run from the inferior third of simulated levator veli palatini muscle 406 toward simulated hamulus 204 and simulated tensor veli palatini aponeurosis 428. Simulated levator veli palatini origin 610 may be adhered to simulated cranial base 600. Simulated levator veli palatini insertion 608 may be adhered to one or both of simulated oral head 418 and simulator nasal head 419 of simulated palatopharyngeus muscle 404. Adhesion of simulated levator veli palatini origin 610 to simulated cranial base 600 can be sufficiently strong such that they remain attached during dissection. Adhesion of levator veli palatini insertion 608 to simulated palatopharyngeus muscle 404 may be strong enough to prevent detachment during dissection in some embodiments, or weak enough in other embodiments to allow for dissection of simulated levator veli palatini muscle 406 from simulated palatopharyngeus muscle 404. This can be done, for example, by using mechanical fasteners (such as screws or nails or pins), a polymer, or glue (such as LOCTITE® 4851 cyanoacrylate glue).

As shown in FIGS. 8-12 and 16-17, simulated tensor veli palatini muscle 408 may split into a simulated tensor veli palatini aponeurosis 428 and one or more simulated anterior fibers 430 as it passes by simulated hamulus 204. Simulated tensor veli palatini aponeurosis 428 may be a thin fascial layer that traverses medially toward simulated medial cleft margin 450 of the simulated soft palate musculature 400. Simulated anterior fibers 430 may spiral off simulated tensor veli palatini muscle 408 anteriorly and medially after simulated tensor veli palatini muscle 408 passes by simulated hamulus 204 and may insert into simulated tensor veli palatini anterior fiber insertion 612 and simulated palatopharyngeus insertion 626. Simulated tensor veli palatini muscle 408 may originate in the simulated scaphoid fossa 432 near the superior end of simulated medial pterygoid plate 604. Simulated tensor veli palatini muscle 408 can descend vertically like an inverted triangle and then curve around simulated hamulus 204 where the one or more simulated anterior fibers 430 traverse anteriorly toward the simulated tensor veli palatini anterior fiber insertion 612 and then the simulated tensor veli palatini aponeurosis 428, which fans out toward simulated medial cleft margin 450. Simulated tensor veli palatini origin 614 may be adhered to simulated cranial base 600, simulated scaphoid fossa 432, or simulated hamulus 204. Simulated anterior fibers 430 may be adhered to the simulated tensor veli palatini anterior fiber insertion 612 and to the lateral side of simulated palatopharyngeus muscle 404. Simulated tensor veli palatini aponeurosis 428 may be embedded with simulated mucosal layer 300, and may also be adhered to a simulated soft tissue fatty layer 1200 (described below). Adhesion can be sufficiently strong such that during dissection, simulated tensor veli palatini aponeurosis 428 remains attached to simulated soft tissue fatty layer 1200. This can be done, for example, by using mechanical fasteners (such as screws, nails or pins), a polymer, or glue (such as LOCTITE® 4851 cyanoacrylate glue).

In some embodiments, simulated levator veli palatini muscle 406 and simulated tensor veli palatini muscle 408 are attached respectively to the simulated levator veli palatini origin 610 and simulated tensor veli palatini origin 614.

As seen in FIGS. 8-12 and 18, simulated palatoglossus muscle 410 represents the anterior tonsillar pillar. Simulated palatoglossus muscle 410 may be connected to the simulated soft palate musculature 400 and simulated hamulus 204 superiorly and traverse inferiorly and anteriorly toward a base of a simulated tongue 1306 (described below) attaching to simulated superior constrictor muscle 500. Simulated palatoglossus muscle 410 may be assembled after simulated superior constrictor muscle 500 is added. Simulated palatoglossus origin 640 may be adhered to simulated superior constrictor muscle 500. Adhesion can be sufficiently strong such that during dissection, simulated palatoglossus origin 640 remains attached to simulated superior constrictor muscle 500. This can be done, for example, by using mechanical fasteners (such as screws, nails or pins), a polymer, or glue (such as LOCTITE® 4851 cyanoacrylate glue).

Simulated musculus uvula 412, seen in FIGS. 8-12, may, in some embodiments, be attached to simulated palatopharyngeus muscle 404. This can be done, for example, by using mechanical fasteners (such as screws, nails or pins), a polymer, or glue (such as LOCTITE® 4851 cyanoacrylate glue). In other embodiments, simulated musculus uvula 412 may be formed as a complex with simulated palatopharyngeus muscle 404.

In some embodiments, simulator 100 may comprise a simulated superior constrictor muscle 500. As seen in FIGS. 8-12 and 19-20, simulated superior constrictor muscle 500 represents a flat sheet of muscle that originates at simulated hamulus 204 and the inferior third of simulated medial pterygoid plate 604. This origin extends inferior along a simulated pterygomandibular ligament 414. From the simulated pterygomandibular ligament 414, simulated superior constrictor muscle 500 may circle posteriorly to envelope the simulated pharynx 416 at the level of the mouth. Simulated superior constrictor muscle 500 may insert into the simulated pharyngeal tubercle 630 of the simulated occipital bone 631 in the midline raphe of the simulated pharynx 416. In certain embodiments, simulated superior constrictor muscle 500 is made of a soft material with properties simulating a biological superior constrictor muscle. In certain embodiments, simulated superior constrictor muscle 500 may be made of a material that is less firm or more firm than that used for simulated mucosal layer 300. For example, simulated superior constrictor muscle 500 may be made of a natural polymeric material or a synthetic polymeric material. Natural polymeric materials can include shellac, amber, wool, silk, natural rubber, and cellulose. Synthetic polymers can include synthetic rubber, phenol formaldehyde resin, neoprene, nylon, polyvinyl chloride, polystyrene, polyethylene, polypropylene, polyacrylonitrile, polyvinyl butyral, or silicone. In embodiments where silicone is used, the silicone may be SMOOTH-ON® ECOFLEX® 20 or SMOOTH-ON® ECOFLEX ® 30. In further embodiments, superior constrictor muscle 500 and the individual components of simulated soft palate musculature 400 may be made of materials of different colors to allow one to visually distinguish the components from one another. In some embodiments, simulated superior constrictor muscle 500 can be made using a 3D printer, such as an extrusion, light polymerized, powder bed, laminated or wire-type 3D printer. Simulated superior constrictor muscle 500 may be adhered to an oral cavity template 800. Oral cavity template 800 may, in turn, be adhered to simulated hard palate 200 and attached cranial base 600. Simulated superior constrictor muscle 500 may additionally be adhered to simulated hamulus 204 and medial pterygoid plate 604. Adhesion can be sufficiently strong such that during dissection, simulated superior constrictor muscle 500 remains attached to simulated hard palate 200. This can be done, for example, by using mechanical fasteners (such as screws, nails or pins), a polymer, or glue (such as LOCTITE® 4851 cyanoacrylate glue). Simulated superior constrictor muscle 500 may be provided with insets 502 that tend to assist the simulated superior constrictor muscle 500 in fitting into superior component 1312 through matching insets 1313.

Figure 9:
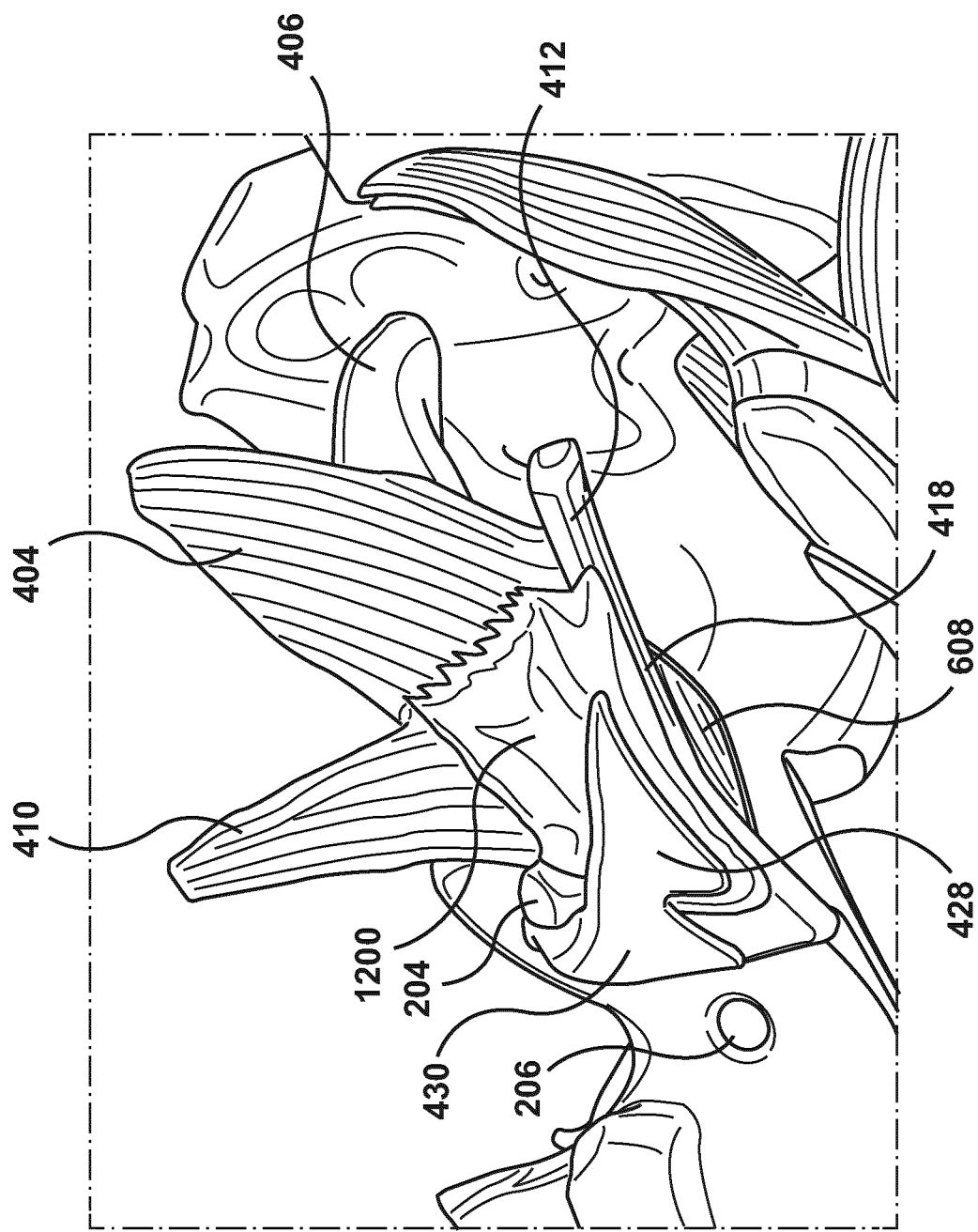
FIG. 9 is an enlarged fragmentary perspective view of the simulated soft palate musculature of FIG. 8 attached to the simulated cranial base of FIG. 5, showing a simulated oral head of a simulated palatopharyngeus muscle located to one side of a simulated levator veli palatini muscle in accordance with one embodiment of this disclosure.
Figure 10:
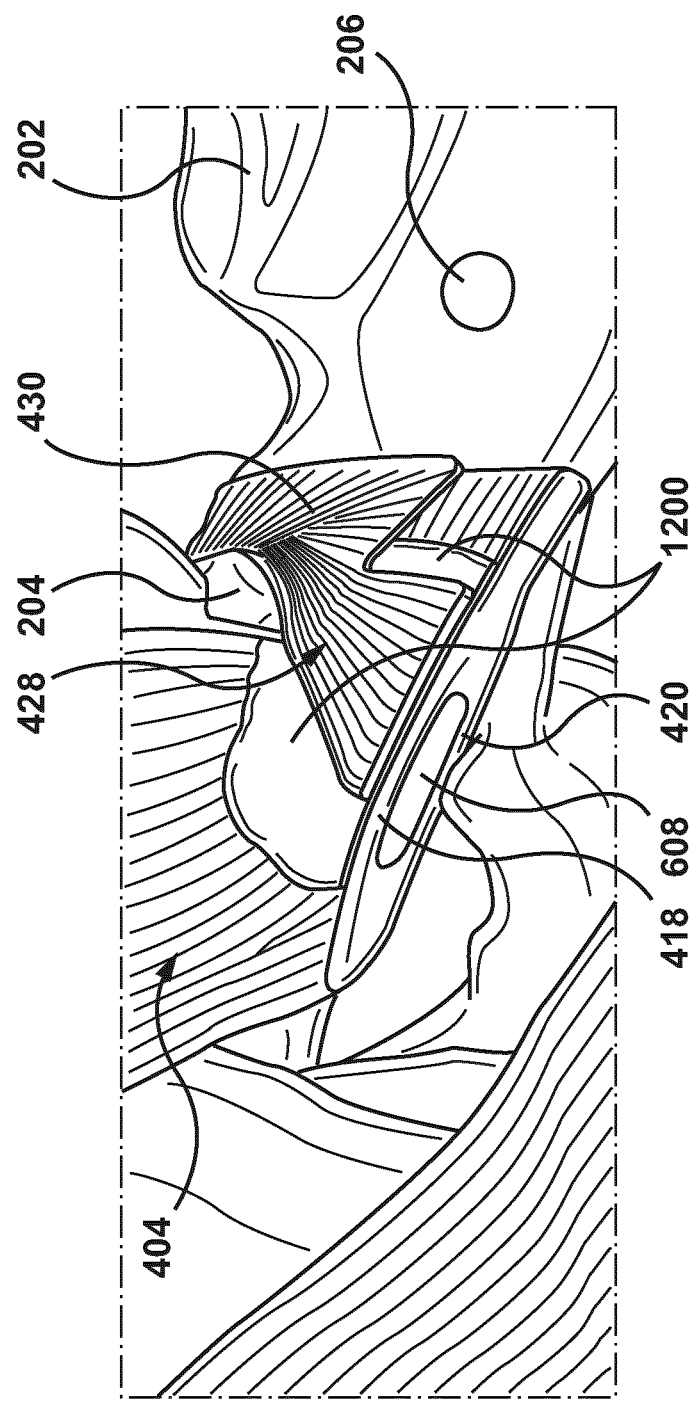
FIG. 10 is an enlarged fragmentary perspective view of a simulated oral head of a simulated palatopharyngeus muscle and simulated nasal head of a simulated palatopharyngeus muscle wrapped around a simulated levator veli palatini muscle in accordance with another embodiment of this disclosure.
Figure 11:
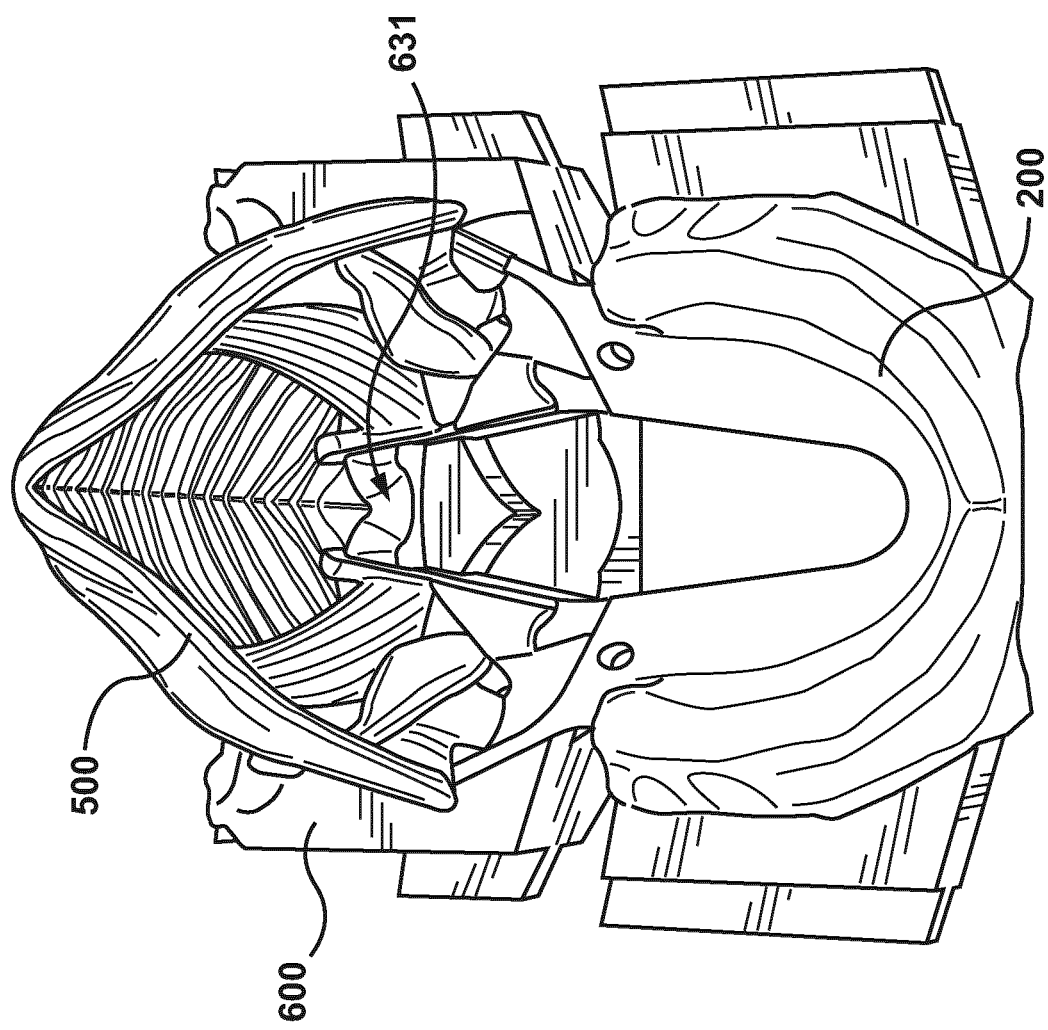
FIG. 11 is a perspective view of a simulated soft palate musculature and simulated superior constrictor muscle attached to the simulated hard palate and cranial base of FIG. 2 in accordance with one embodiment of this disclosure.
Figure 12:
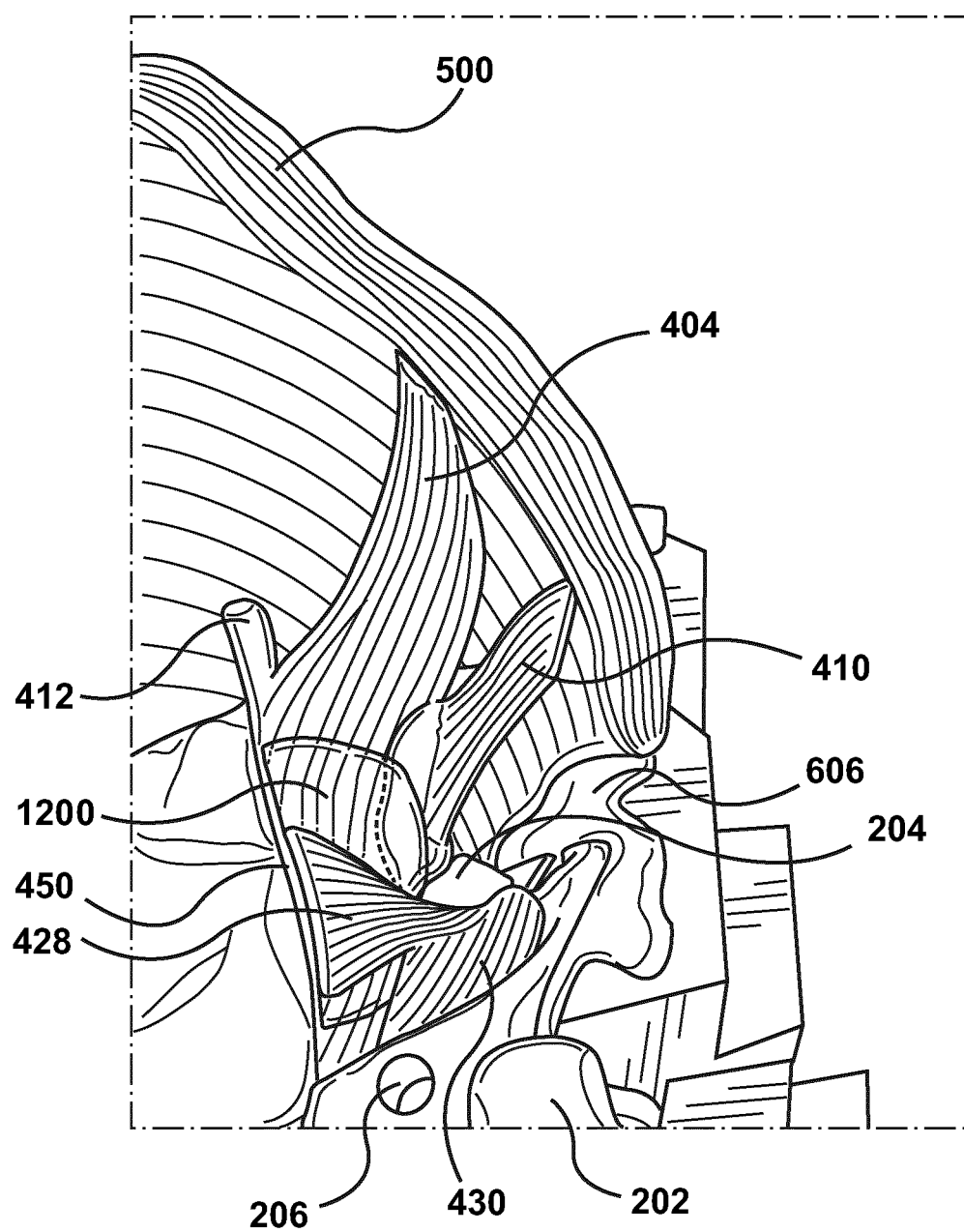
FIG. 12 is an enlarged fragmentary perspective view of the simulated soft palate musculature and simulated superior constrictor muscle of FIG. 12 with underlying structures in dotted lines to show transparency in accordance with one embodiment of this disclosure.
Figure 17:
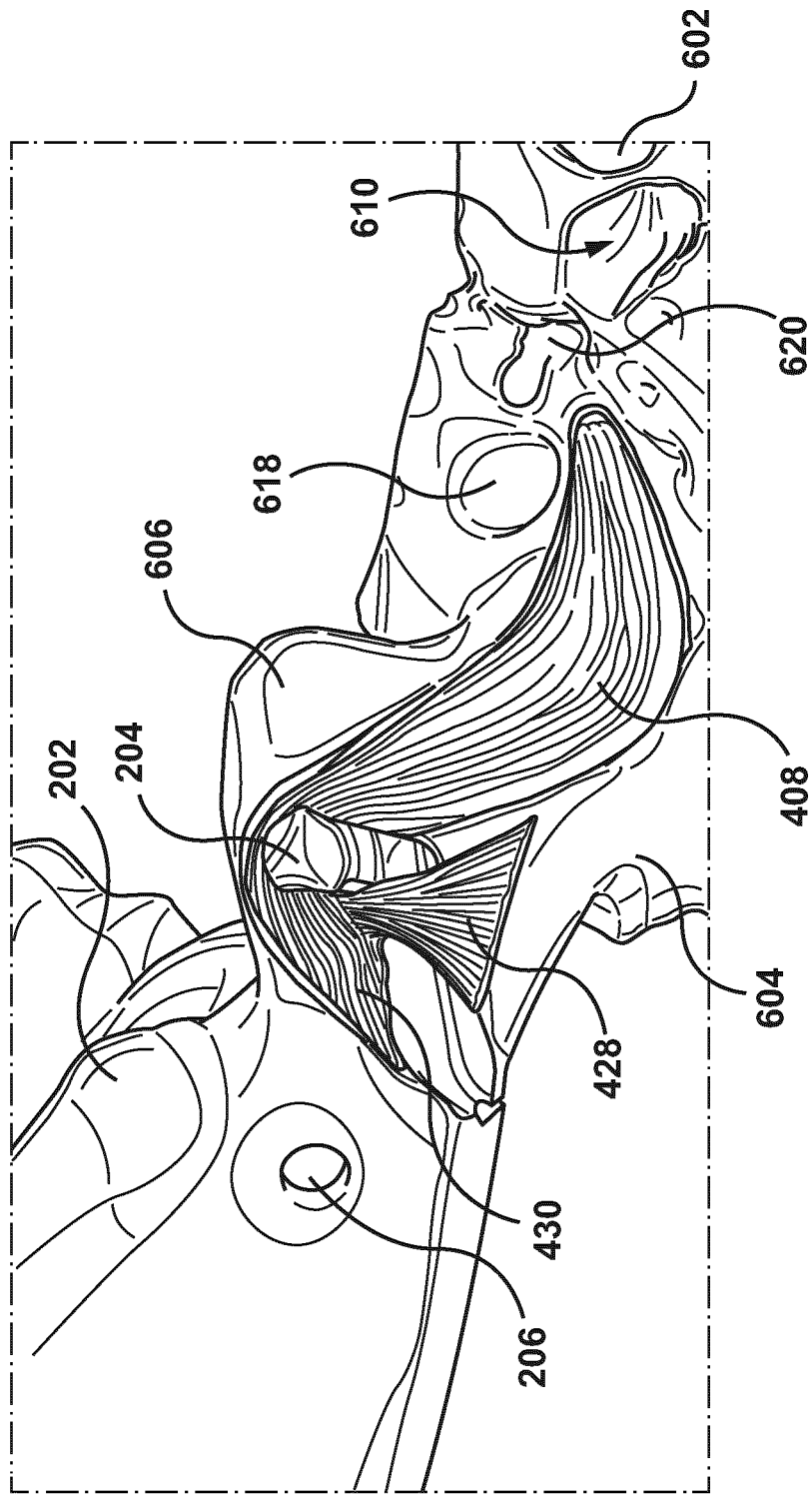
FIG. 17 is a perspective view of the simulated tensor veli palatini muscle of FIGS. 16A-16C attached to the simulated cranial base of FIG. 5.
Figure 18C:
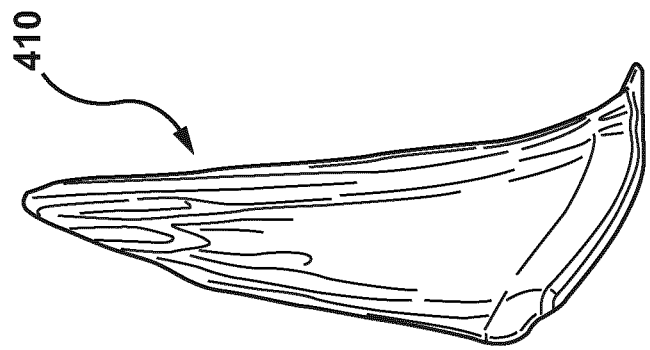
FIGS. 18A-18C are, respectively, inferior, medial and lateral views of a simulated palatoglossus muscle in accordance with one embodiment of this disclosure.
Figure 18B:
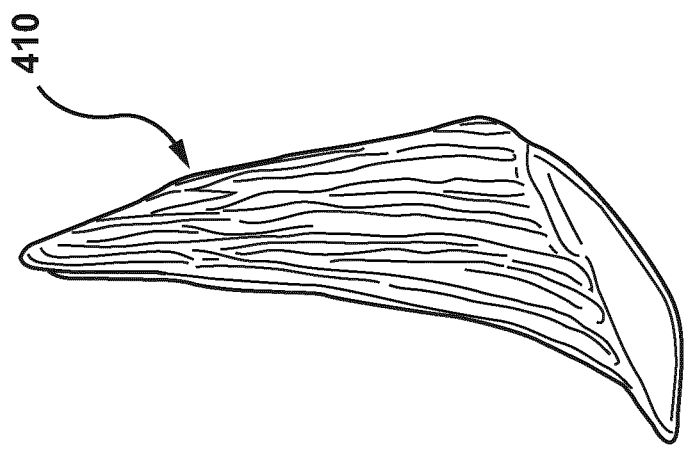
Figure 18A:
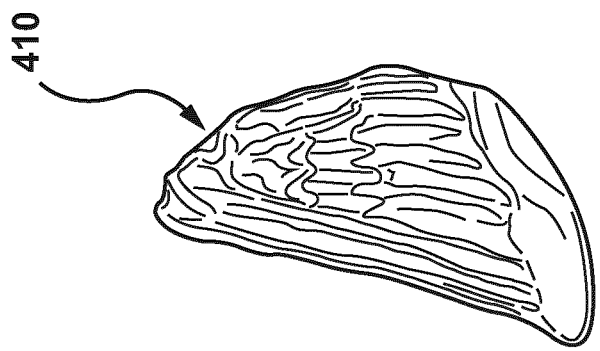
Figure 19C:
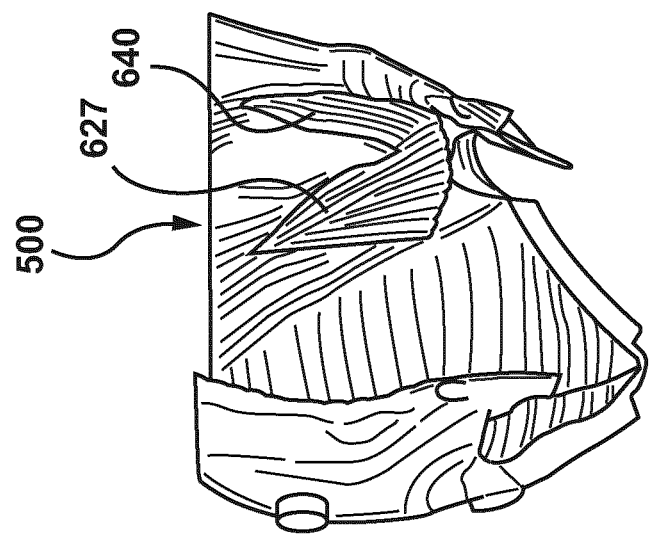
FIGS. 19A-19C are, respectively, anterior, inferior and perspective views of a simulated superior constrictor muscle in accordance with one embodiment of this disclosure.
Figure 19B:
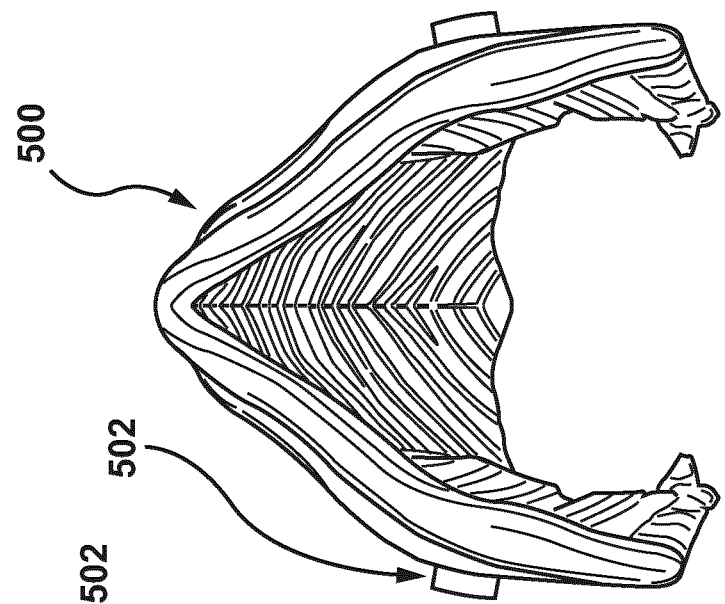
Figure 19A:
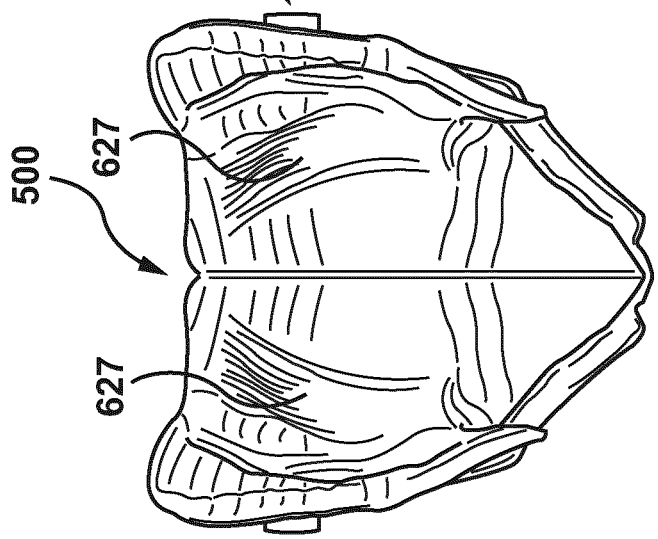
Figure 20:
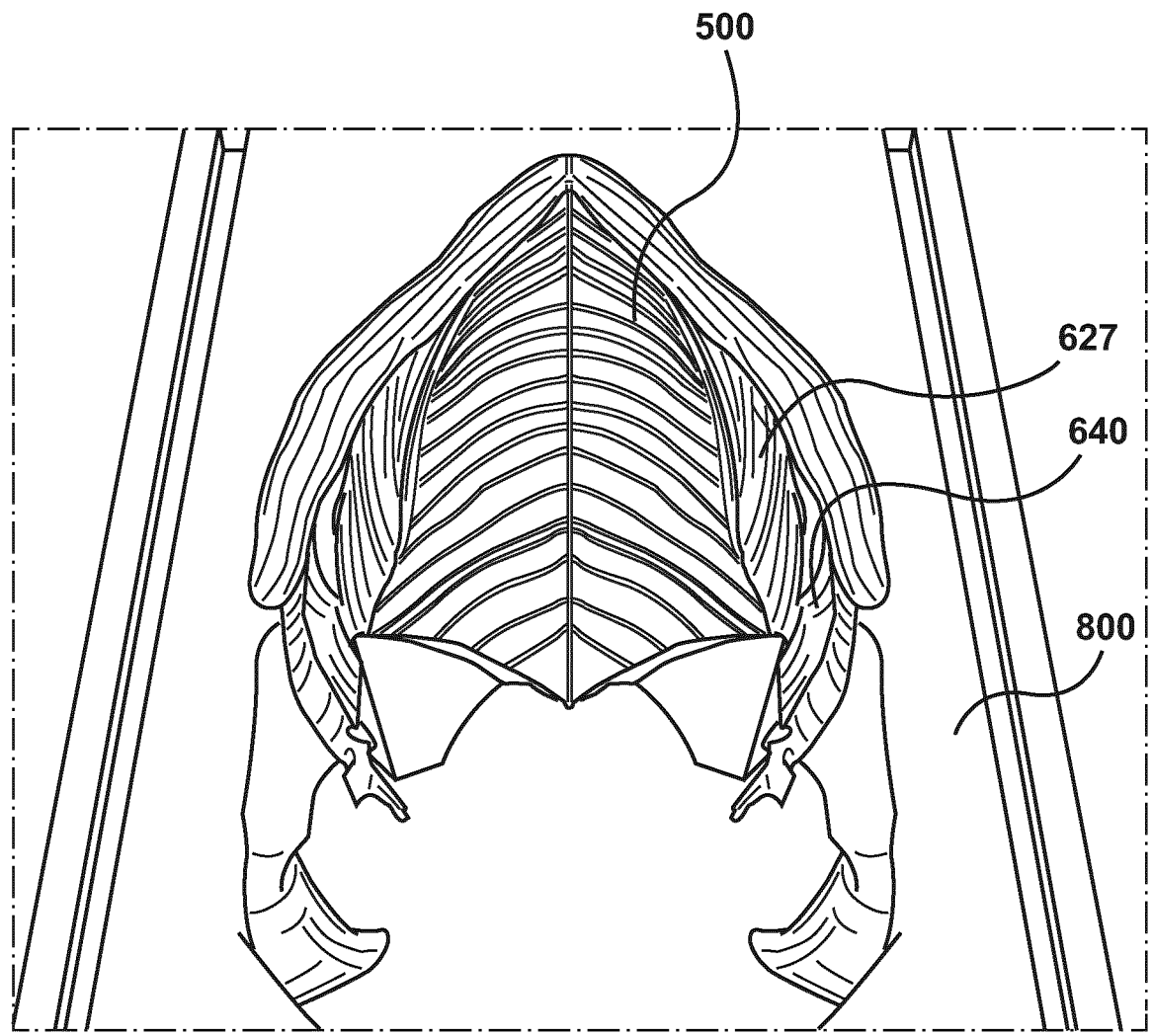
FIG. 20 is a perspective view of the simulated superior constrictor muscle of FIGS. 19A-19C inset within a simulated oral cavity in accordance with one embodiment of this disclosure.

As seen in FIG. 9, in some embodiments of simulator 100, there is a simulated soft tissue fatty layer 1200 between the simulated soft palate musculature 400 and the simulated mucosal layer 300. In certain embodiments, simulated soft tissue fatty layer 1200 is made of a soft material with properties simulating a biological soft tissue fatty layer, such as SMOOTH-ON® ECOFLEX® 20. Simulated soft tissue fatty layer 1200 may be loosely attached to simulated palatopharyngeus muscle 404 such that simulated soft tissue fatty layer 1200 tends to easily elevate off simulated palatopharyngeus muscle 404 in a single plane during dissection. This loose attachment may be accomplished, for example, by painting a layer of mold release, such as Ease Release 200 or 205, on the oral side of simulated palatopharyngeus muscle 404 followed by painting on simulated soft tissue fatty layer 1200 over the mold release surface. Simulated tensor veli palatini aponeurosis 428 may be adhered to the oral side of the simulated soft tissue fatty layer 1200, after which simulated mucosal layer 300 may be applied, adhering to the exposed simulated tensor veli palatini aponeurosis 428 and soft tissue fatty layer 1200.

In some embodiments, simulator 100 may comprise one or two simulated eustachian tubes 900, as seen in FIGS. 22-25. Simulated eustachian tube 900 may have a cartilaginous section and a membranous section. Eustachian tube 900 may be made of a material harder than that used for simulated soft palate musculature 400 or simulated superior constrictor muscle 500. For example, simulated eustachian tube 900 may be made of silicone, such as SMOOTH-ON® DRAGON SKIN® 30 or FX-PRO®. In some embodiments, simulated eustachian tube 900 is attached to simulated levator veli palatini muscle 406 and to simulated cranial base 600. Adhesion can be sufficiently strong such that during dissection, eustachian tube 900 remains attached to simulated levator veli palatini muscle 406 and to simulated cranial base 600. This can be done, for example, by using mechanical fasteners (such as screws, nails or pins), a polymer, or glue (such as LOCTITE® 4851 cyanoacrylate glue). In some embodiments, simulated levator veli palatini origin 610 may be at the posteromedial aspect of simulated eustachian tube 900 at the junction of its cartilaginous section and bony section. Simulated levator veli palatini muscle 406 may descend anteriorly and medially toward simulated soft palate musculature 400, lying in the space between the simulated superior constrictor muscle 500 and the simulated cranial base 600. In the path of simulated levator veli palatini muscle 406 toward the simulated soft palate musculature 400, simulated levator veli palatini muscle 406 may be related inferiorly and lie almost parallel to simulated eustachian tube 900. Simulated levator veli palatini muscle 406 may lie inferior and medial to simulated eustachian tube 900 throughout its length except at each end. At the cranial end, simulated levator veli palatini muscle 406 may be curved superiorly and posteriorly around simulated eustachian tube 900 to attach to its posteromedial aspect. At the pharyngeal end, simulated levator veli palatini muscle 406 may curve slightly anteriorly so that it lies inferior to the membranous part and anterolateral to the cartilaginous part of simulated eustachian tube 900. Simulated levator veli palatini muscle 406 may spiral around simulated eustachian tube 900 with the cranial end posteromedial to simulated eustachian tube 900 and the pharyngeal end slightly anterolateral to simulated eustachian tube 900. In certain embodiments, simulated tensor veli palatini muscle 408 may originate from simulated scaphoid fossa 432 near the superior end of the simulated medial pterygoid plate 604, and adjacent the superolateral aspect of the cartilaginous and membranous parts of the length of simulated eustachian tube 900. The axis of simulated tensor veli palatini muscle 408 may be oblique to simulated eustachian tube 900; for example, the angle between the two may be 30 to 45 degrees. In some embodiments, simulated tensor veli palatini muscle 408 descends vertically as a single flat and wide sheet of muscle.

Figure 25:
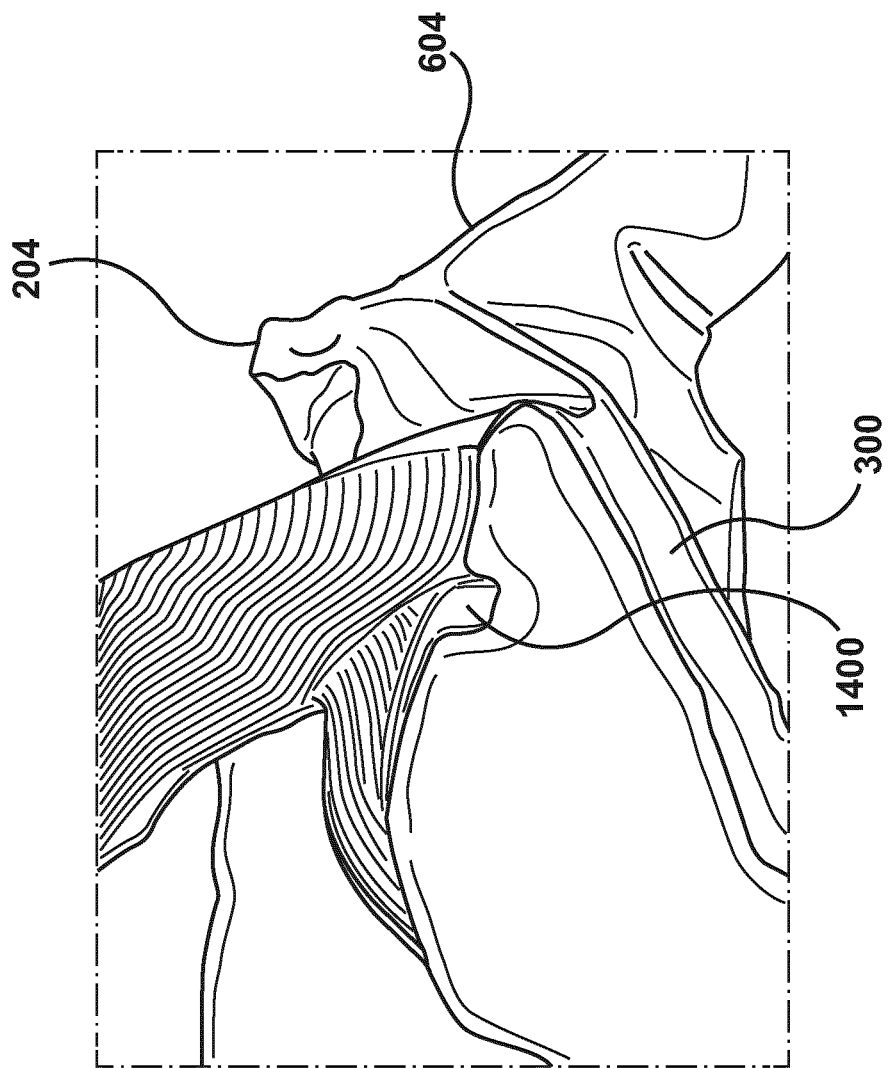
FIG. 25 is a perspective view showing a simulated pedicle in accordance with one embodiment of this disclosure.

As shown in FIG. 25, some embodiments of the simulator 100 may comprise one or two simulated pedicles 1400 attached to or embedded in simulated hard palate 200. Simulated pedicle 1400 may be created by infusing the material used to create it within simulated greater palatine foramen 206 so that the material cures with an anchor embedded within simulated hard palate 200. This anchor may be confluent with the overlying simulated mucosal layer 300 so that simulated mucosal layer 300 is adherent to simulated pedicle 1400 in this area and dissection around simulated pedicle 1400 gives the visual appearance and tactile feel that occurs during an actual palate repair. Simulated pedicle 1400 may be created using a soft material with properties simulating a biological pedicle. In some embodiments, simulated pedicle 1400 is made of a material that may tear when simulator 100 is used to practice surgery, as is sometimes seen in practice if a surgeon is not careful when performing trans-oral surgery. Simulated pedicle 1400 may be made with a silicone, such as ECOFLEX® 20 or ECOFLEX® 30.

Figure 26:
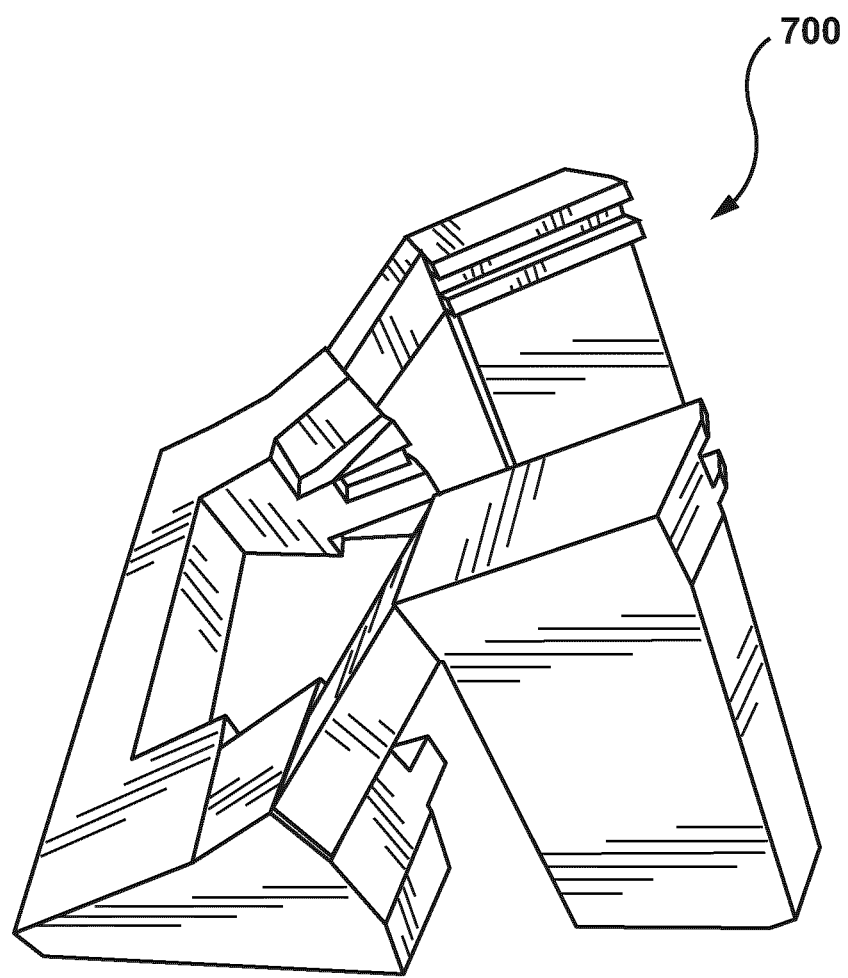
FIG. 26 is a perspective view of a base in accordance with one embodiment of the disclosure.
Figure 27A:
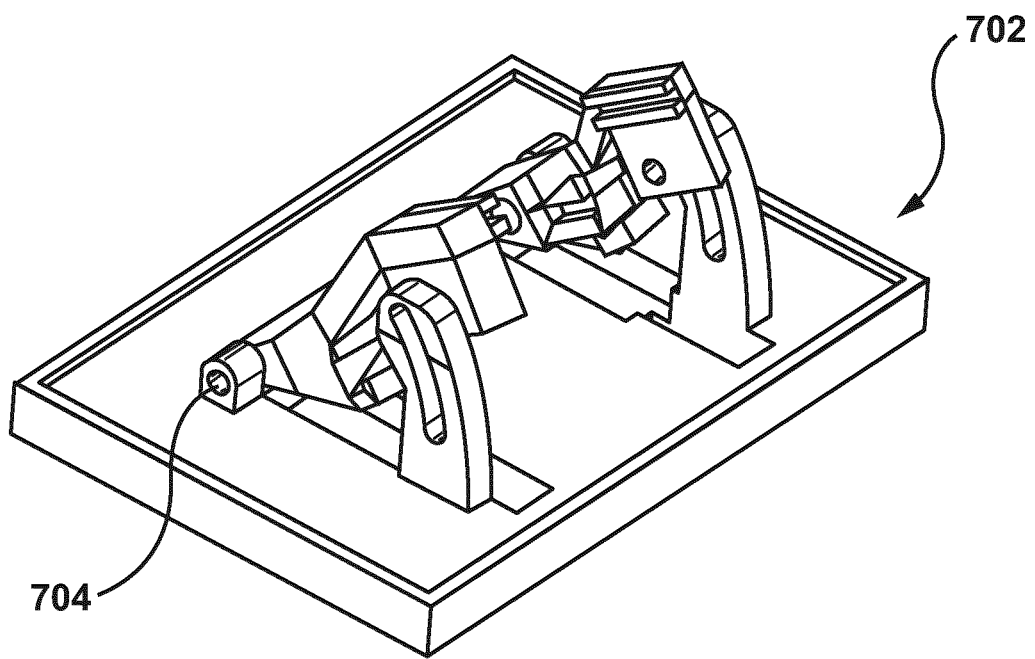
FIG. 27A is a perspective view of a base in accordance with another embodiment of this disclosure.
Figure 27B:
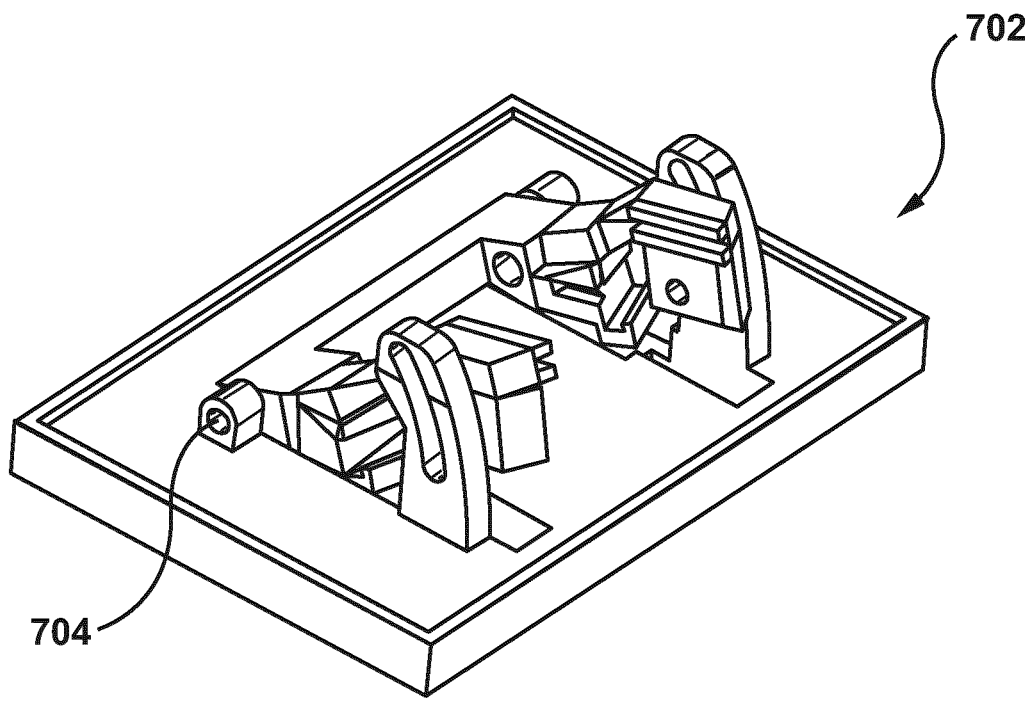
FIG. 27B is a perspective view of the base of FIG. 27A after rotation about a rotation point.
Figure 28:
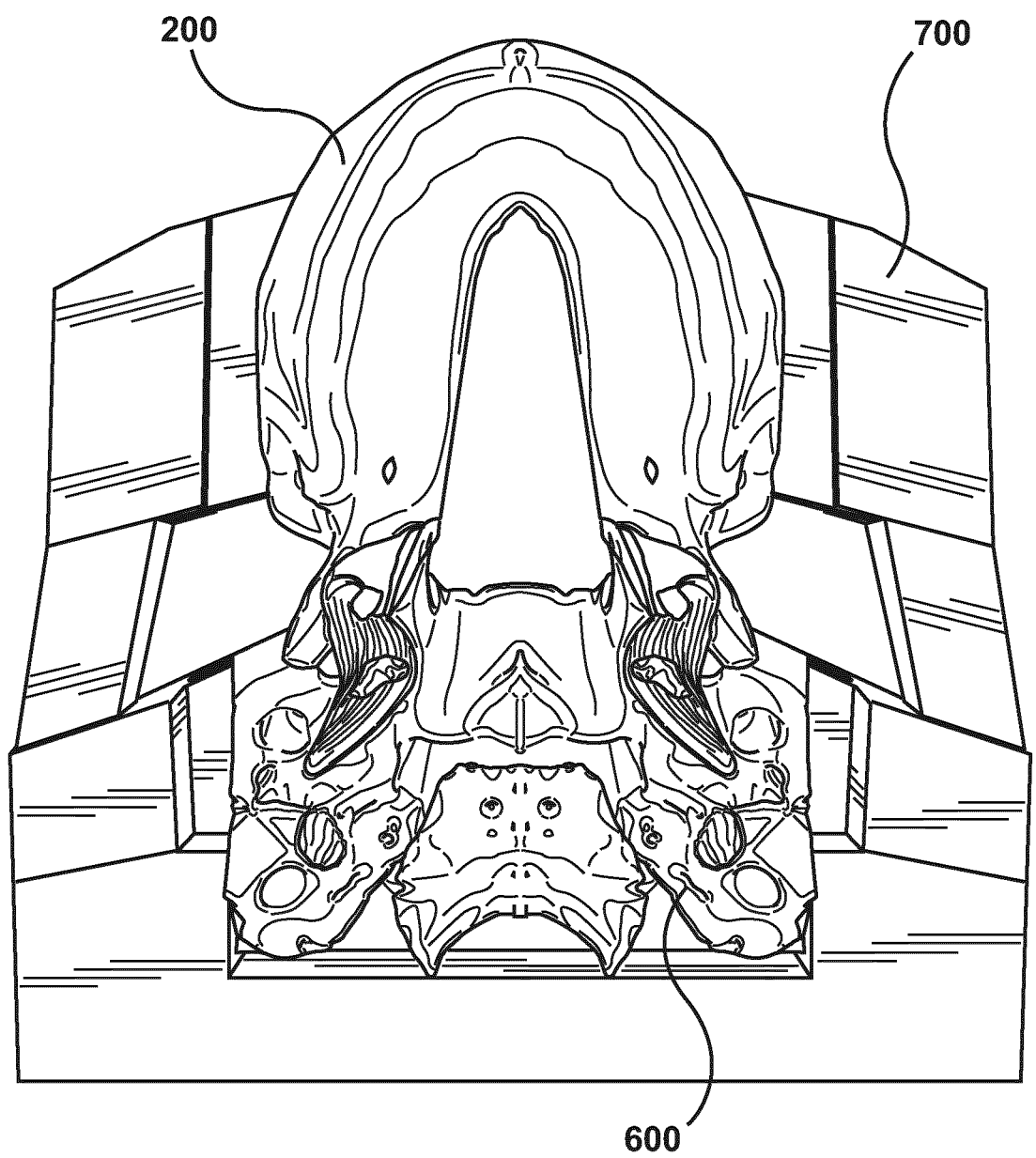
FIG. 28 is a top view of the simulated bony palate and cranial base of FIG. 5 inserted into the base of FIG. 26.
Figure 29:
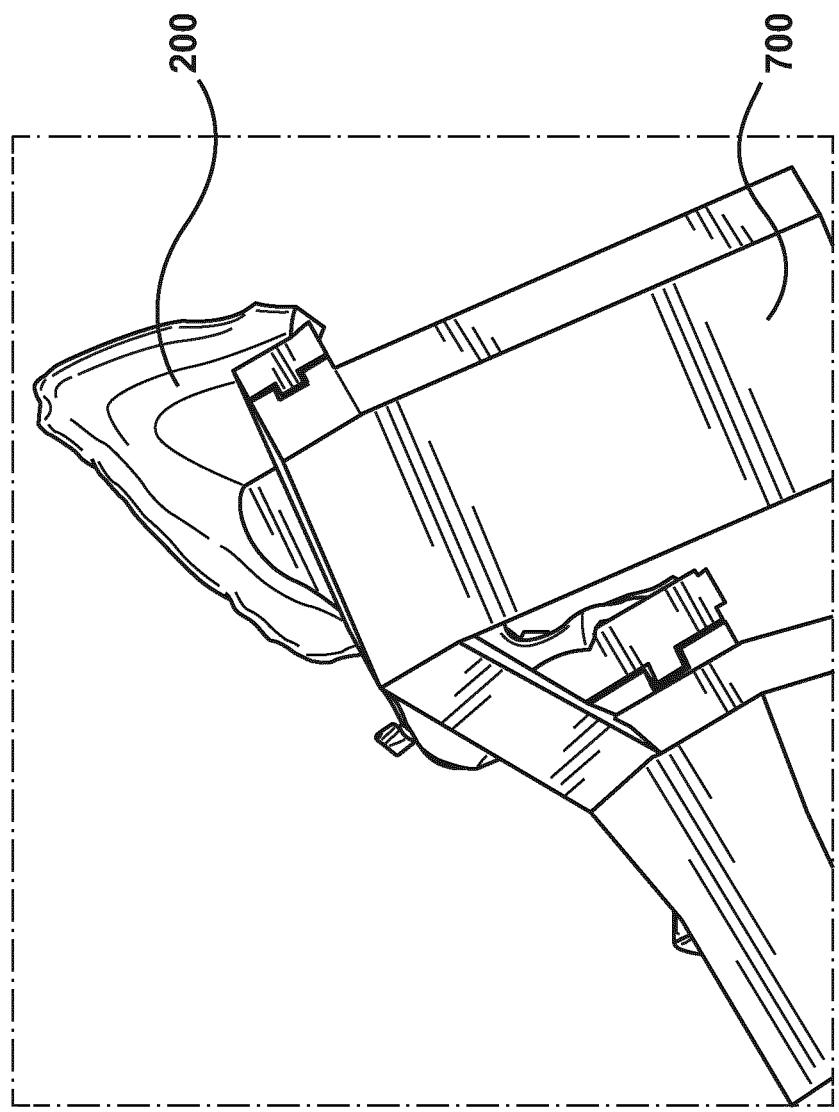
FIG. 29 is a side view of the simulated bony palate and cranial base of FIG. 5 inserted into the base of FIG. 26.

Optionally, simulated hard palate 200 with attached cranial base 600 can be supported by a base, such as base 700 as shown in FIG. 26 or base 702 as shown in FIG. 27. As shown, simulated base 702 has a rotation point 704 to simulate head flexion and/or extension from, for example, neutral (0 degrees) to full extension (90 degrees). In some embodiments, simulated hard palate 200 with attached cranial base 600 can slide in and out of either base 700 or 702. FIG. 28, for example, shows simulated hard palate 200 with attached cranial base 600 supported by base 700. In some embodiments, simulated hard palate 200 and cranial base 600 may have inset slides 1316 that allow it to slide in and out of either base 700 or 702. The angle simulated hard palate 200 takes upon being supported by a base can represent the angle of the palate and the perspective seen by a surgeon during trans-oral surgery, such as shown in FIG. 29.

Figure 30:
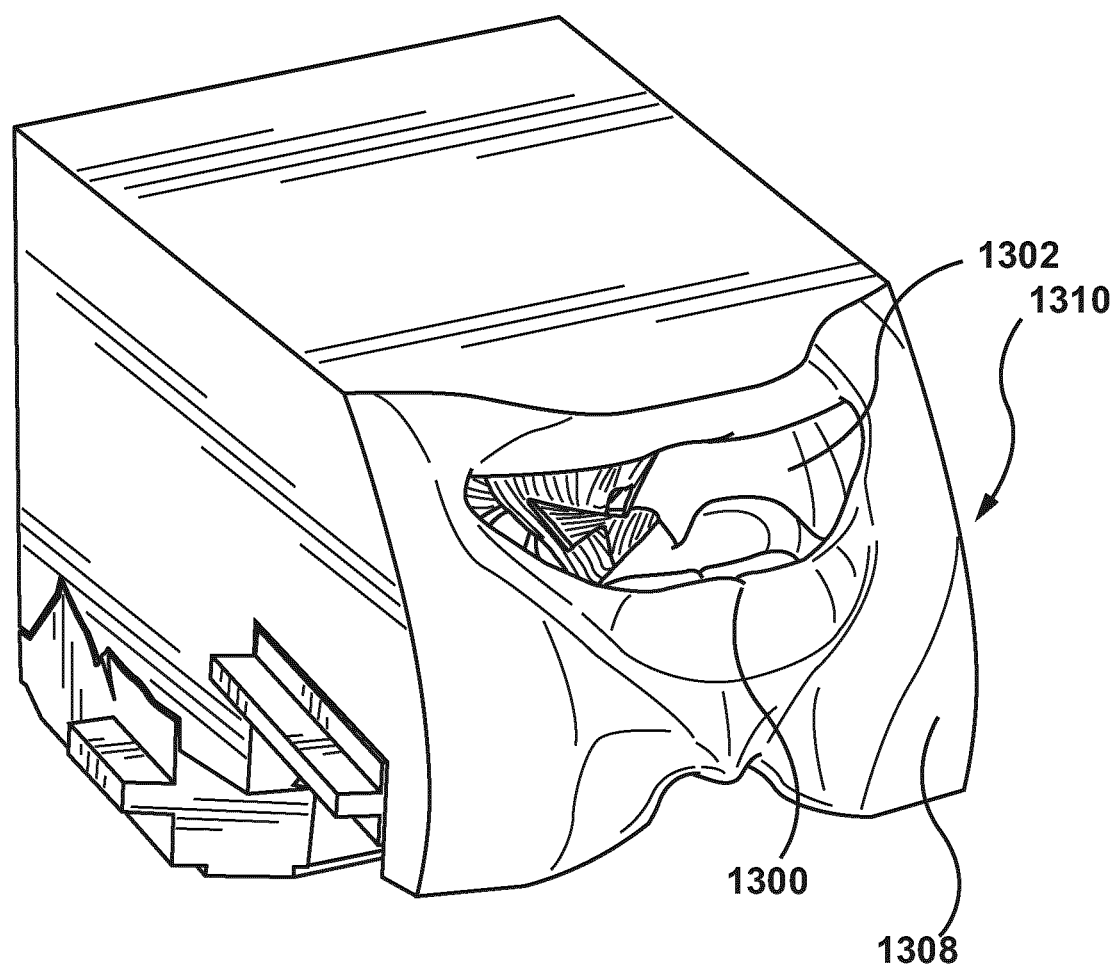
FIG. 30 is a perspective view of a simulator forming a cartridge in accordance with one embodiment of this disclosure.
Figure 31B:
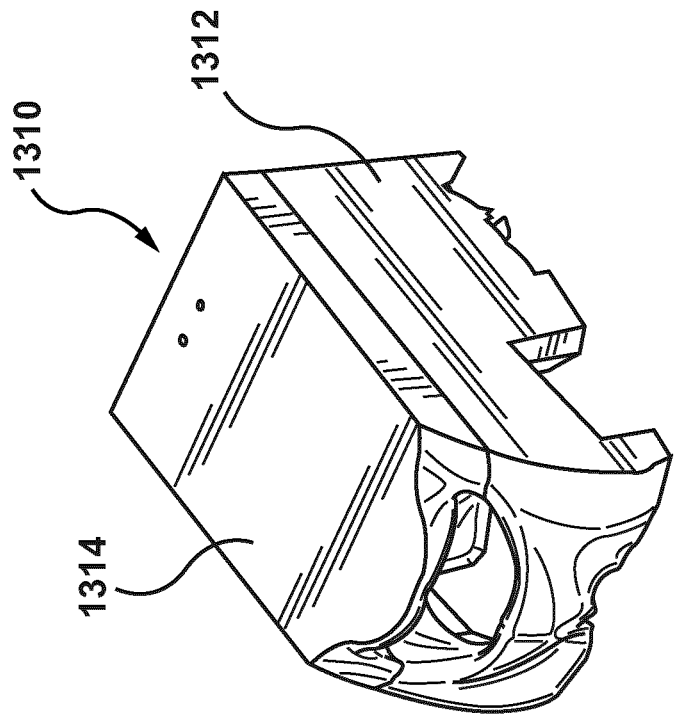
FIGS. 31A and 31B are perspective views showing formation of a cartridge in accordance with one embodiment of the disclosure.
Figure 31A:
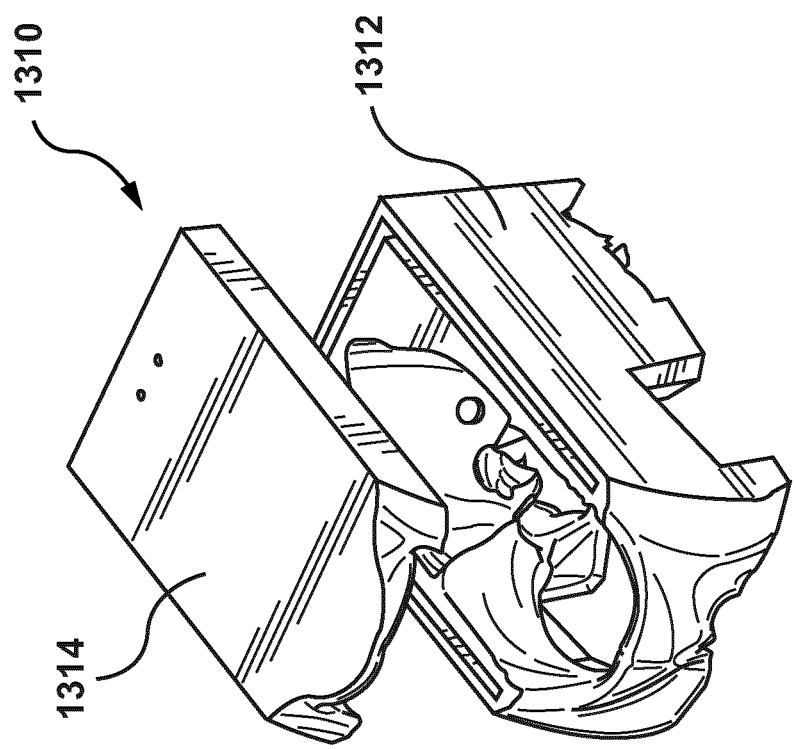
Figure 32B:
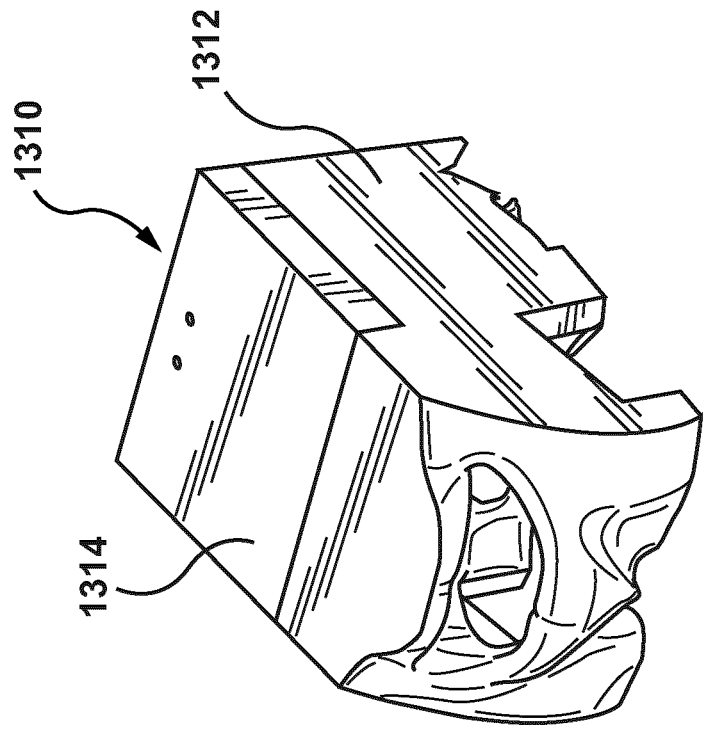
FIGS. 32A and 32B are perspective views showing formation of a cartridge in accordance with another embodiment of this disclosure.
Figure 32A:
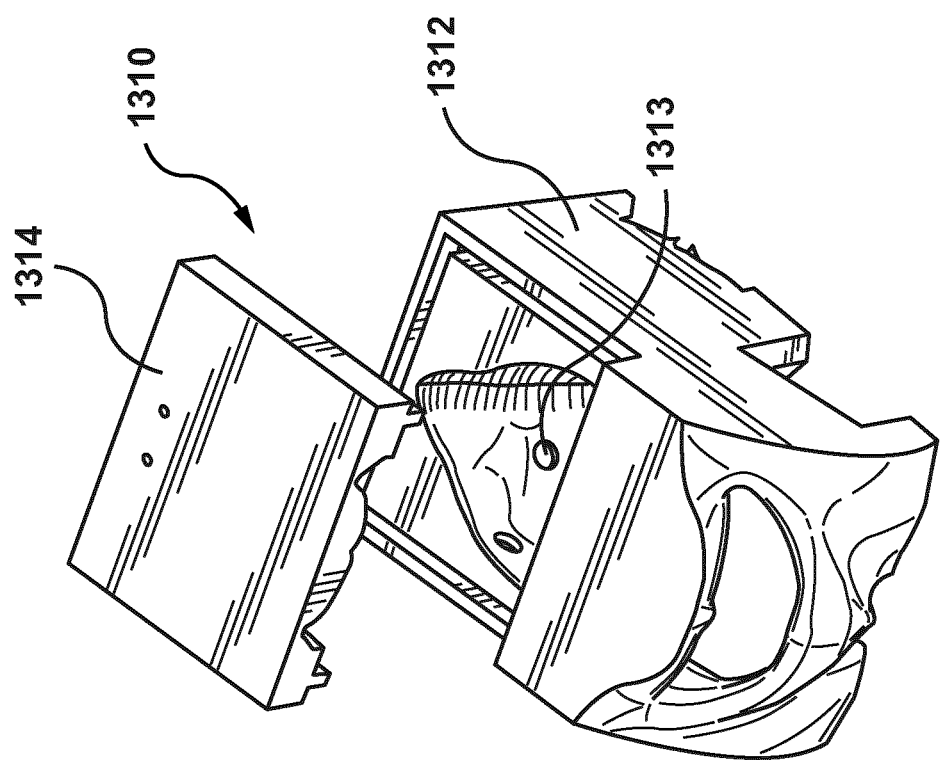
Figure 32D:
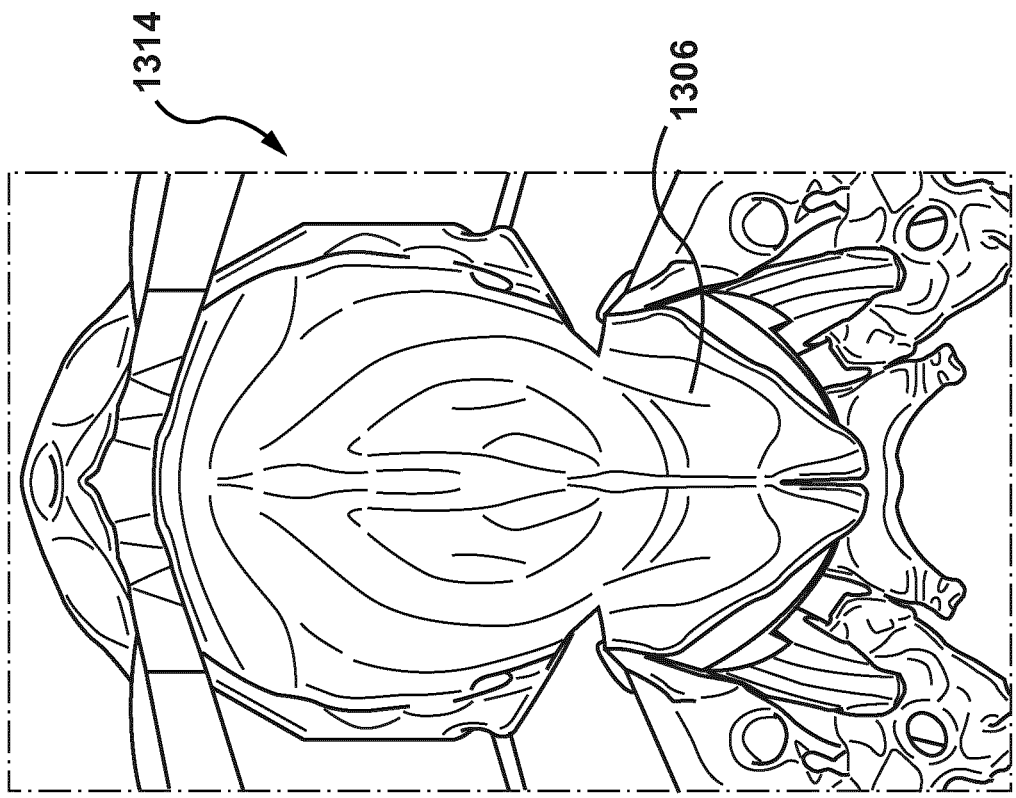
FIGS. 32C and 32D are cross-sectional and plan views of the cartridge of FIGS. 32A and 32B.
Figure 32C:
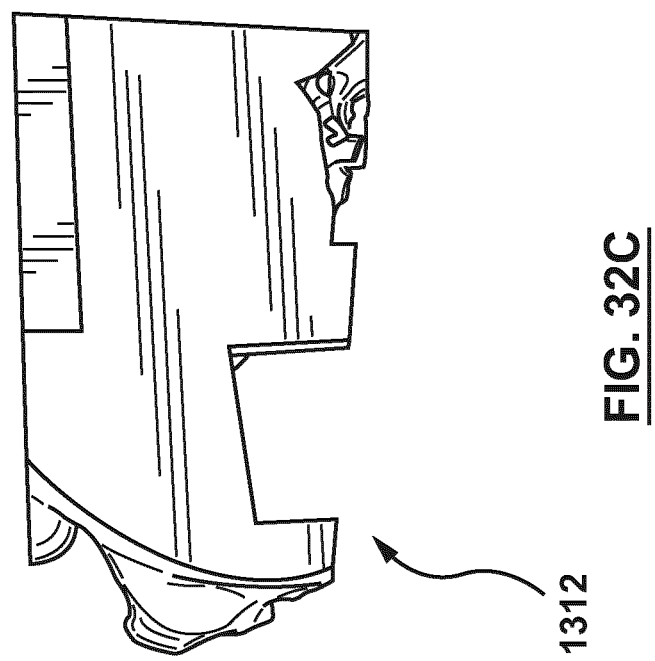

As shown in FIGS. 30-32, in some embodiments, simulator 100 may further comprise a simulated oral aperture 1300 with a simulated oral cavity 1302 extending therethrough. Extending from simulated oral aperture 1300 can be opposed simulated lateral oral cavity walls 1304 and a simulated tongue 1306 spanning the opposed simulated lateral oral cavity walls 1304 at a first end of the walls 1304. Simulated oral cavity 1302 may be made with a material with properties simulating a biological oral cavity, such as silicon (which can be ECOFLEX® 20 or ECOFLEX® 30). Simulated hard palate 200 and simulated soft palate musculature 400 can be attached to opposed simulated lateral oral cavity walls 1304 at a second end of the walls 1304. The structures accessible from within simulated oral cavity 1302, except for simulated tongue 1306, may then be coated with simulated mucosal layer 300. In certain embodiments, simulator 100 may further comprise a complete or partial simulated face 1308, which in some embodiments is made of silicone, such as SMOOTH-ON® DRAGON SKIN® 30 with 1:1 ratio with SMOOTH-ON® SLACKER® extending from the simulated oral aperture 1300. Complete or partial simulated face 1308 may be attached to base 700 or 702 in certain embodiments. This can be done, for example, by using LOCTITE® 4851 cyanoacrylate glue.

As seen in FIGS. 30-36, in some embodiments, simulator 100 forms a replaceable cartridge 1310 that replaceably fits within a complete or partial simulated face 1308 attached to base 700 or 702. The cartridge may comprise simulated hard palate 200, simulated soft palate musculature 400, simulated mucosal layer 300, simulated superior constrictor muscle 500, simulated cranial base 600, simulated eustachian tube 900, simulated soft tissue fatty layer 1200, simulated pedicle 1400, simulated oral aperture 1300, simulated oral cavity 1302, simulated lateral oral cavity walls 1304, simulated tongue 1306, or any combination thereof. Use of cartridge 1310 allows one to replace cartridge 1310 alone, and not the complete or partial simulated face 1308 and attached base 700 or 702, after practicing trans-oral surgery with cartridge 1310.

Figure 33:
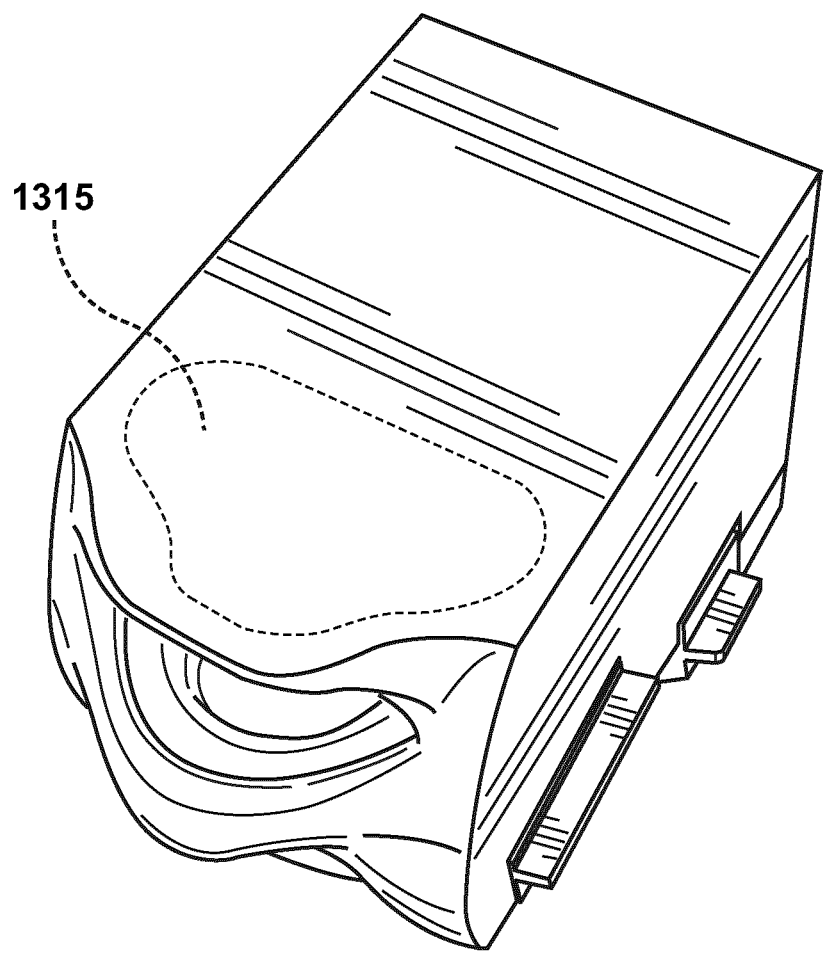
FIG. 33 is a perspective view of a cartridge in accordance with one embodiment of the disclosure.
Figure 34:
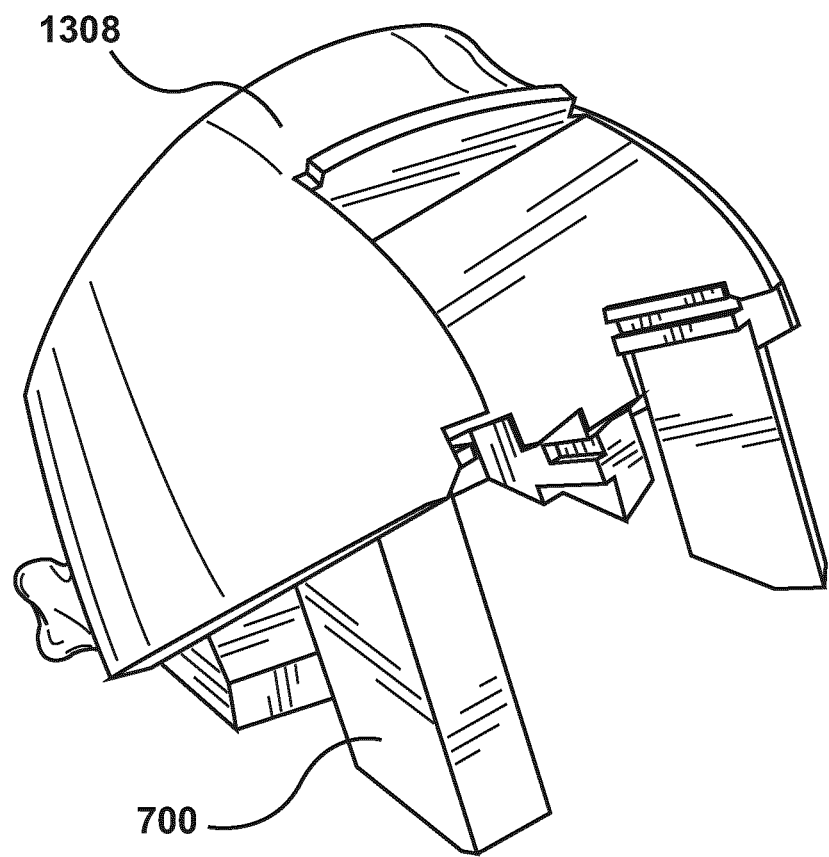
FIG. 34 is a perspective view of the base of FIG. 26 with a partial simulated face attached thereto in accordance with one embodiment of this disclosure.
Figure 36:
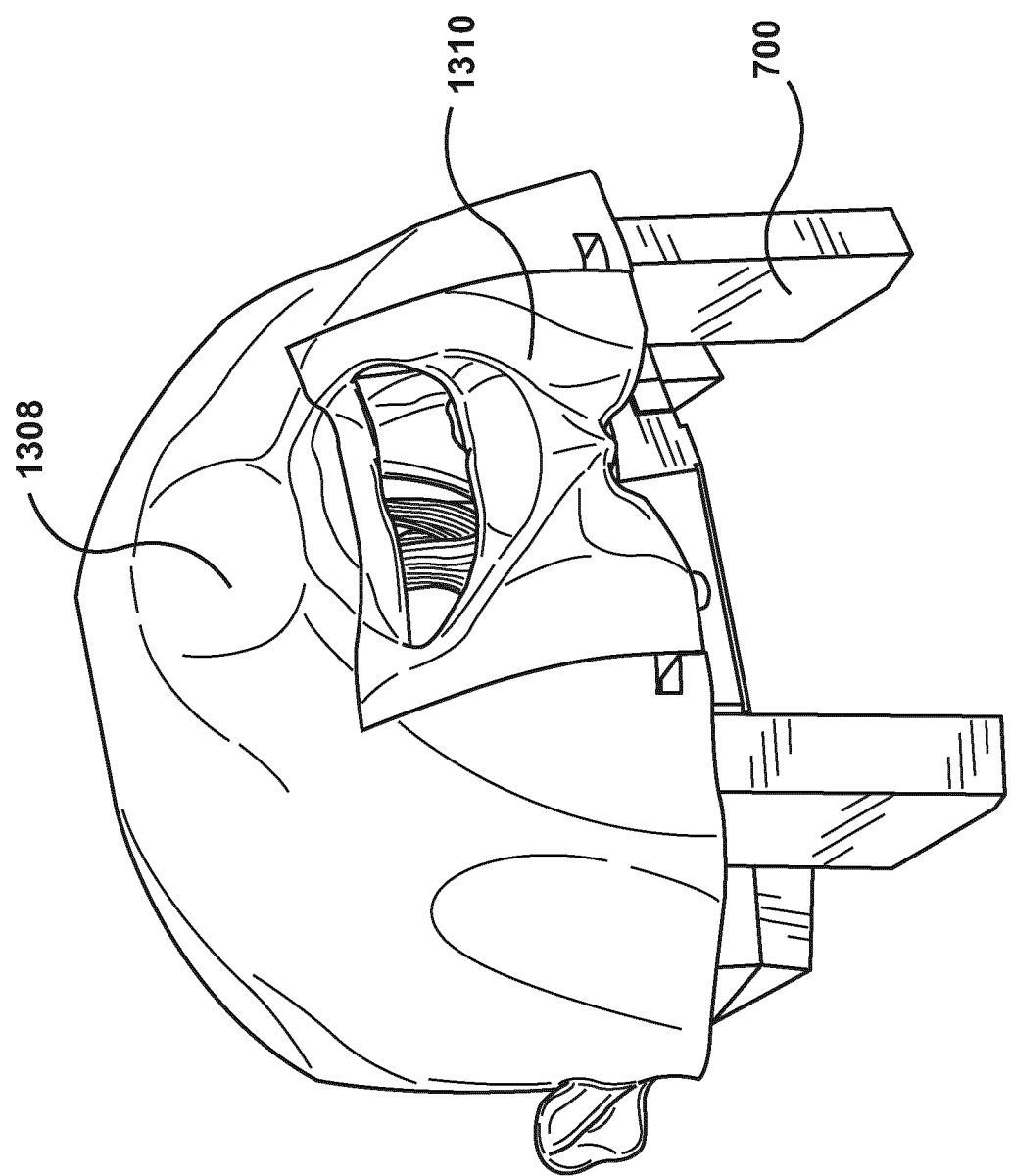
FIG. 36 is a perspective view of the cartridge of FIGS. 35A-35C inserted into the base and partial simulated face attached thereto of FIGS. 35A-35C.
Figure 37A:
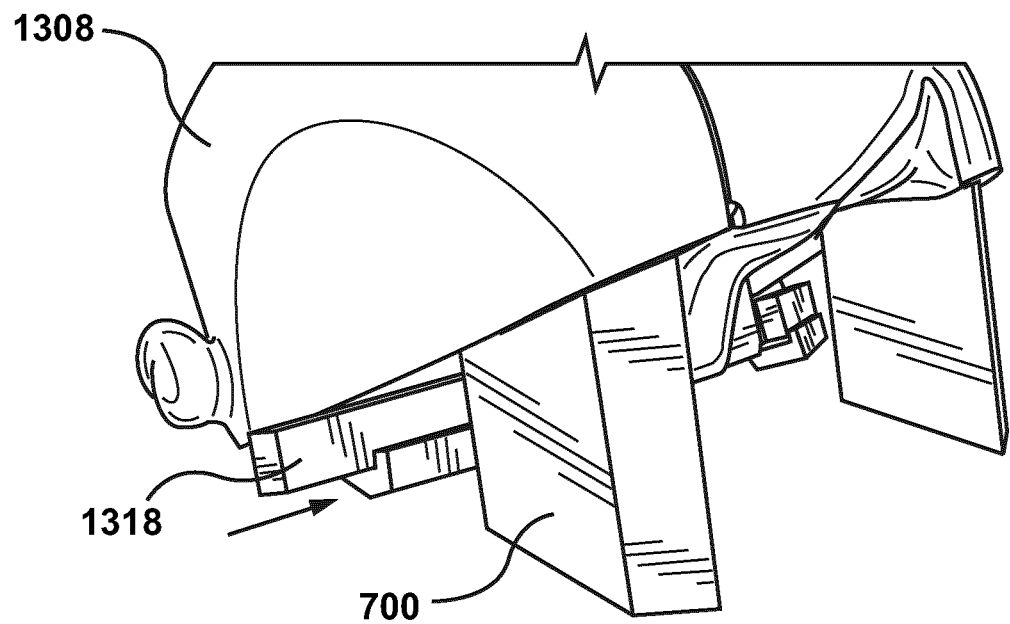
FIGS. 37A-37D are perspective views showing a locking mechanism in accordance with one embodiment of the disclosure.
Figure 37B:
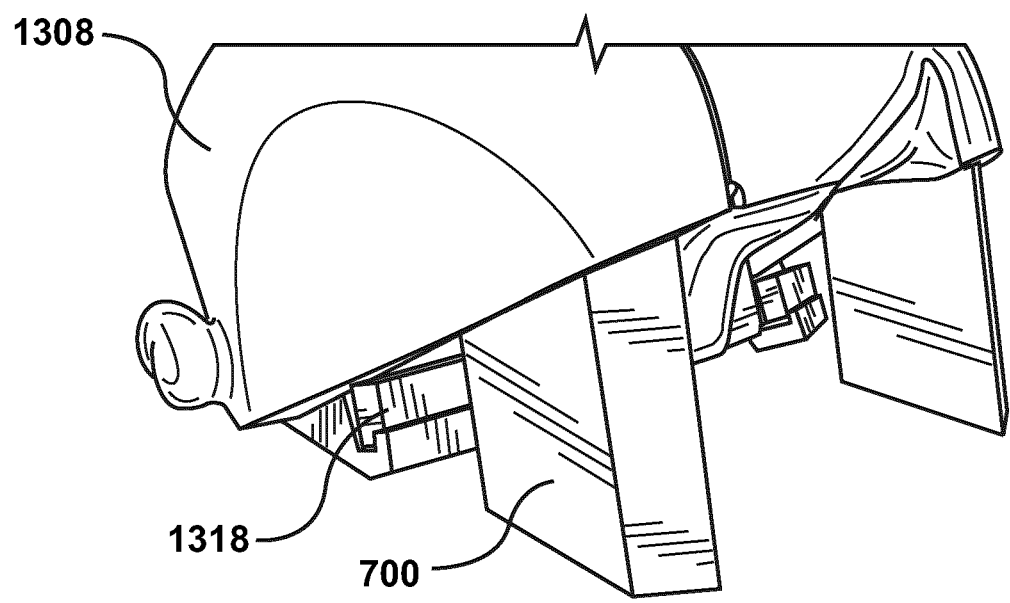
Figure 37C:
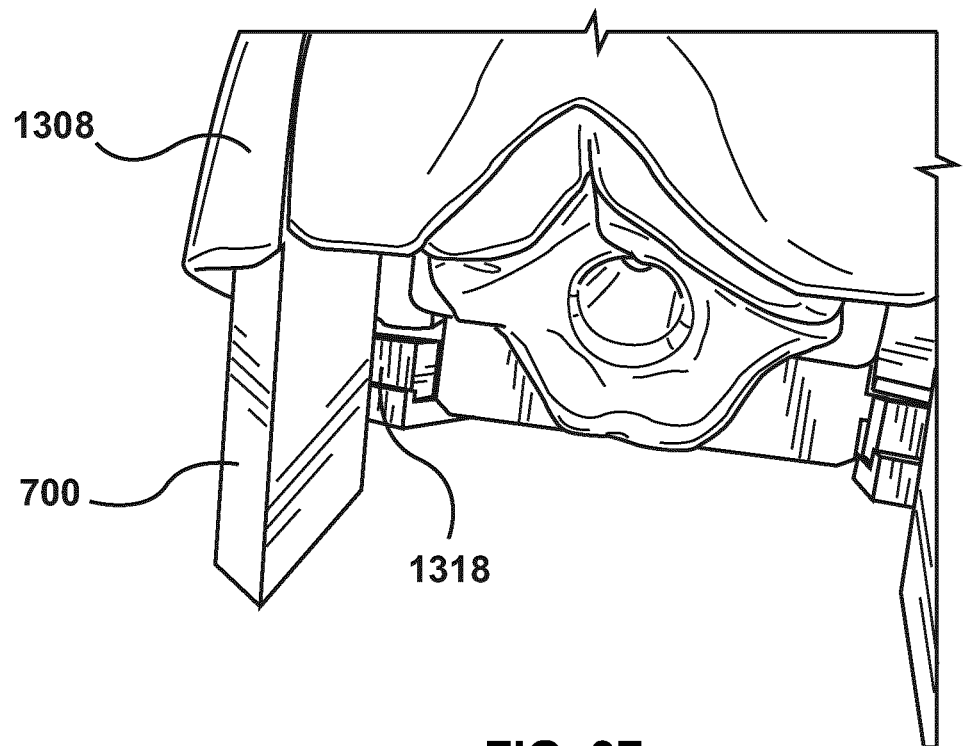
Figure 37D:
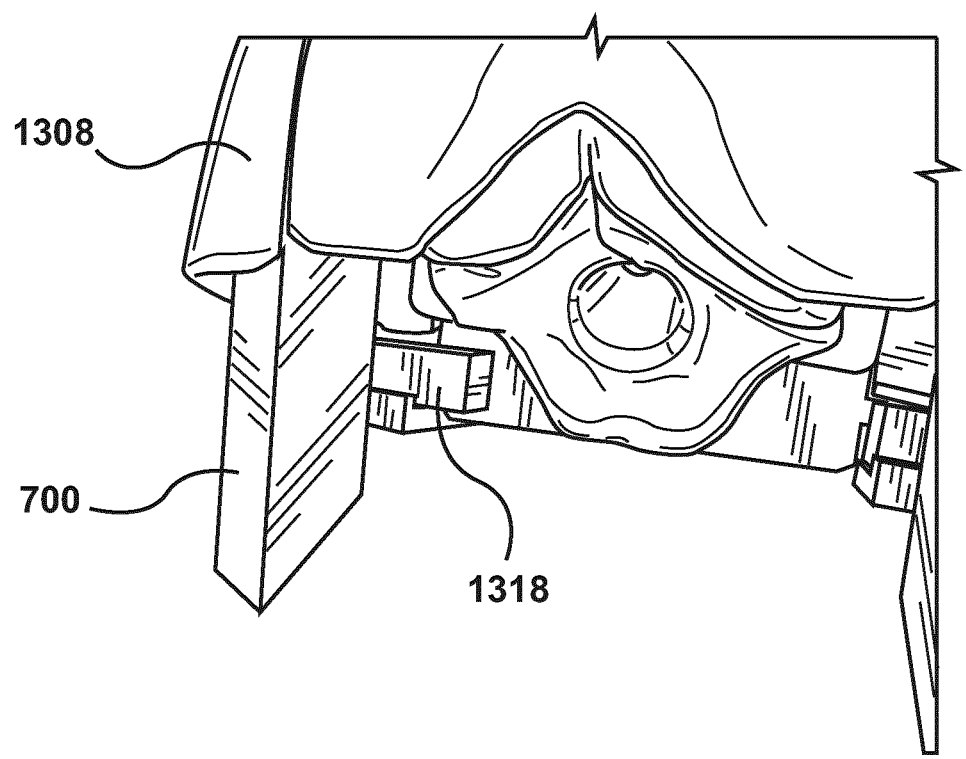

Replaceable cartridge 1310 may be made of a superior component 1312 and an inferior component 1314, which may be made of silicone, such as ECOFLEX® 20 or ECOFLEX® 30. Superior component 1312 may have insets 1313 to receive simulated superior constrictor muscle 500. Superior component 1312 and an inferior component 1314 can fit together by use of lock and key insets. In some embodiments, superior component 1312 and an inferior component 1314 may be attached to one another using, for example, mechanical fasteners (such as screws, nails or pins) or glue (such as LOCTITE® 4851 cyanoacrylate glue). Simulated oral aperture 1300 can be made of both superior component 1312 and inferior component 1314 (see, for example, FIGS. 31A and 31B). Alternatively, simulated oral aperture 1300 may be made as one piece, such as out of superior component 1312 only (see, for example, FIGS. 32A and 32B). Making simulated oral aperture 1300 of one piece may tend to prevent tearing of simulated oral aperture 1300 during retraction. As seen in FIG. 33, in some embodiments, a hard material, such as steel plate 1315, may be embedded within inferior component 1314, which may tend to prevent deformation during retraction. This can be done, for example, by applying a thin layer, such as 2 mm, of silicone, such as ECOFLEX® 20 or ECOFLEX® 30, in a cartridge mold and allowing it to cure. The steel plate may then be laid over top this layer of cured silicone and the remainder of the cartridge cast embedding the piece of steel within the silicone.

Figure 38:
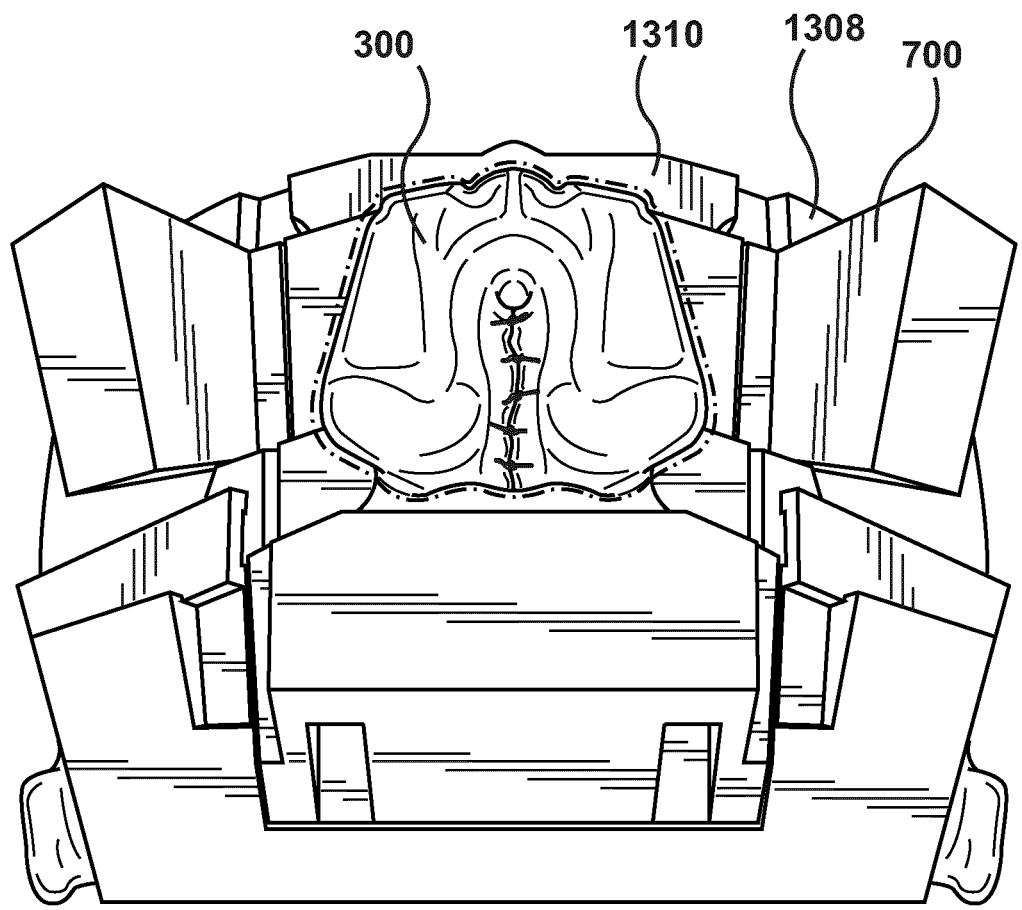
FIG. 38 is a bottom view of a simulator showing a simulated mucosal layer covering a portion of the simulated hard palate coated with an attachment agent enclosed by a dot-dash line in accordance with one embodiment of this disclosure.
Figure 39:
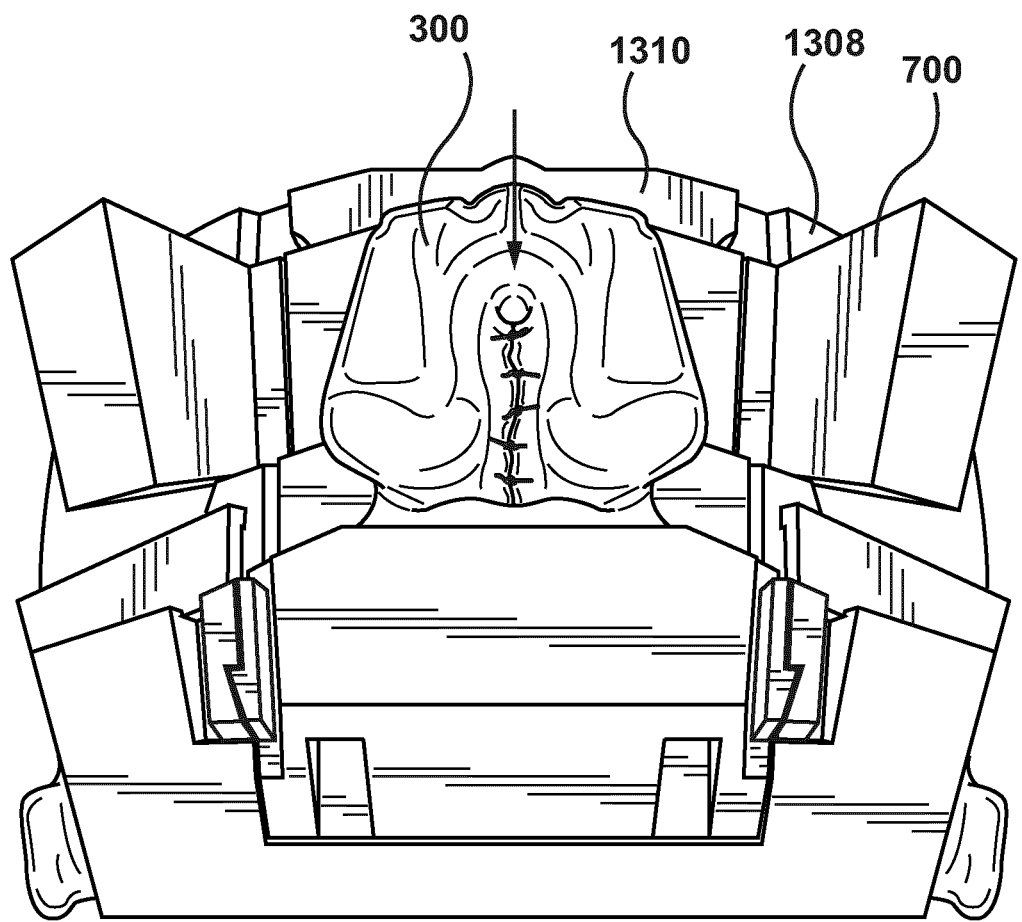
FIG. 39 is a bottom view showing a locking mechanism in accordance with another embodiment of the disclosure.
Figure 40A:
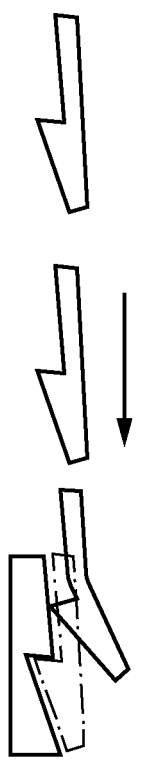
FIGS. 40A and 40B are enlarged fragmentary views of the locking mechanism of FIG. 39.
Figure 40B:
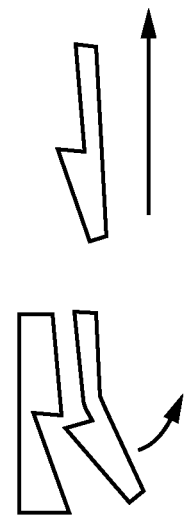

Replaceable cartridge 1310 may further comprise a locking mechanism. As seen in FIGS. 37 and 38, the locking mechanism may comprise horizontal slides 1318 that insert across the base 700 or 702 passing anterior to cranial base 600 preventing anterior movement of replaceable cartridge 1310 when retracted. Alternatively, as seen in FIGS. 39 and 40, the locking mechanism may be of a lock and key type.

Figure 41:
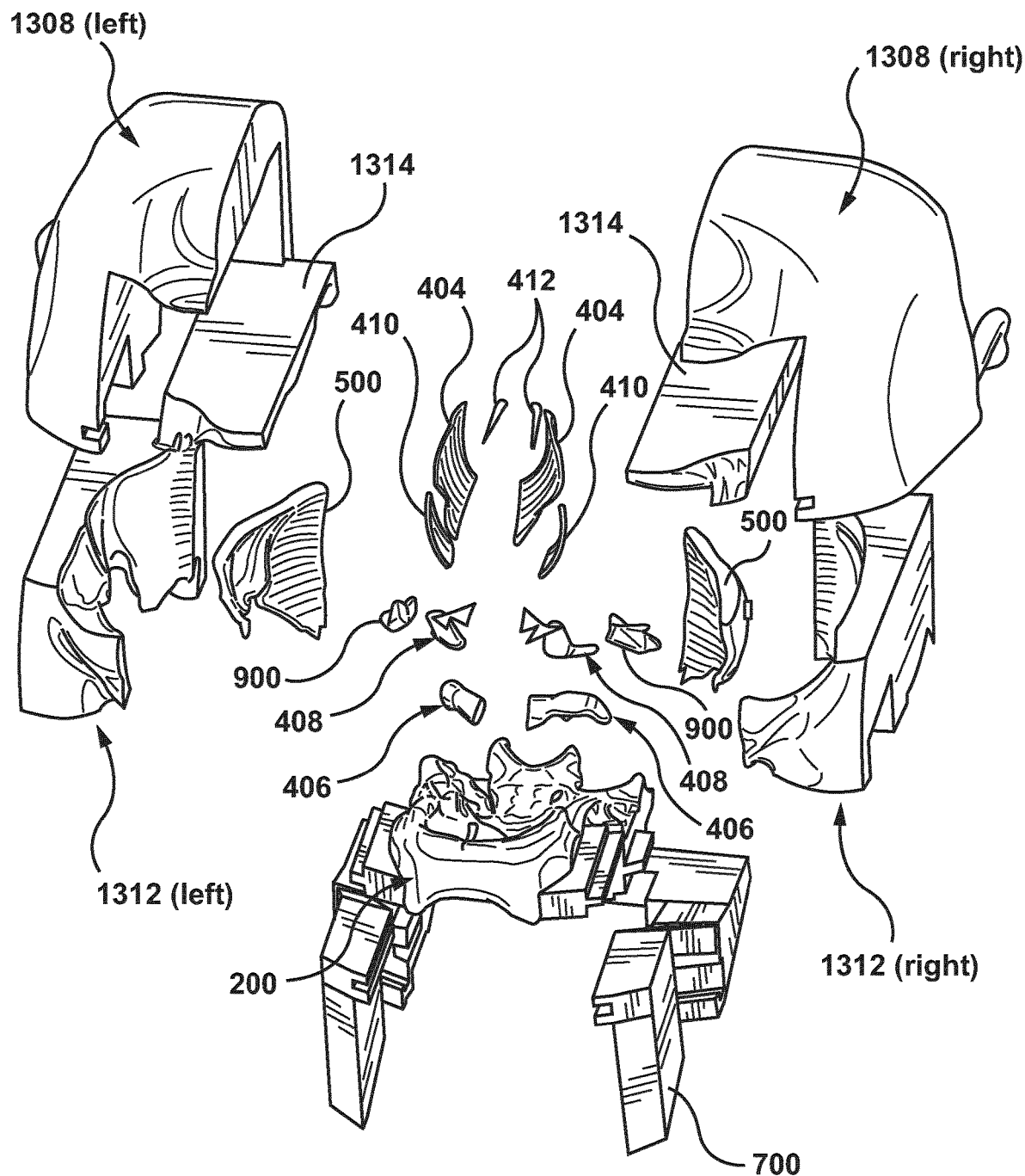
FIG. 41 is an exploded view diagram of a simulator for practicing trans-oral surgery in accordance with an embodiment of this disclosure.

FIG. 41 is an exploded view diagram of simulator 100 in accordance with an embodiment of this disclosure.

Figure 23:
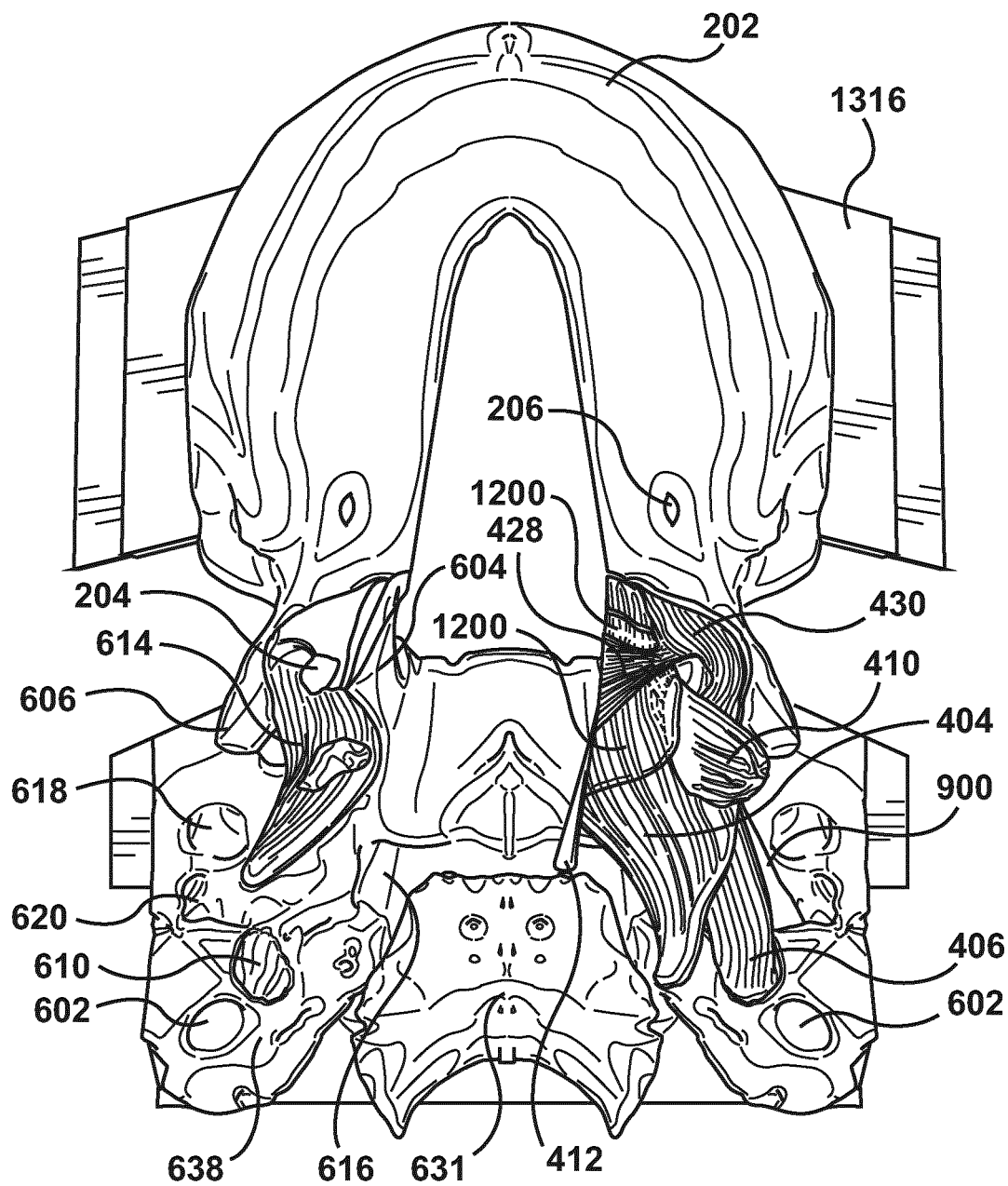
FIG. 23 is a perspective view showing a simulated eustachian tube and a simulated soft palate musculature attached to the simulated hard palate and simulated cranial base of FIG. 5 in accordance with one embodiment of this disclosure.
Figure 24:
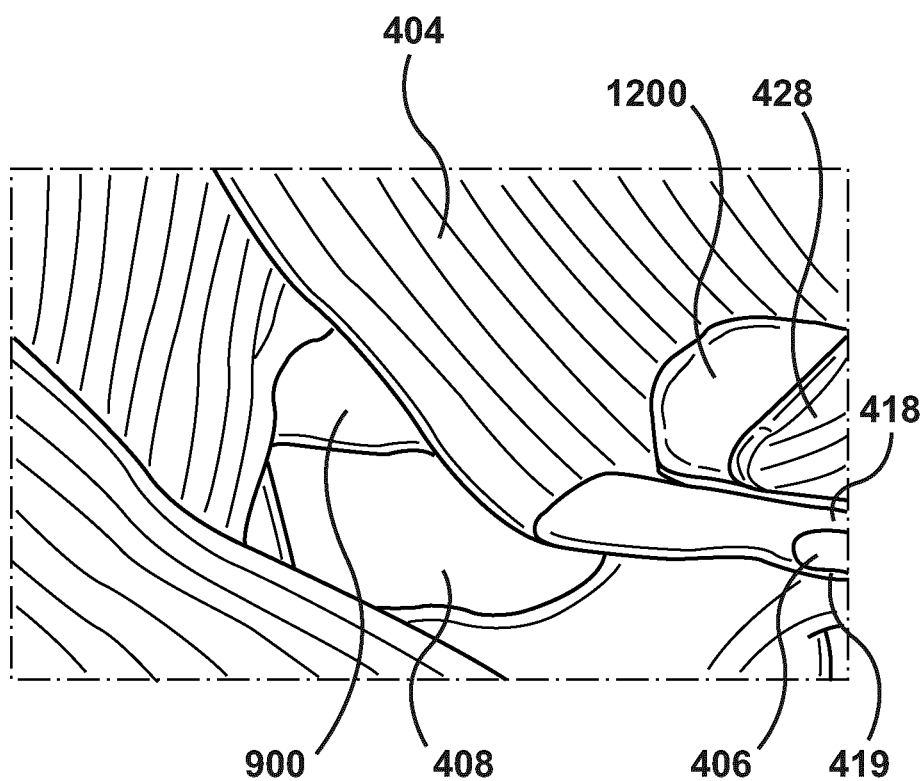
FIG. 24 is a perspective view showing a simulated eustachian tube and a simulated soft palate musculature in accordance with one embodiment of the disclosure.

In the embodiment shown in FIG. 23, simulator 100 is asymmetrical in that only a portion of the simulated soft palate musculature 400 and one eustachian tube 900 of a palate are present. Such embodiments excluding certain simulated biological features can tend to be useful to provide better access (including visual sight lines) to simulated features of interest. It will be appreciated that in other embodiments, different portions of a palate may be simulated, which may in different embodiments exclude certain simulated elements.

The components of simulator 100 may be made using any known process. For example, many of the above-described components may be cast using molds, where a plug component can be created using a 3D printer, such as a Form Labs Form 1 +3D printer. For components made of silicone, the molds may be cast using platinum-cured silicone. This can be done by mixing a first and second component of the silicone, degassing the silicone and then injecting it using a syringe into the molds through an injection port. The molds may then be clamped. The silicone tends to cure over time. Following the curing process, the silicone casts may be removed. Alternatively, many of the above components may be made using a 3D printer, such as an extrusion, light polymerized, powder bed, laminated or wire-type 3D printer.

The exemplary simulators described above can be developed from patient imaging using CT scans. The simulators can be modified to represent a patient of any age or oral cavity size by imaging a patient of the age or oral cavity size in question and, for example, can be modified to develop patient-specific simulators prior to operating on that specific patient.

Simulator 100 described above can be used for a variety of purposes, such as for teaching, training, or research. For example, simulator 100 may be used for practicing trans-oral surgery or as an anatomical model. Simulator 100 can also be used to develop new surgical instruments or robotic instruments.

Methods of practicing or learning trans-oral surgery using simulator 100 may comprise one or more of providing a simulator having simulated hard palate 200, a simulated mucosal layer 300, a first portion thereof covering and attached to at least a portion of the simulated hard palate 200, and a simulated soft palate musculature 400 configured wherein a second portion of the simulated mucosal layer 300 is covering and attached to at least a portion of the simulated soft palate musculature 400, and wherein the strength of attachment between simulated mucosal layer 300 and the simulated soft palate musculature 400 differs from the strength of attachment between simulated mucosal layer 300 and the simulated hard palate 200; dissecting the simulated mucosal layer 300 away from one or both of the simulated hard palate 200 or the simulated soft palate musculature 400; moving, mobilizing, removing or reorienting simulated mucosal layer 300; moving, mobilizing, or reorienting the simulated soft palate musculature 400; incising the simulated soft palate musculature 400; suturing the simulated soft palate musculature 400; and suturing the simulated mucosal layer 300. The steps of incising, dissecting and suturing may be performed through the use of manual instruments, powered instruments or a surgical robot.

Figure 42:
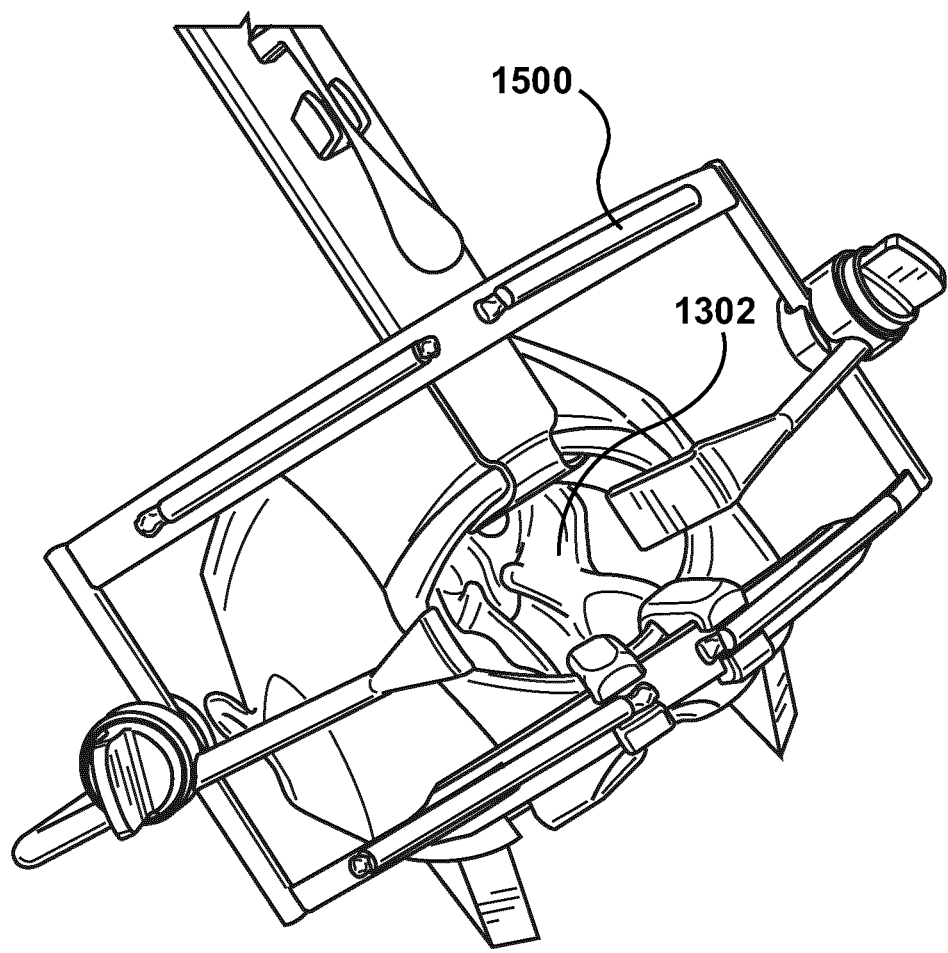
FIGS. 42-46 are perspective views showing use of a simulator for trans-oral surgery in accordance with an embodiment of the disclosure.
Figure 43:
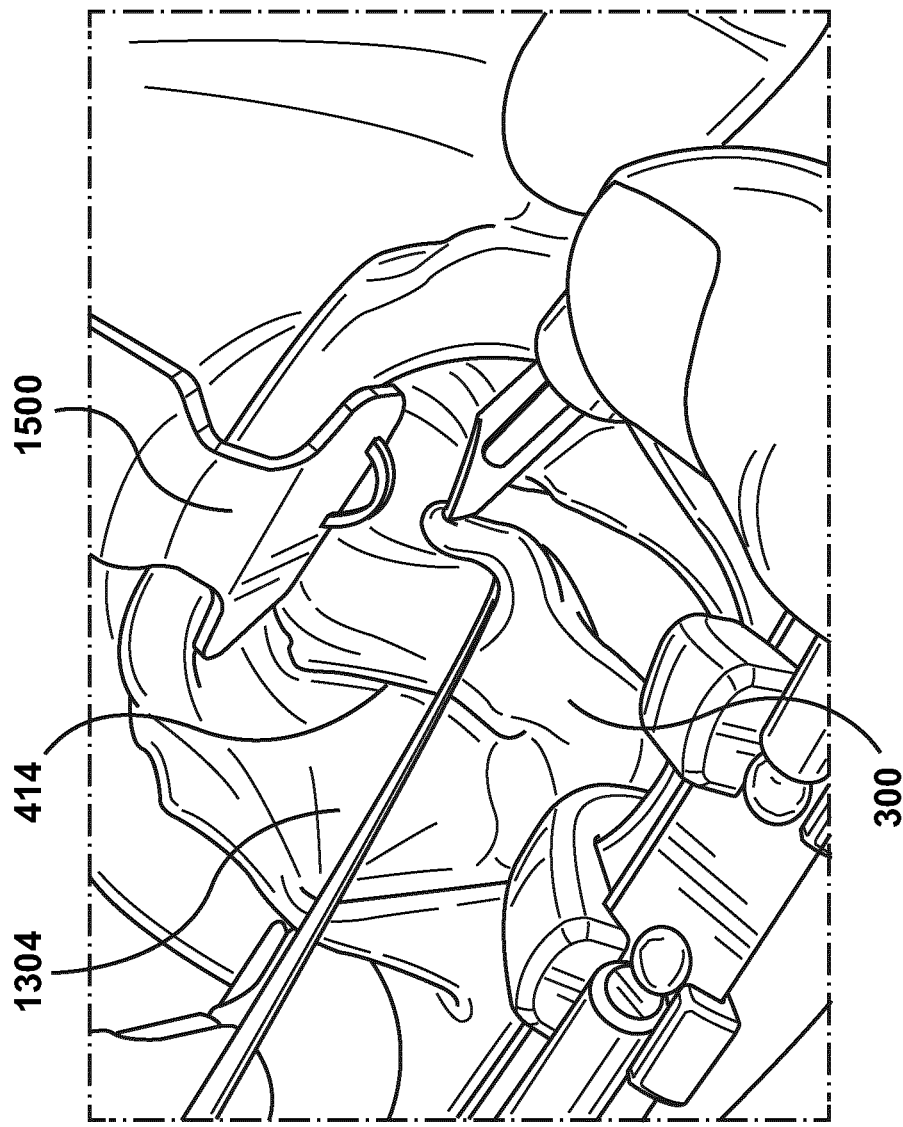
Figure 44:
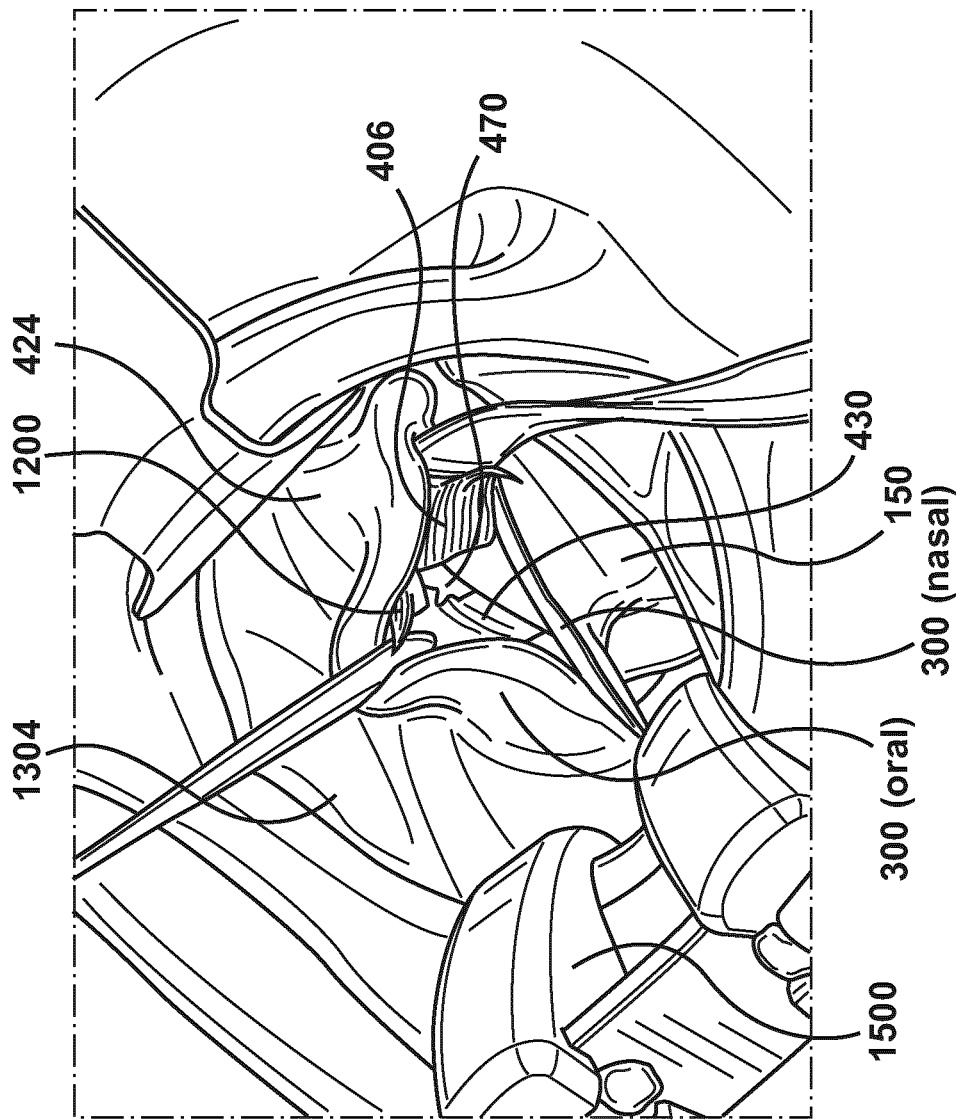
Figure 45:
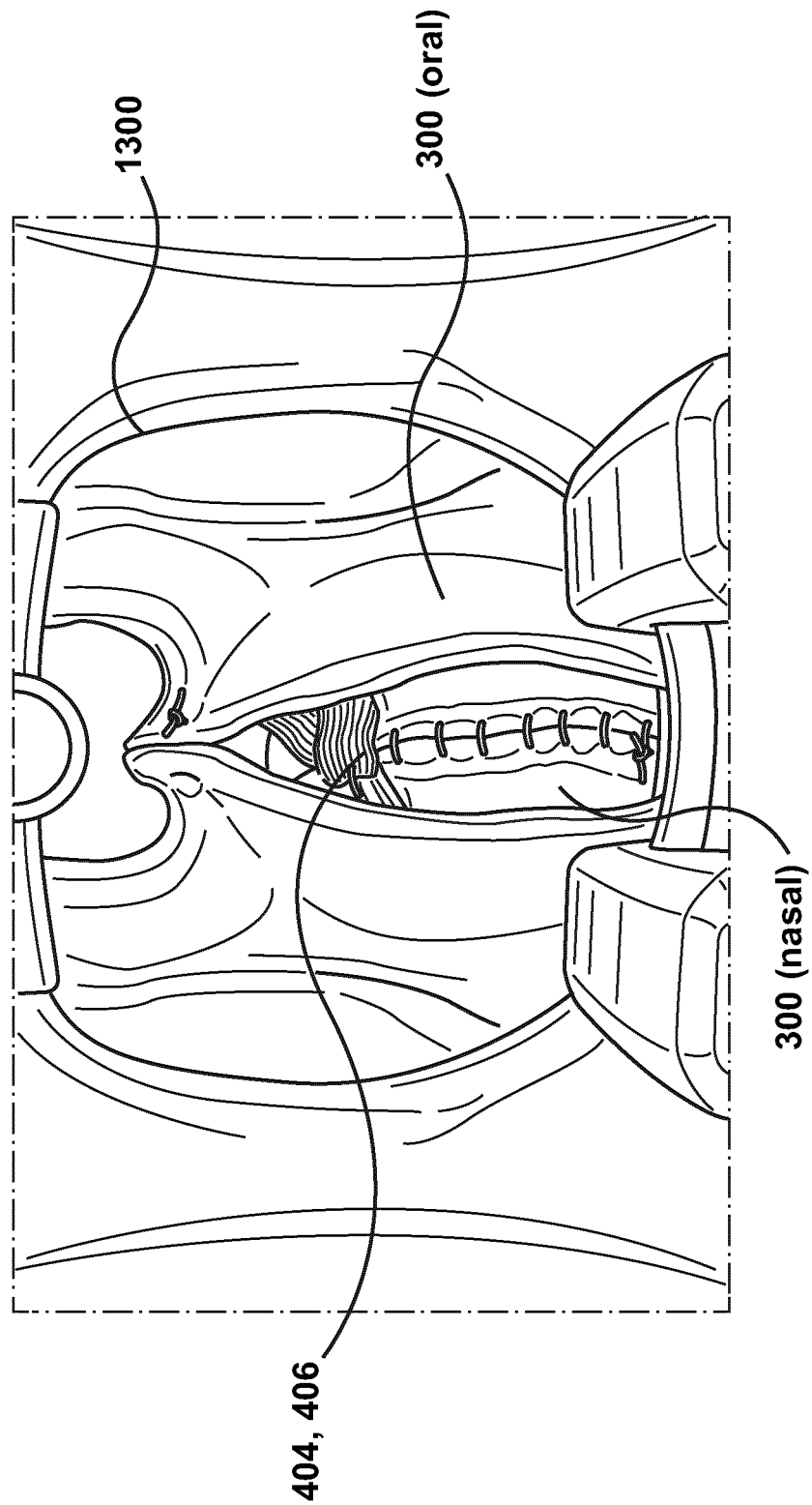
Figure 46:
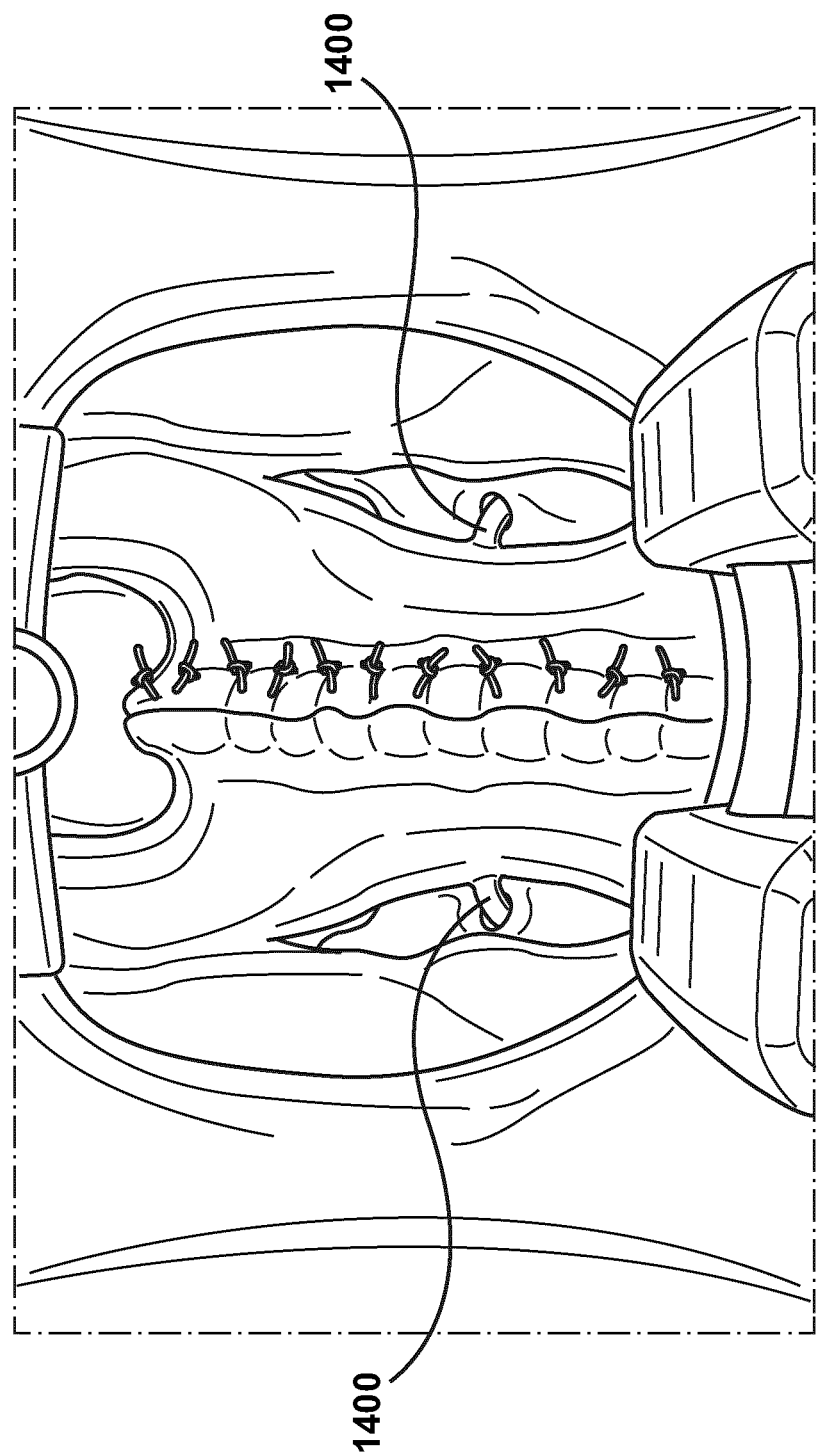

More particularly, the method may comprise one or more of opening simulated oral cavity 1302, which may be done using one or more of a retractor, such as Dingman retractor 1500 (see, for example, FIG. 42); retracting the simulated musculus uvula 412 with a skin hook while incising along simulated medial cleft 150 margin of simulated soft palate musculature 400 (see FIG. 43); creating lateral relaxing incisions at simulated dimple area 302; incising along simulated medial cleft 150 margin of the simulated hard palate 200 and simulated soft palate musculature 400; elevating a mucosal flap from simulated hard palate 200; dissecting simulated mucosal layer 300 just posterior to simulated soft palate musculature 400 encountering simulated soft tissue fatty layer 1200; elevating the mucosal flap from simulated soft palate musculature 400 under simulated soft tissue fatty layer 1200; elevating simulated mucosal layer 300 at the hard-soft palate junction with visible simulated pedicle 1400, simulated palatopharyngeus muscle 404 and simulated anterior fibers 430 of simulated tensor veli palatini muscle 408 attached to posterior simulated hard palate 200; releasing simulated palatopharyngeus muscle 404 from simulated posterior cleft 150 margin; releasing simulated palatopharyngeus muscle 404 from simulated anterior fibers 430 of simulated tensor veli palatini muscle 408; mobilizing the simulated palatopharyngeus muscle 404 with attached simulated levator veli palatini muscle 406 (see, for example, FIG. 44); dissecting simulated soft palate musculature 400 toward simulated levator tunnel 470 (see, for example, FIG. 44); suturing the simulated mucosal layer 300 together; suturing simulated soft palate musculature 400 together (see, for example, FIG. 45); exposing simulated right hamulus 204 with attached simulated superior constrictor muscle 500 and simulated tensor veli palatini aponeurosis 428 traversing toward simulated medial 150 cleft margin with simulated anterior fibers 430 of simulated tensor veli palatini muscle 408 visible; and closing simulated mucosal layer 300 with bilateral simulated pedicles 1400 visible through lateral relaxing incisions (see, for example, FIG. 46).

The above methods may be performed either directly by a medical student, resident, fellow, surgeon, or medical practitioner using manual instruments or through use of a surgical robot.

EXAMPLES

Porcine lingual gingival closest to palate mucosa is known to have the following tensile properties: a failure load of 10.89 N, a tensile strength of 2.83 MPa (410 PSI), and a Young's Modulus of 18.83 MPa (2731 PSI); and the following stress relaxation data: initial stress of 1.88 and equilibrium stress of 0.97 (Goktas S., Dmytryk J. J., McFetridge P. S., "Biomechanical behavior of oral soft tissues," *Journal of Periodontology* 2011; 82(8):1178-86).

Matching of properties of simulated components to biological tissue properties can be done by material testing porcine tissue. Tensile testing was performed to determine the tear strength of the porcine masticatory mucosa as well as the tear strength of the soft palate using ASTM D624 standard. The range of tear strengths obtained on testing four samples of porcine masticatory mucosa was 11.3-23.81 pli. The tear strength obtained on testing one sample of porcine soft palate was 2.48 pli. The tear strength obtained is on the same order of magnitude to SMOOTH-ON® ECOFLEX® 10-30 platinum-cured silicone.

Three expert cleft palate surgeons incised through ECOFLEX® 10, ECOFLEX® 20 and ECOFLEX® 30. Testing revealed that incising through ECOFLEX® 20 (which has a tear strength of 30 pli) or ECOFLEX® 30 (which has a tear strength of 38 pli) tends to simulate the feel of incising through actual oral mucosa.

While the foregoing disclosure has been described in some detail for purposes of clarity and understanding, it will be appreciated by those skilled in the relevant arts, once they have been made familiar with this disclosure, that various changes in form and detail can be made without departing from the true scope of the invention in the appended claims. The invention is, therefore, not to be limited to the exact components or details of construction or methodology set forth above. Except to the extent necessary or inherent, no particular order to steps or stages of methods or processes described in this disclosure, including the figures, is intended or implied. In many cases, the order of method steps may be varied without changing the purpose, effect or import of the methods described.

What is claimed is:

1. A simulator for practicing trans-oral surgery, comprising:
   a simulated hard palate;
   a simulated soft palate musculature adjacent to the simulated hard palate; and
   a simulated mucosal layer covering at least a portion of the simulated hard palate and at least a portion of the simulated soft palate musculature,
   wherein the simulated mucosal layer is configured to conform to and follow the contours of surface features of the covered portions of the simulated hard palate and simulated soft palate musculature;
   wherein the simulated mucosal layer is attached to the simulated soft palate musculature and the simulated hard palate, and a first strength of attachment between the simulated mucosal layer and the simulated soft palate musculature differs from a second strength of attachment between the simulated mucosal layer and the simulated hard palate.

2. The simulator of claim 1, wherein the first strength of attachment is less than the second strength of attachment.

3. The simulator of claim 1, wherein the first strength of attachment is greater than the second strength of attachment.

4. A simulator for practicing trans-oral surgery, comprising:
   a simulated hard palate;
   a simulated soft palate musculature adjacent to the simulated hard palate; and
   a simulated mucosal layer covering at least a portion of the simulated hard palate and at least a portion of the simulated soft palate musculature,
   wherein the simulated mucosal layer is configured to conform to and follow the contours of surface features of the covered portions of the simulated hard palate and simulated soft palate musculature;
   wherein the simulated mucosal layer is attached to the simulated soft palate musculature and the simulated hard palate, and the simulated hard palate comprises a simulated hamulus, the simulator further comprising a simulated cranial base extending from the simulated hard palate, the cranial base comprising a simulated medial pterygoid plate, and the simulator further comprising a simulated superior constrictor muscle attached to the simulated hamulus and simulated medial pterygoid plate, wherein the simulated mucosal layer is less strongly attached to the simulated superior constrictor muscle than to the simulated hard palate.

5. A simulator for practicing trans-oral surgery, comprising:
   a simulated hard palate;
   a simulated soft palate musculature adjacent to the simulated hard palate; and
   a simulated mucosal layer covering at least a portion of the simulated hard palate and at least a portion of the simulated soft palate musculature,
   wherein the simulated mucosal layer is configured to conform to and follow the contours of surface features of the covered portions of the simulated hard palate and simulated soft palate musculature;
   wherein the simulated soft palate musculature comprises a simulated palatopharyngeus muscle and a simulated tensor veli palatini muscle, the simulated tensor veli palatini muscle comprising a tensor veli palatini aponeurosis, the simulator further comprising a simulated soft tissue fatty layer located between and attached to the simulated palatopharyngeus muscle and the simulated tensor veli palatini aponeurosis, wherein the simulated soft tissue fatty layer is less strongly attached to the simulated palatopharyngeus muscle than to the tensor veli palatini aponeurosis.

6. A simulator for practicing trans-oral surgery, comprising:
   a simulated hard palate;
   a simulated soft palate musculature adjacent to the simulated hard palate;
   a simulated mucosal layer covering at least a portion of the simulated hard palate and at least a portion of the simulated soft palate musculature, wherein the simulated mucosal layer is configured to conform to and follow the contours of surface features of the covered portions of the simulated hard palate and simulated soft palate musculature;
   a simulated oral aperture;
   a simulated oral cavity extending from the simulated oral aperture;
   two opposed simulated lateral oral cavity walls extending from the simulated oral aperture; and
   a simulated tongue spanning the opposed simulated lateral oral cavity walls at a first end of said walls,
   wherein the simulated hard palate, and the simulated mucosal layer are attached to opposed simulated lateral oral cavity walls at a second end of said walls.

7. The simulator of claim 6, wherein the simulator forms a cartridge that replaceably fits within a complete or partial simulated face.

8. A method of practicing or learning trans-oral surgery, the method comprising one or more steps of:
   providing a simulator having a simulated hard palate, a simulated soft palate musculature adjacent to the simulated hard palate; and a simulated mucosal layer covering at least a portion of the simulated hard palate and at least a portion of the simulated soft palate musculature, wherein the simulated mucosal layer is configured to conform to and follow the contours of surface features of the covered portions of the simulated hard palate and simulated soft palate musculature;
   incising the simulated mucosal layer;
   dissecting the simulated mucosal layer away from one or both of the simulated hard palate or the simulated soft palate musculature;
   moving, mobilizing, or reorienting the simulated mucosal layer;
   moving, mobilizing, or reorienting the simulated soft palate musculature;
   incising the simulated soft palate musculature;
   suturing the simulated soft palate musculature; and
   suturing the simulated mucosal layer.

9. The method of claim 8, wherein the steps of incising, dissecting, moving, mobilizing, reorienting or suturing are performed through the use of manual instruments, powered instruments or a surgical robot.

10. A simulator for practicing trans-oral surgery, comprising:
- a simulated hard palate;
- a simulated soft palate musculature adjacent to the simulated hard palate; and
- a simulated palatal mucosal layer covering at least a portion of the simulated hard palate and at least a portion of the simulated soft palate musculature,
- wherein the simulated palatal mucosal layer is configured to conform to and follow the contours of surface features of the covered portions of the simulated hard palate and simulated soft palate musculature.

11. The simulator of claim 10, wherein the simulated palatal mucosal layer is attached to the simulated soft palate musculature and the simulated hard palate, the simulated soft palate musculature comprises a simulated palatoglossus muscle, and the simulated hard palate comprises a simulated hamulus, wherein the simulator further comprises a simulated superior constrictor muscle attached to the simulated hamulus and to the simulated palatoglossus muscle, and wherein the simulated palatoglossus muscle is less strongly attached to the simulated hard palate and the simulated soft palate musculature than to the simulated superior constrictor muscle.

12. The simulator of claim 10, wherein the simulated soft palate musculature comprises a simulated levator palatini muscle and a simulated palatopharyngeus muscle, and wherein the simulated levator palatini muscle is attached to the simulated palatopharyngeus muscle.

13. The simulator of claim 10, further comprising a simulated pedicle attached to or embedded in the simulated hard palate.

14. The simulator of claim 10, further comprising a simulated cranial base extending from the simulated hard palate, and wherein the simulated soft palate musculature comprises at least a simulated levator veli palatini muscle, and the simulator further comprising a simulated eustachian tube attached to the simulated levator veli palatini muscle and to the simulated cranial base, and wherein the simulated eustachian tube is less strongly attached to the simulated palatal mucosal layer than to the simulated levator veli palatini muscle and to the simulated cranial base.

15. The simulator of claim 10, further comprising a simulated cleft in at least one of the simulated hard palate and the simulated soft palate musculature.

* * * * *